United States Patent
Sirotkin et al.

(10) Patent No.: US 11,190,989 B2
(45) Date of Patent: Nov. 30, 2021

(54) MOBILITY MANAGEMENT FOR INTER-GNB (NEXT GENERATION NODE-B) HANDOVER IN NEW RADIO (NR) SYSTEMS

(71) Applicant: Apple Inc., Cupertino, CA (US)

(72) Inventors: Alexander Sirotkin, Tel-Aviv (IL); Xu Zhang, Beijing (CN); Jaemin Han, Hillsboro, OR (US); Feng Yang, Beijing (CN); Honglei Miao, Nuremberg (DE); Jerome Parron, Fuerth (DE); Markus Dominik Mueck, Unterhaching (BY); Jing Zhu, Portland, OR (US); Ellen Liao, Hillsboro, OR (US); Jeongho Jeon, San Jose, CA (US); Youn Hyoung Heo, Seoul (KR); Anthony Lee, San Diego, CA (US); Seau S. Lim, Swindon (GB); Marta Martinez Tarradell, Hillsboro, OR (US); Meghashree Dattatri Kedalagudde, Hillsboro, OR (US); Puneet Jain, Hillsboro, OR (US); Bharat Shrestha, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/419,245

(22) Filed: May 22, 2019

(65) Prior Publication Data

US 2019/0342800 A1    Nov. 7, 2019

Related U.S. Application Data

(63) Continuation of application No. PCT/CN2018/093835, filed on Jun. 29, 2018.
(Continued)

(51) Int. Cl.
*H04W 36/00* (2009.01)
*H04W 36/08* (2009.01)
(Continued)

(52) U.S. Cl.
CPC ...... *H04W 36/0033* (2013.01); *H04B 17/318* (2015.01); *H04W 36/08* (2013.01);
(Continued)

(58) Field of Classification Search
CPC ... H04W 36/02; H04W 36/023; H04W 36/08; H04W 36/0033; H04W 92/20;
(Continued)

(56) References Cited

U.S. PATENT DOCUMENTS

2013/0104123 A1* 4/2013 Park .................. H04N 1/00938
                                                              717/176
2019/0387444 A1* 12/2019 Byun ................. H04W 36/023
(Continued)

OTHER PUBLICATIONS

"3rd Generation Partnership Project; Technical Specification Group Radio Access Network; NG-RAN; Architecture description (Release 15) (3GPP TS 38.401 v15.1.0)" (Mar. 2018). (Year: 2018).*
(Continued)

*Primary Examiner* — Ian N Moore
*Assistant Examiner* — Sun Jong Kim
(74) *Attorney, Agent, or Firm* — Kowert, Hood, Munyon, Rankin & Goetzel, P.C.

(57) ABSTRACT

A Next Generation Node-B (gNB) and methods of communication are generally described herein. The gNB is configurable to operate as a source gNB. The gNB is configured with logical nodes including a gNB central unit (gNB-CU) and a gNB distributed unit (gNB-DU). The gNB-CU comprises a gNB-CU control plane (gNB-CU-CP) for control-plane functionality, and a gNB-CU user plane (gNB-CU-UP) for user-plane functionality. When a handover of a User
(Continued)

Equipment (UE) from the source gNB to a target gNB is performed, the gNB transfers, from the gNB-DU to the gNB-CU-UP, a downlink data delivery status (DDDS) message to indicate that the gNB-CU-UP is to stop transfer, to the gNB-DU, of downlink data intended for the UE.

20 Claims, 44 Drawing Sheets

Related U.S. Application Data

(60) Provisional application No. 62/674,809, filed on May 22, 2018, provisional application No. 62/682,721, filed on Jun. 8, 2018, provisional application No. 62/685,598, filed on Jun. 15, 2018, provisional application No. 62/687,025, filed on Jun. 19, 2018, provisional application No. 62/687,701, filed on Jun. 20, 2018, provisional application No. 62/703,758, filed on Jul. 26, 2018, provisional application No. 62/805,156, filed on Feb. 13, 2019.

(51) Int. Cl.
| | | |
|---|---|---|
| *H04B 17/318* | (2015.01) | |
| *H04W 80/02* | (2009.01) | |
| *H04W 76/27* | (2018.01) | |
| *H04W 80/08* | (2009.01) | |

(52) U.S. Cl.
CPC ........... *H04W 76/27* (2018.02); *H04W 80/02* (2013.01); *H04W 80/08* (2013.01)

(58) Field of Classification Search
CPC ........... H04W 36/0079; H04W 36/305; H04W 36/0083; H04W 36/00
See application file for complete search history.

(56) References Cited

U.S. PATENT DOCUMENTS

2020/0120572 A1\* 4/2020 Fiorani ................. H04W 36/38
2020/0162211 A1\* 5/2020 Wang ................ H04W 72/0433

OTHER PUBLICATIONS

3GPP TSG-RAN WG3#98 (R3-174630) Reno, NV, USA, Nov. 27-Dec. 1, 2017. (Year: 2017).\*
Fiorani et al (U.S. Appl. No. 62/561,709, filed Sep. 22, 2017). (Year: 2017).\*
Byun et al (U.S. Appl. No. 62/555,050, filed Sep. 7, 2017). (Year: 2017).\*
"3rd Generation Partnership Project; Technical Specification Group Radio Access Network; NG-RAN; NR user plane protocol (Release 15) (3GPP TS 38.425 v15.1.0" (Mar. 2018) (Year: 2018).\*
"5G; NR; Radio Resource Control (RRC); Protocol specification", ETSI TS 138 331 V15.3.0, (Oct. 2018), 441 pgs.
"3GPP TS 38.213 V15.5.0", Technical Specification Group Radio Access Network; NR; Physical layer procedures for control (Release 15), (Mar. 2019), 104 pgs.
"3GPP TR 22.804 V2.0.0", Technical Specification Group Services and System Aspects; Study on Communication for Automation in Vertical Domains (Release 16), (May 2018), 188 pgs.

\* cited by examiner

1300

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind | Highest Delivered NR PDCP SN Ind | Final Frame Ind | Lost Packet Report | 1 |
| Spare | | | | Highest Retransmitted NR PDCP SN Ind | Highest Delivered Retransmitted NR PDCP SN Ind | Cause Report | | 1 |
| Desired buffer size for the data radio bearer | | | | | | | | 4 |
| Minimum desired buffer size for the UE | | | | | | | | 4 |
| Number of lost NR-U Sequence Number ranges reported | | | | | | | | 0 or 1 |
| Start of lost NR-U Sequence Number range | | | | | | | | 0 or (6* Number of reported lost NR-U SN ranges) |
| End of lost NR-U Sequence Number range | | | | | | | | |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Highest successfully delivered retransmitted NR PDCP Sequence Number | | | | | | | | 3 |
| Highest retransmitted NR PDCP Sequence Number | | | | | | | | 3 |
| Padding | | | | | | | | 0-3 |

| 7 | 6 | 5 | 4 | 3 | 2 | 1 | 0 | |
|---|---|---|---|---|---|---|---|---|
| PDU Type (=2) | | | | PDCP Dupl. Ind | Spare | | | 1 |
| Spare | | | | | | | PDCP Duplication Activation Suggestion | 1 |
| Number of Assistance Information Fields | | | | | | | | 0 or 1 |
| Assistance Information Type | | | | | | | | 0 or (2*Number of Assistance Info Field) |
| Radio Quality Assistance Information | | | | | | | | |

1530

| 7 | 6 | 5 | 4 | 3 | 2 | 1 | 0 | |
|---|---|---|---|---|---|---|---|---|
| PDU Type (=2) | | | | PDCP Dupl. Ind | Spare | | | 1 |
| Spare | | | | | | | PDCP Duplication Activation Suggestion | 1 |
| Number of Assistance Information Fields (=2) | | | | | | | | 0 or 1 |
| Assistance Information Type (=4, DL Radio Quality Index) | | | | | | | | 0 or (2*Number of Assistance Info Field) |
| Radio Quality Assistance Information (=0, lowest quality) | | | | | | | | |
| Assistance Information (=5, UL Radio Quality Index) | | | | | | | | |
| Radio Quality Assistance Information (=0, lowest quality) | | | | | | | | |

1560

| 7 | 6 | 5 | 4 | 3 | 2 | 1 | 0 | |
|---|---|---|---|---|---|---|---|---|
| PDU Type (=3) | | | | DL Transmission Halt Ind. | UL Transmission Halt Ind. | Spare | | 1 |

3900
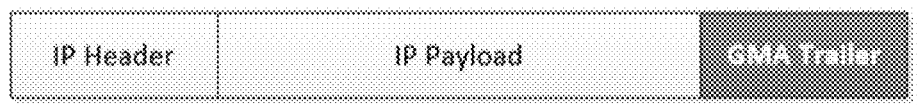
a) PDU session Type: IP v4 or v6
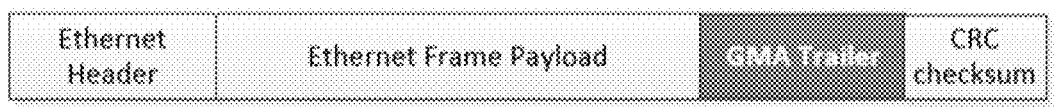
b) PDU session Type: Ethernet
FIG. 39

4400

| 8 | 7 | 6 | 5 | 4 | 3 | 2 | 1 | |
|---|---|---|---|---|---|---|---|---|
| UE network capability IEI |||||||| octet 1 |
| Length of UE network capability contents |||||||| octet 2 |
| EEA0 | 128-EEA1 | 128-EEA2 | 128-EEA3 | EEA4 | EEA5 | EEA6 | EEA7 | octet 3 |
| EIA0 | 128-EIA1 | 128-EIA2 | 128-EIA3 | EIA4 | EIA5 | EIA6 | EIA7 | octet 4 |
| UEA0 | UEA1 | UEA2 | UEA3 | UEA4 | UEA5 | UEA6 | UEA7 | octet 5* |
| UCS2 | UIA1 | UIA2 | UIA3 | UIA4 | UIA5 | UIA6 | UIA7 | octet 6* |
| ProSe-dd | ProSe | H.245-ASH | ACC-CSFB | LPP | LCS | 1xSR VCC | NF | octet 7* |
| ePCO | HC-CP CIoT | ERw/o PDN | S1-U data | UP CIoT | CP CIoT | Prose-relay | ProSe-dc | octet 8* |
| 0 Spare | 0 Spare | 0 Spare | 0 Spare | Early Data Tx | Restric tEC | V2X PC5 | multipl eDRB | octet 9* |
| 0 | 0 | 0 | 0 | 0 | 0 | 0 | 0 | octet 10* - 15* |
| Spare ||||||||  |

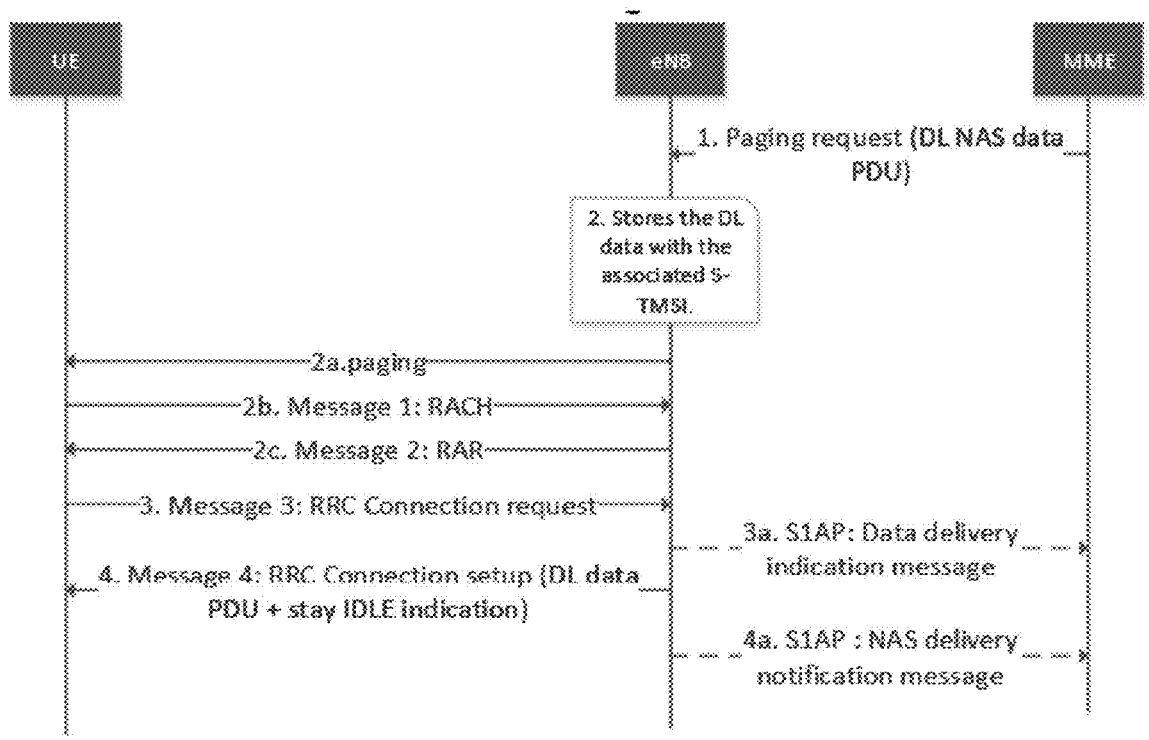

Paging message

```
-- ASN1START

Paging ::=                          SEQUENCE {
    pagingRecordList                    PagingRecordList                    OPTIONAL,   -- Need ON
    systemInfoModification              ENUMERATED (true)                   OPTIONAL,   -- Need ON
    etws-Indication                     ENUMERATED (true)                   OPTIONAL,   -- Need ON
    nonCriticalExtension                Paging-v890-IEs                     OPTIONAL
}

Paging-v890-IEs ::=                 SEQUENCE {
    lateNonCriticalExtension            OCTET STRING                        OPTIONAL,
    nonCriticalExtension                Paging-v920-IEs                     OPTIONAL
}

Paging-v920-IEs ::=                 SEQUENCE {
    cmas-Indication-r9                  ENUMERATED (true)                   OPTIONAL,   -- Need ON
    nonCriticalExtension                Paging-v1130-IEs                    OPTIONAL
}

Paging-v1130-IEs ::=                SEQUENCE {
    sab-ParamModification-r11           ENUMERATED (true)                   OPTIONAL,   -- Need ON
    nonCriticalExtension                Paging-v1310-IEs                    OPTIONAL
}

Paging-v1310-IEs ::=                SEQUENCE {
    redistributionIndication-r13        ENUMERATED (true)                   OPTIONAL,   -- Need ON
    systemInfoModification-eDRX-r13     ENUMERATED (true)                   OPTIONAL,   -- Need ON
    nonCriticalExtension                Paging-v16xy-IEs ()                 OPTIONAL
}

Paging-v16xy-IEs ::=                SEQUENCE {
    dl-EDT-Indication                   ENUMERATED (true)                   OPTIONAL,   -- Need ON
    ra-PreambleIndex                    INTEGER (0..63)                     OPTIONAL,   -- Need ON
    nonCriticalExtension                SEQUENCE ()                         OPTIONAL
}

PagingRecordList ::=                SEQUENCE (SIZE (1..maxPageRec)) OF PagingRecord PagingRecord ::=                    SEQUENCE {
    ue-Identity                         PagingUE-Identity,
    cn-Domain                           ENUMERATED (ps, cs)
    ...
}

PagingUE-Identity ::=               CHOICE {
    s-TMSI                              S-TMSI,
    imsi                                IMSI,
    ....
    ng-5G-S-TMSI-r15                    NG-5G-S-TMSI-r15
    i-RNTI-r15                          I-RNTI-Value-r15
}

IMSI ::=                            SEQUENCE (SIZE (6..21)) OF IMSI-Digit

IMSI-Digit ::=                      INTEGER (0..9)

-- ASN1STOP
```

```
Paging-v16xy-IEs        ::=     SEQUENCE {                              OPTIONAL,  --
    paging EDT -- indicationList    pagingEDT -- IndicationList
Need ON                                                                 OPTIONAL
    nonCriticalextension            SEQUENCE ( )
}
```

```
PagingEDT-IndicationList  ::=   SEQUENCE (SIZE (1..maxPageRec)) OF PagingEDT-
Indication
```

```
PagingEDT-IndicationList  ::=                   SEQUENCE {      OPTIONAL,   -- Need ON
    dl-EDT-Indication       ENUMERATED (true)                   OPTIONAL,   -- need ON
    ra-PreambleIndex        INTEGER (0..63)
}
```

| Paging field descriptions |
|---|
| cmas-Indication<br>If present: indication of a CMAS notification. |
| cn-Domain<br>Indicates the origin of paging |
| dl-EDT-Indication<br>If present: indication of DL EDT in Msg4 |
| eab-ParamModification<br>If present: indication of an EAB parameters (SIB14) modification. |
| etws-Indication<br>If present: indication of an ETWS primary notification and/ or ETWS secondary notification. |
| imsi<br>The international Mobile Subscriber Identity, a globally unique permanent subscriber identity, see TS 23.003 [27]. The first element contains the first IMSI digit, the second element contains the second IMSI digit and so on. |
| redistributionIndication<br>If present: indication to trigger E-UTRAN inter-frequency redistribution procedure as specified in TS 36.304 [4,5.2.4.10] |
| systemInfoModification<br>If present: indication of a BCCH modification other than SIB10, SIB11, SIB12 and SIB14. This indication applies only to UEs using Edrx cycle longer than the BCCH modification period. |
| systemInfoModification-eDRX<br>If present: indication of a BCCH modification other than SIB10, SIB11, SIB12 and SIB14. This indication applies only UEs using eDRX cycle longer than the BCCH modification period. |
| ue-Identity<br>Provides the NAS identity of the UE that is being paged. |

FIG. 52

MOBILITY MANAGEMENT FOR INTER-GNB (NEXT GENERATION NODE-B) HANDOVER IN NEW RADIO (NR) SYSTEMS

PRIORITY CLAIM

This application claims priority under 35 USC 119(e) to U.S. Provisional Patent Application Ser. No. 62/674,809, filed May 22, 2018, and to U.S. Provisional Patent Application Ser. No. 62/682,721, filed Jun. 8, 2018, and to U.S. Provisional Patent Application Ser. No. 62/685,598, filed Jun. 15, 2018, and to U.S. Provisional Patent Application Ser. No. 62/687,025, filed Jun. 19, 2018, and to U.S. Provisional Patent Application Ser. No. 62/687,701, filed Jun. 20, 2018,and to U.S. Provisional Patent Application Ser. No. 62/703,758, filed Jul. 26, 2018, and to U.S. Provisional Patent Application Ser. No. 62/805,156, filed Feb. 13, 2019, and is a continuation of International Application No. PCT/CN2018/093835, filed Jun. 29, 2018, all of which are incorporate by reference in their entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to mobility management. Some embodiments relate to inter-gNB handover.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

FIG. 13 illustrates an example element in accordance with some embodiments;

FIG. 15 illustrates example elements in accordance with some embodiments;

FIG. 39 illustrates example packets in accordance with some embodiments;

FIG. 44 illustrates an example element in accordance with some embodiments;

FIG. 45 illustrates example messages that may be exchanged in accordance with some embodiments;

FIG. 50 illustrates an example message that may be exchanged in accordance with some embodiments;

FIG. 51 illustrates an example message that may be exchanged in accordance with some embodiments;

FIG. 52 illustrates example fields in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
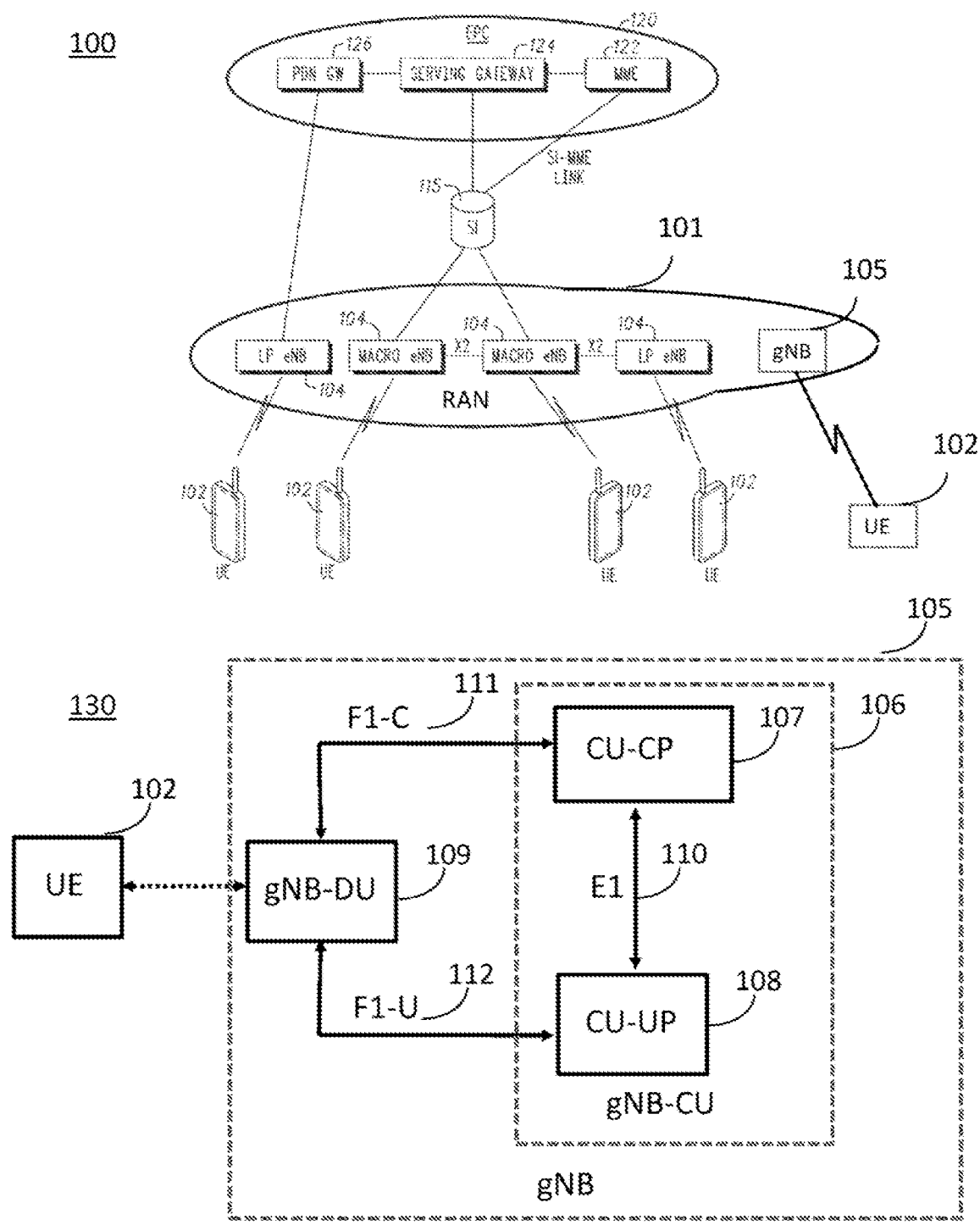
FIG. 1A is a functional diagram of an example network in accordance with some embodiments.
Figure 1B:
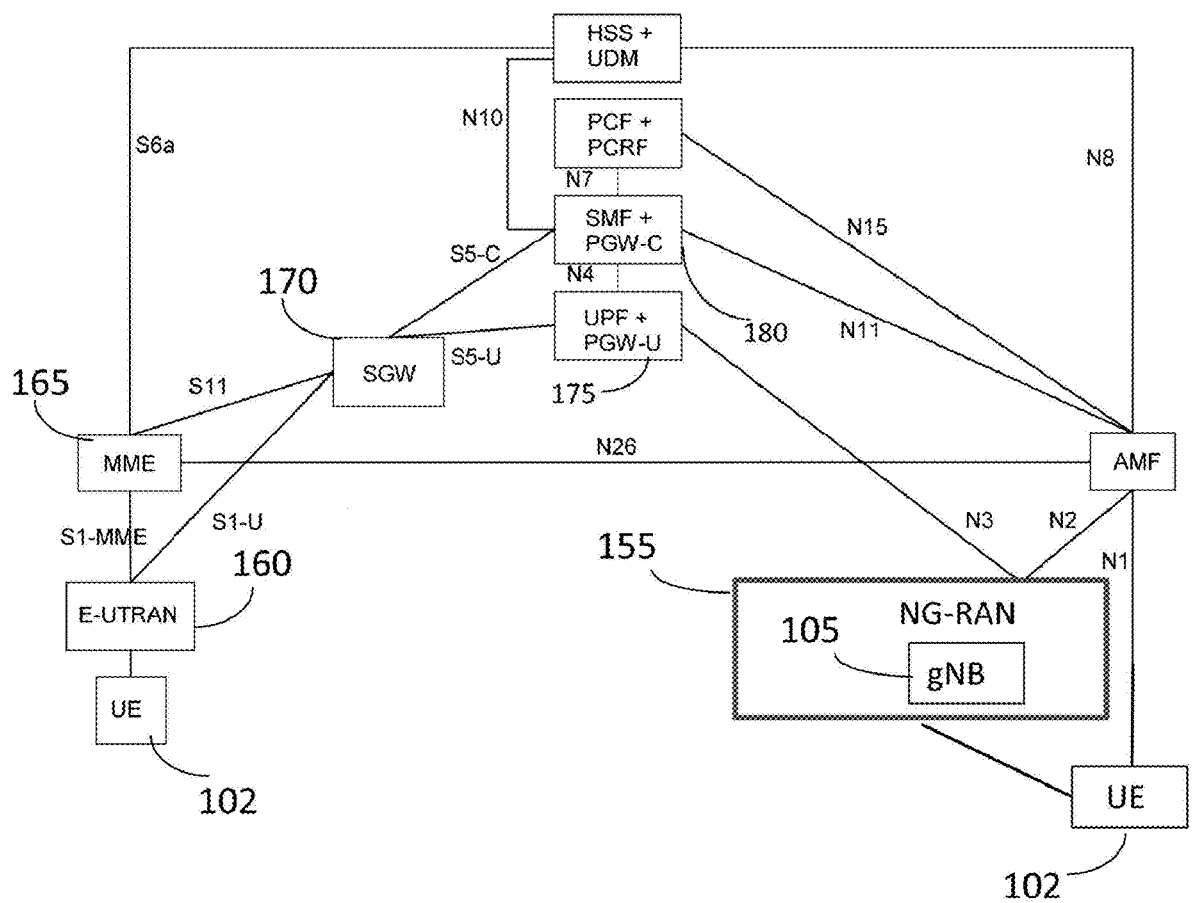
FIG. 1B is a functional diagram of another example network in accordance with some embodiments.

FIG. 1 is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120. In some embodiments, the core network may be a 5GC network, and one or more components may communicate through an NG interface, although the scope of embodiments is not limited in this respect. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of a 5G network. In another non-limiting example, the RAN 101 may include one or more components of an E-UTRAN and one or more components of another network (including but not limited to an NR network).

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, the gNB 105 may include multiple components. In a non-limiting example shown in 130, the gNB 105 may comprise a gNB central unit (gNB-CU) 106 and a gNB distributed unit (gNB-DU) 109. Embodiments are not limited to the number of components shown, as the gNB 105 may include multiple gNB-CUs 106 and/or multiple gNB-DUs 109, in some embodiments. In some embodiments, the gNB-CU 106 may include a control unit user-plane (CU-UP) entity 108 and a control unit control-plane (CU-CP) 107. Embodiments are not limited to the number of components shown, as the gNB-CU 106 may include multiple CU-CPs 107 and/or multiple CU-UPs 108, in some embodiments. In some embodiments, the CU-CP 107 and the CU-UP 108 may communicate over the E1 interface 110, although the scope of embodiments is not limited in this respect. In some embodiments, the gNB-CU 106 and the gNB-DU 109 may communicate over an F1 interface, although the scope of embodiments is not limited in this respect. In some embodiments, the F1 interface may include an F1-C interface 111 and an F1-U interface 112, although the scope of embodiments is not limited in this respect. In some embodiments, the CU-CP 107 and the gNB-DU 109 may communicate over the F1-C interface 111, although the scope of embodiments is not limited in this respect. In some embodiments, the CU-UP 108 and the gNB-DU 109 may communicate over the F1-U interface 112, although the scope of embodiments is not limited in this respect.

In some embodiments, the gNB-CU 106 and the gNB-DU 109 may be part of a disaggregated gNB 105. One or more of the gNB-CU 106, CU-CP 107, CU-UP 108, gNB-DU 109 may be co-located, in some embodiments. One or more of the gNB-CU 106, CU-CP 107, CU-UP 108, gNB-DU 109 may not necessarily be co-located, in some embodiments. Other arrangements are possible, including arrangements in which two or more of the gNB-CU 106, CU-CP 107, CU-UP 108, gNB-DU 109 are co-located.

The scope of embodiments is not limited to arrangements in which the gNB-CU 106 and the gNB-DU 109 are part of a disaggregated gNB 105, however. In some embodiments, one or more of the techniques, operations and/or methods described herein may be practiced by a gNB-CU 106, CU-CP 107, CU-UP 108 and/or gNB-DU 109 that may not necessarily be included in a disaggregated gNB 105.

References herein to communication between the gNB 105 and another component (such as the UE 102, MME 122, SGW 124 and/or other) are not limiting. In some embodiments, such communication may be performed between the component (such as the UE 102, MME 122, SGW 124 and/or other) and one of the gNB-CU 106, CU-CP 107, CU-UP 108, gNB-DU 109.

References herein to an operation, technique and/or method performed by the gNB 105 are not limiting. In some embodiments, such an operation, technique and/or method may be performed by one of the gNB-CU 106, CU-CP 107, CU-UP 108, gNB-DU 109.

In some embodiments, one or more of the UEs 102, gNBs 105, gNB-CU 106, CU-CP 107, CU-UP 108, gNB-DU 109, and/or eNBs 104 may be configured to operate in accordance with an NR protocol and/or NR techniques. References to a UE 102, eNB 104, gNB 105, gNB-CU 106, CU-CP 107, CU-UP 108 and/or gNB-DU 109 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below. In some embodiments, the UE 102 may transmit signals to a component of a disaggregated gNB 105 (such as the gNB-DU 109). In some embodiments, the UE 102 may receive signals from a component of a disaggregated gNB 105 (such as the gNB-DU 109).

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 175, 180 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
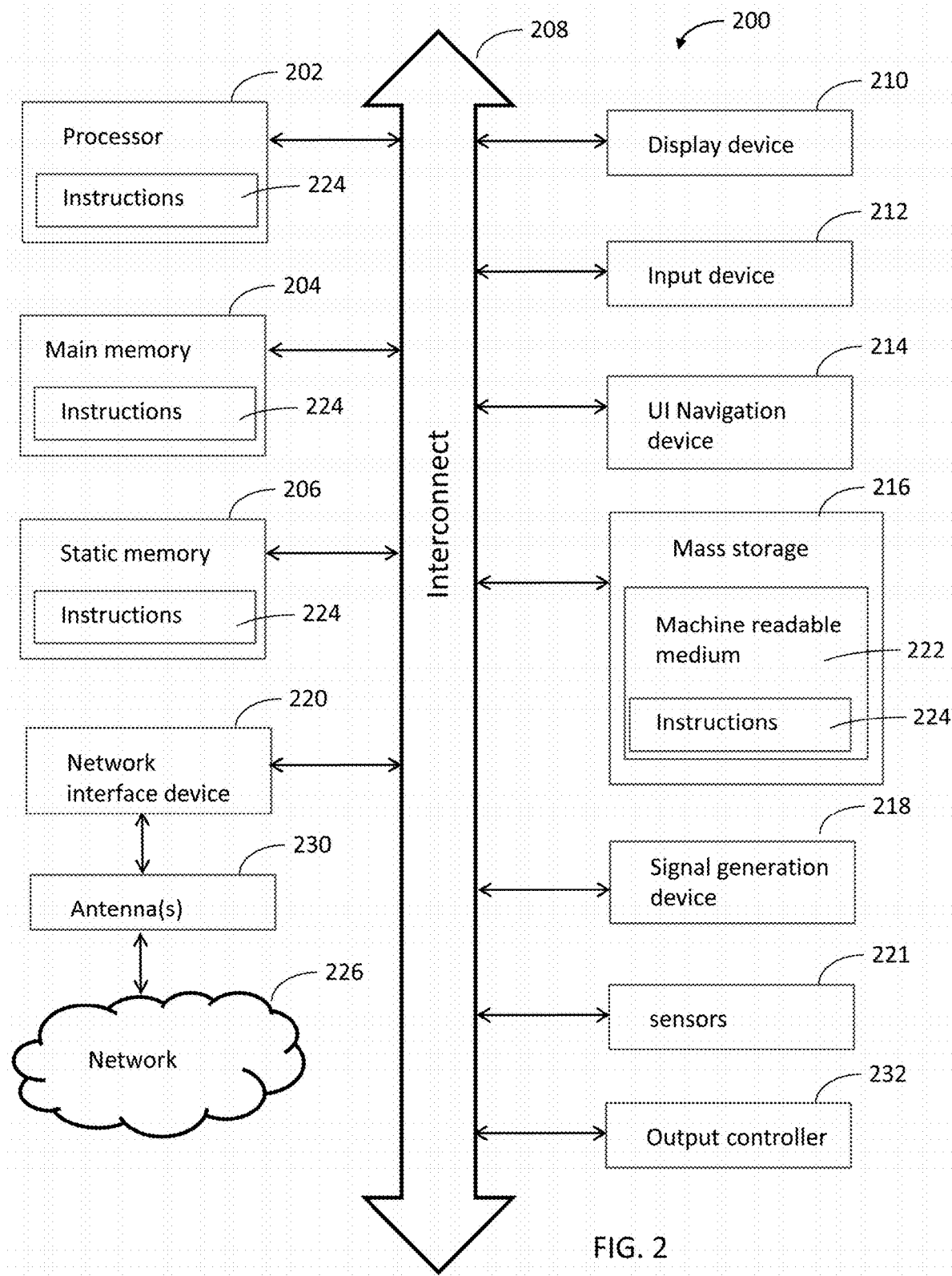
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, gNB-CU 106, CU-CP 107, CU-UP 108, gNB-DU 109, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
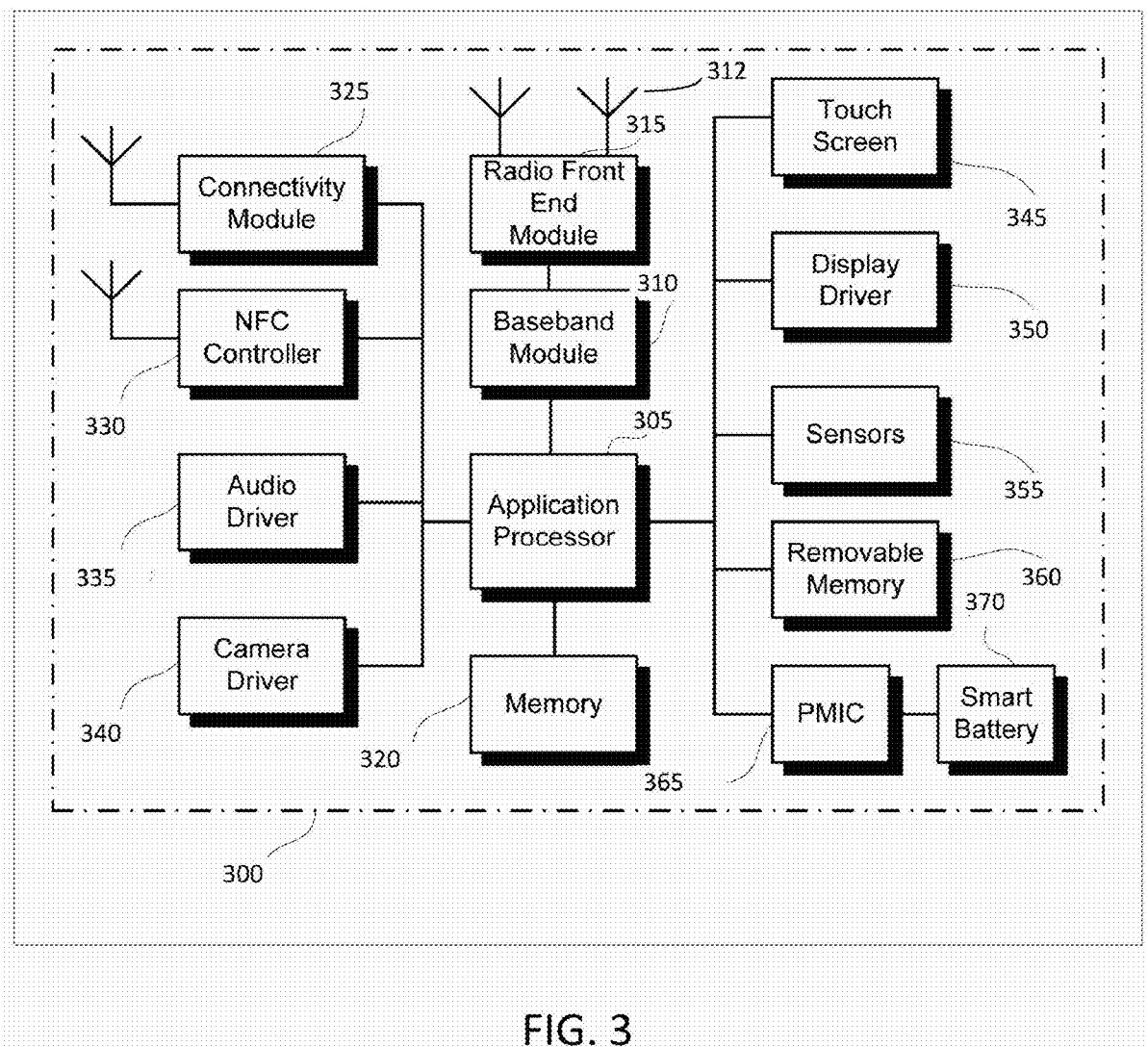
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (10), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
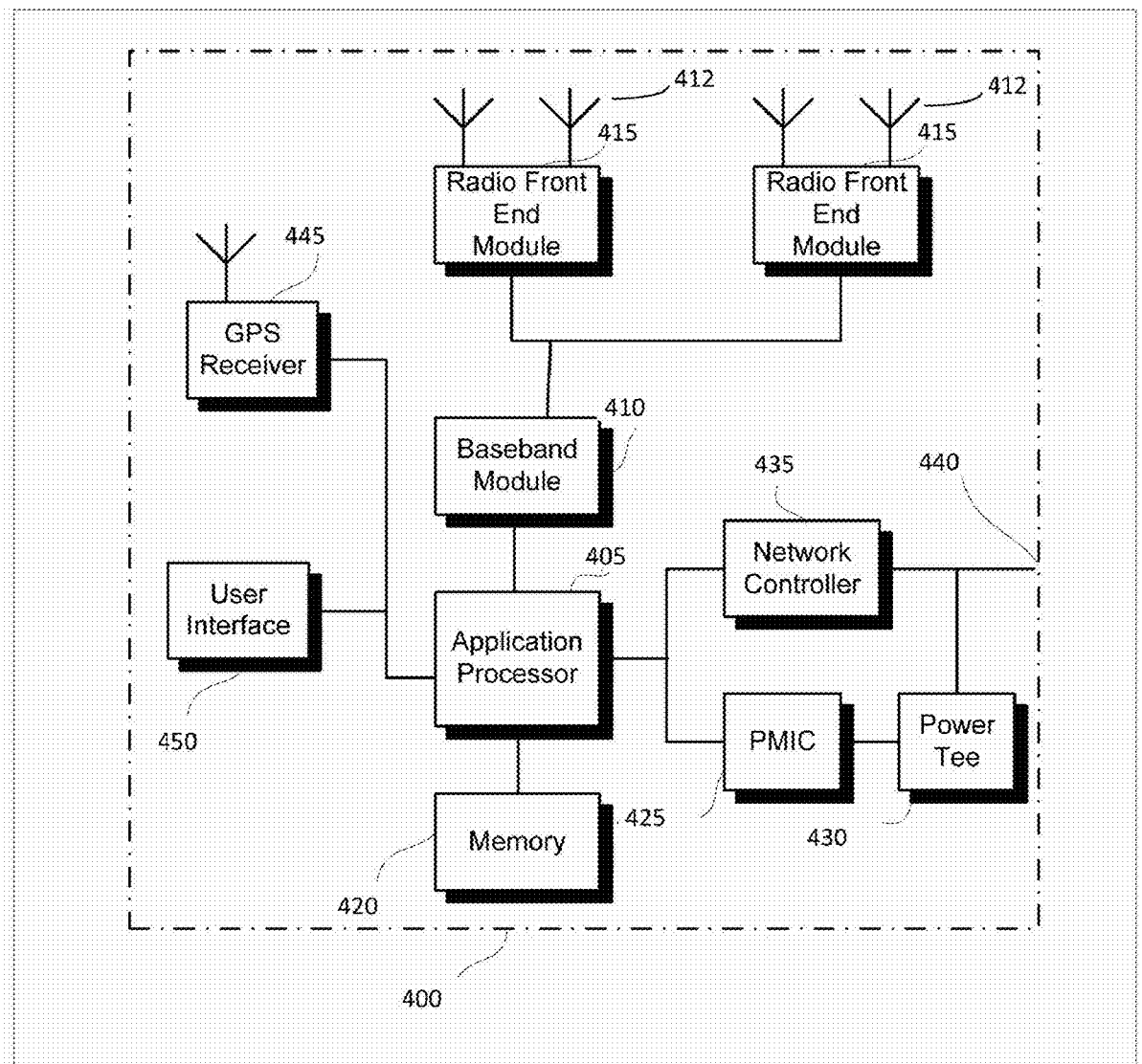
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a gNB-CU 106, an apparatus of a gNB-CU 106, a CU-CP 107, an apparatus of a CU-CP 107, a CU-CU 108, an apparatus of a CU-CU 108, a gNB-DU 109 an apparatus of a gNB-DU 109, a base station and/or an apparatus of a base station may include one or more of the components shown in one or more of FIGS. 2, 4, and 5. In some embodiments, such an eNB 104, gNB 105, gNB-CU 106, CU-CP 107, CU-UP 108, gNB-DU 109, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
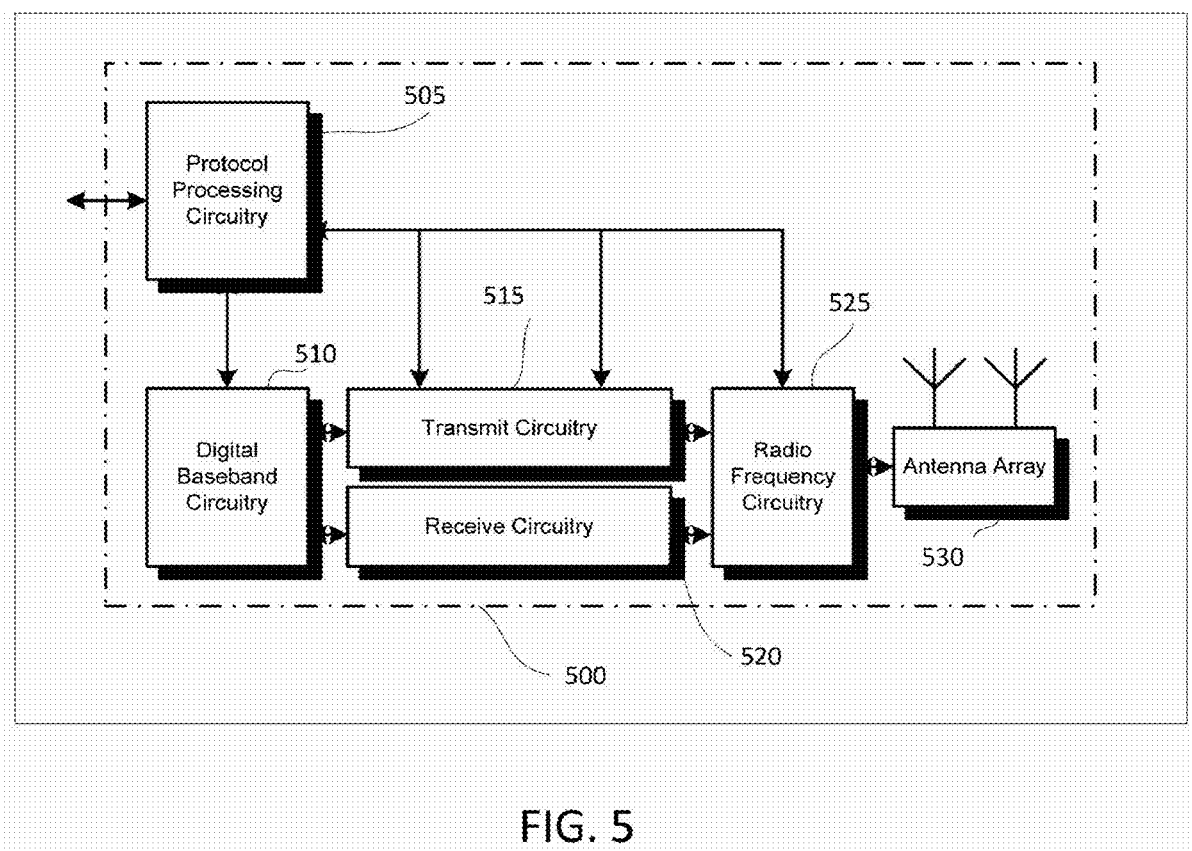
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, gNB-CU 106, CU-CP 107, CU-UP 108, gNB-DU 109, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, gNB-CU 106, CU-CP 107, CU-UP 108, gNB-DU 109, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, gNB-CU 106, CU-CP 107, CU-UP 108, gNB-DU 109, user device 300, base station 400, machine 200 and/or other device described herein may be configured to operate in accordance with 3GPP standards, although the scope of the embodiments is not limited in this respect. In some embodiments, the UE 102, eNB 104, gNB 105, gNB-CU 106, CU-CP 107, CU-UP 108, gNB-DU 109, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, gNB-CU 106, CU-CP 107, CU-UP 108, gNB-DU 109, user device 300, base station 400, machine 200 and/or other device described herein may be configured to operate according to other protocols or standards, including IEEE 802.11 or other IEEE standards. In some embodiments, the UE 102, eNB 104, gNB 105, gNB-CU 106, CU-CP 107, CU-UP 108, gNB-DU 109, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, gNB-CU 106, CU-CP 107, CU-UP 108, gNB-DU 109, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, gNB-CU 106, CU-CP 107, CU-UP 108, gNB-DU 109, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB. In addition, techniques and operations described herein that refer to the gNB-CU 106, may be applicable to an apparatus of a gNB-CU. In addition, techniques and operations described herein that refer to the CU-CP 107 may be applicable to an apparatus of a CU-CP. In addition, techniques and operations described herein that refer to the CU-UP 108 may be applicable to an apparatus of a CU-UP. In addition, techniques and operations described herein that refer to the gNB-DU 109 may be applicable to an apparatus of a gNB-DU.

It should be noted that some of the descriptions herein may refer to performance of operations, methods and/or techniques by elements such as the gNB 105, gNB-CU 106, CU-CP 107, CU-UP 108 and/or gNB-DU 109. Such references are not limiting, however. One or more of the operations, methods and/or techniques may be performed by one or more other entities, in some embodiments.

Figure 6:
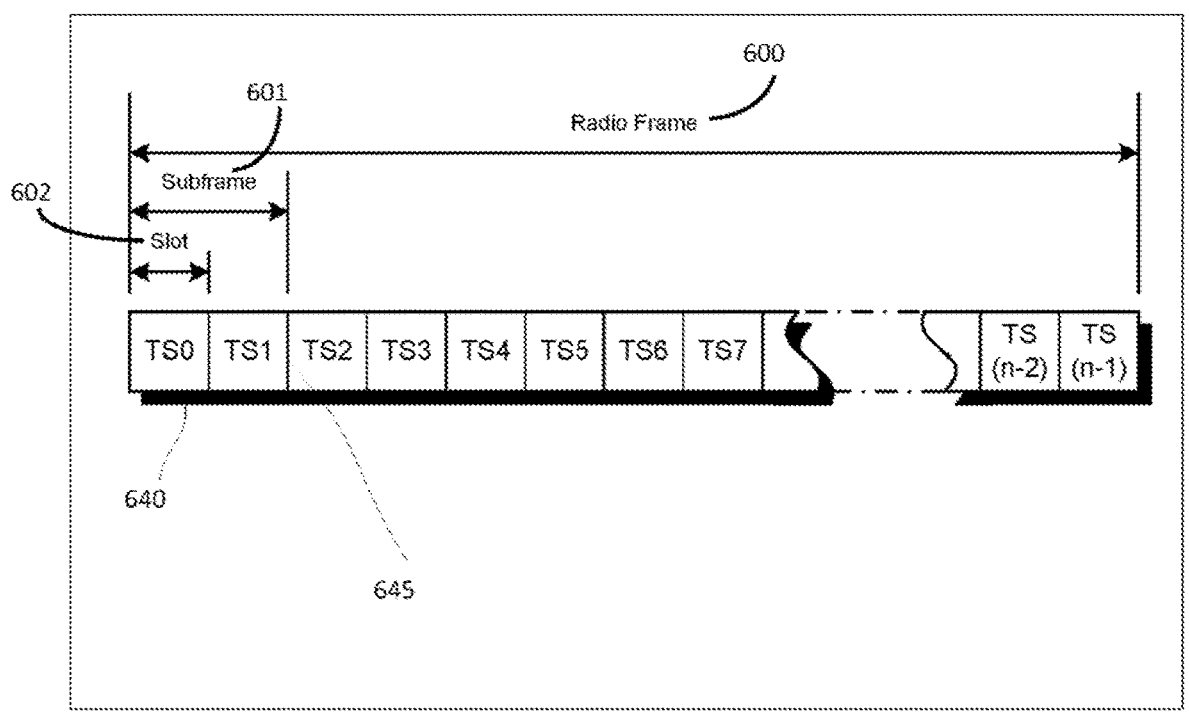
FIG. 6 illustrates an example of a radio frame structure in accordance with some embodiments.
Figures 7A, 7B:
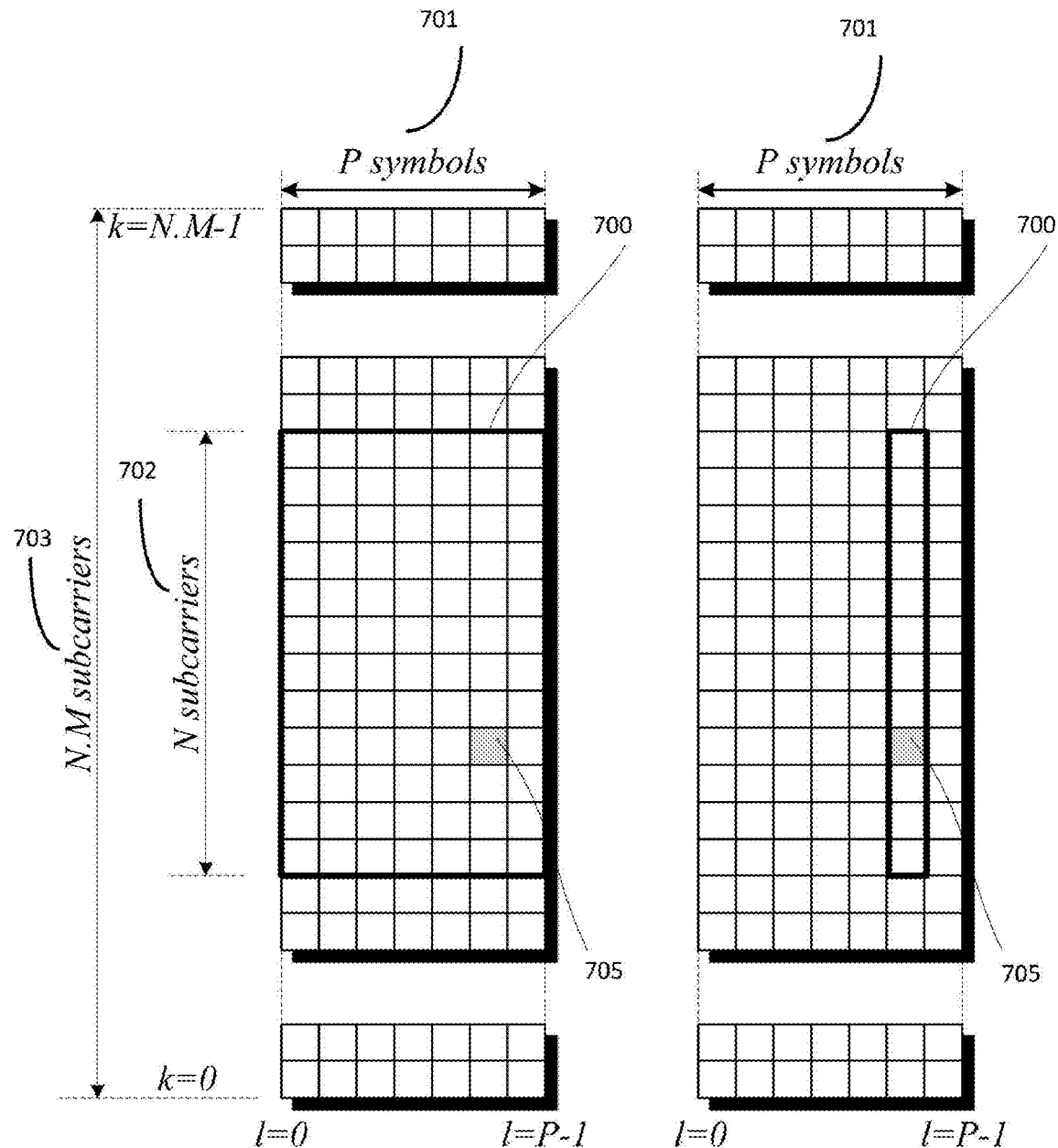
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a subcomponent of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, 1) where k is the index number of subcarrier, in the range 0 to N.M−1 (as indicated by 703), where N is the number of subcarriers in a resource block, and M is the number of resource blocks spanning a component carrier in the frequency domain.

In accordance with some embodiments, a gNB 105 may be configurable to operate as a source gNB 105. The gNB 105 may be configured with logical nodes including a gNB central unit (gNB-CU) 106 and a gNB distributed unit (gNB-DU) 109. The gNB-CU 106 may comprise a gNB-CU control plane (gNB-CU-CP) 107 for control-plane functionality, and a gNB-CU user plane (gNB-CU-UP) 108 for user-plane functionality. The gNB 105 may transfer, from the gNB-CU-CP 107 to a target gNB 105, an Xn handover request message to initiate a handover of a UE 102 from the source gNB 105 to the target gNB 105. The gNB 105 may receive, from the target gNB 105, an Xn handover request acknowledgement message for the handover of the UE 102. The gNB 105 may transfer, from the gNB-CU-CP 107 to the gNB-DU 109, an F1 UE context modification request message to indicate that the gNB-DU 109 is to stop transmission of downlink data to the UE 102. The gNB 105 may transfer, from the gNB-DU 109 to the gNB-CU-UP 108, a downlink data delivery status (DDDS) message to indicate that the gNB-CU-UP 108 is to stop transfer, to the gNB-DU 109, of downlink data intended for the UE 102. The gNB 105 may transfer, from the gNB-DU 109 to the gNB-CU-CP 107, an F1 UE context modification response message to acknowledge the F1 UE context modification request message. These embodiments are described in more detail below.

Figure 8:
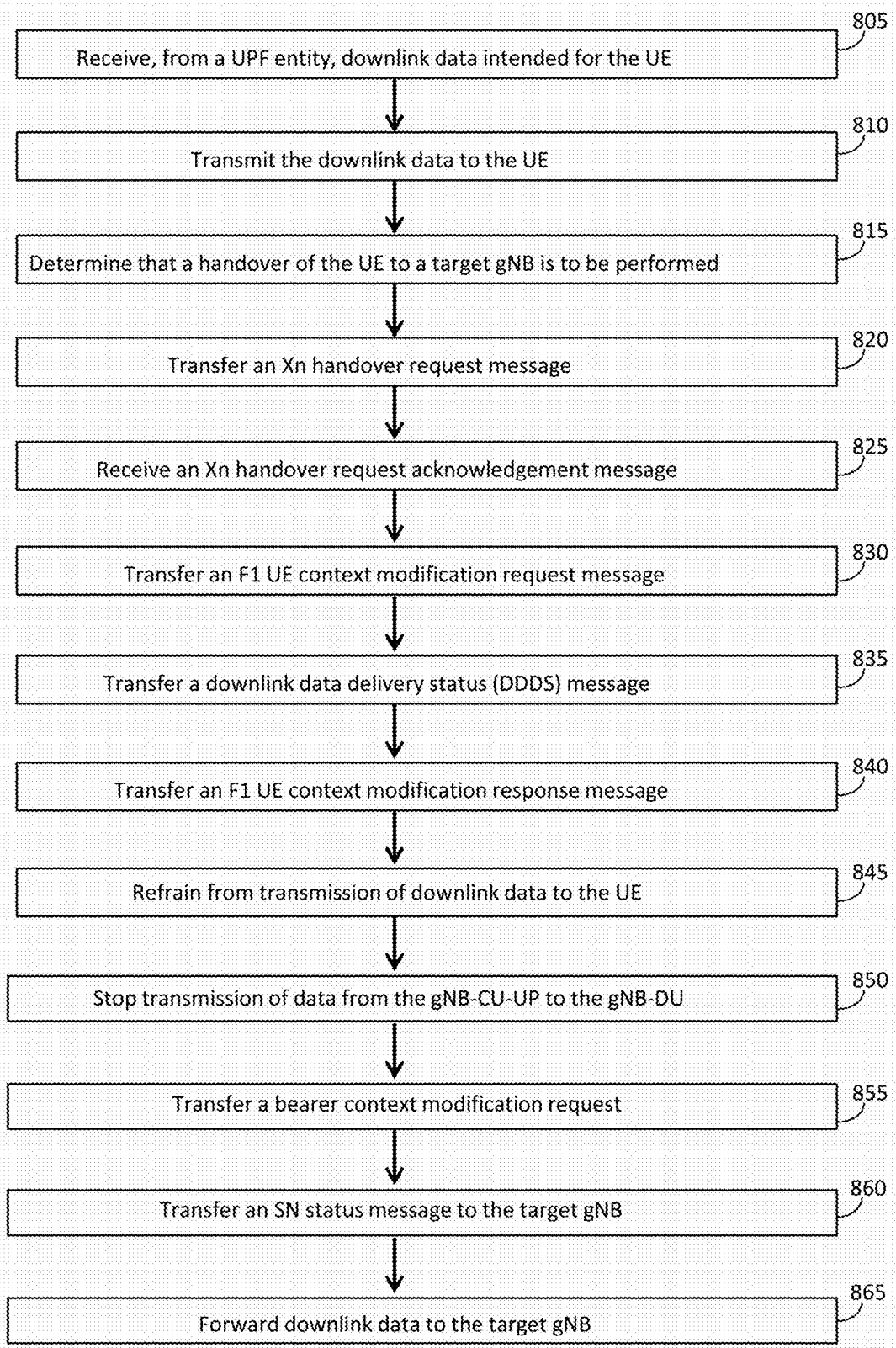
FIG. 8 illustrates the operation of a method of communication in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the methods 800 are not necessarily limited to the chronological order that is shown in FIG. 8. In describing the method 800, reference may be made to one or more figures, although it is understood that the method 800 may be practiced with any other suitable systems, interfaces and components.

The method 800 and other methods described herein may refer to eNBs 104, gNBs 105, components of the gNB (such as 106-109) and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the method 800 and other methods described herein may be practiced by wireless devices configured to operate in other suitable types of wireless communication systems, including systems configured to operate according to various IEEE standards such as IEEE 802.11.

The method 800 may also be applicable to an apparatus of a gNB 105, an apparatus of an eNB 104, an apparatus of a gNB-CU 106, an apparatus of a CU-CP 107, an apparatus of a CU-UP 108, an apparatus of a gNB-DU 109 and/or an apparatus of another device described above.

It should also be noted that embodiments are not limited by references herein (such as in descriptions of the method 800 and/or other descriptions herein) to transfer, transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transfer and/or transmission. The transfer and/or transmission may be performed by an interface, a transceiver and/or other component, in some cases. In some embodiments, such an element may be decoded, detected or otherwise processed by the processing circuitry (such as by the baseband processor). The element may be received by an interface, transceiver and/or other component, in some cases. In some embodiments, the processing circuitry and the interface may be included in a same apparatus. The scope of embodiments is not limited in this respect, however, as the interface may be separate from the apparatus that comprises the processing circuitry, in some embodiments. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of those elements, and is also not limited to usage of elements that are included in standards, however. For instance, although an operation may include usage of a message in descriptions herein, it is understood that the same operation and/or similar operation may use a different message, in some embodiments.

In some embodiments, a gNB 105 may perform one or more operations of the method 800, but embodiments are not limited to performance of the method 800 and/or operations of it by the gNB 105. In some embodiments, one or more components of the gNB 105 (including but not limited to the gNB-CU 106, CU-CP 107, CU-UP 108 and/or gNB-DU 109) may perform one or more operations of the method 800. For instance, the gNB-CU 106 may perform one or more operations and the gNB-DU 109 may perform one or more operations, in some embodiments. Embodiments are not limited to performance of the method 800 by a disaggregated gNB 105 and/or components of a disaggregated gNB 105. In some embodiments, a gNB 105 that is not necessarily a disaggregated gNB 105, may perform one or more operations of the method 800.

In some embodiments, the User Plane Function (UPF) entity may perform one or more operations that may be the same as one or more operations of the method 800 or the same as one or more operations described herein. In some embodiments, the UPF entity may perform one or more operations that may be similar to one or more operations of the method 800 or similar to one or more operations described herein. In some embodiments, the UPF entity may perform one or more operations that may be reciprocal to one or more operations of the method 800 or reciprocal to one or more operations described herein. For instance, the UPF entity may transmit/transfer downlink data to the gNB 105 and/or gNB-CU 106 (such as the downlink data of operation 805 and/or other).

In some embodiments, the UE 102 may perform one or more operations that may be the same as one or more operations of the method 800 or the same as one or more operations described herein. In some embodiments, the UE 102 may perform one or more operations that may be similar to one or more operations of the method 800 or similar to one or more operations described herein. In some embodiments, the UE 102 may perform one or more operations that may be reciprocal to one or more operations of the method 800 or reciprocal to one or more operations described herein. For instance, the UE 102 may receive downlink data from the gNB 105 and/or gNB-DU 109 (such as the downlink data of operation 810 and/or other).

In some embodiments, the gNB 105 may be configurable to operate as a source gNB 105. Some descriptions herein may refer to a "source gNB" and/or a "target gNB" for clarity, although such references are not limiting. For instance, a handover of the UE 102 from a first gNB 105 to a second gNB 105 may be performed. For clarity, the first gNB 105 may be referred to as a source gNB 105, and the second gNB 105 may be referred to as a target gNB 105. In some embodiments, a gNB 105 may be configurable to operate as a target gNB 105. In some embodiments, a gNB 105 may be configurable to operate as a source gNB 105 and/or a target gNB 105. For instance, when a handover of the UE 102 from a gNB 105 is performed, the gNB 105 may be referred to as a source gNB 105; when a handover of the UE 102 to the gNB 105 is performed, the gNB 105 may be referred to as a target gNB 105.

One or more of the operations described herein that are performed by the source gNB 105 may be performed by a gNB 105, which may not necessarily be a source gNB 105 or a target gNB 105, in some embodiments. In addition, some or all of the descriptions of the source gNB 105 (such as components that the source gNB 105 includes) may be applicable to a gNB 105, which may not necessarily be a source gNB 105 or a target gNB 105, in some embodiments.

The source gNB 105 may be configured with logical nodes, including one or more of: a gNB central unit (gNB-CU) 107, a gNB distributed unit (gNB-DU) 109, and/or other component(s). The gNB-CU 107 may comprise one or more of: a gNB-CU control plane (gNB-CU-CP) 107 (which may be for control-plane functionality and/or other functionality), a gNB-CU user plane (gNB-CU-UP) 108 (which may be for user-plane functionality and/or other functionality), and/or other component(s).

In some embodiments, the gNB-CU-CP 107 may be configured to communicate with the gNB-CU-UP 108 over an E1 interface. In some embodiments, the gNB-CU-UP 108 may be configured to communicate user plane messages with the gNB-DU 109 over an F1 user-plane interface (F1-U). In some embodiments, the gNB-CU-CP 107 may be configured to communicate control plane messages with the gNB-DU 109 over an F1 control plane interface (F1-C).

In some embodiments, the gNB-DU 109 may be configured to host one or more of: radio-link control (RLC), medium-access control (MAC) and physical (PHY) layers of the gNB 105. In some embodiments, the gNB-DU 109 may be configured to communicate with the UE 102 over a user interface (uu).

In some embodiments, one or more of the following may be arranged to operate in accordance with a new radio (NR) protocol: the source gNB 105, one or more components of the source gNB 105, the gNB 105, one or more components of the gNB 105, the UE 102 and/or other device(s).

At operation 805, the source gNB 105 and/or a component of the source gNB 105 may receive downlink data, including but not limited to downlink data intended for the UE 102. In some embodiments, the gNB-CU-UP 108 may receive the downlink data from a user plane function (UPF) entity, although the scope of embodiments is not limited in this respect.

At operation 810, the source gNB 105 and/or a component of the source gNB 105 may transmit the downlink data to the UE 102. In some embodiments, the gNB-DU 109 may transmit the downlink data to the UE 102, although the scope of embodiments is not limited in this respect.

At operation 815, the source gNB 105 and/or a component of the source gNB 105 may determine that a handover of the UE 102 (from the source gNB 105 to a target gNB 105) is to be performed.

At operation 820, the source gNB 105 and/or a component of the source gNB 105 transfer an Xn handover request message. In some embodiments, the source gNB 105 and/or a component of the source gNB 105 may transfer the Xn handover request message from the gNB-CU-CP 107 to a target gNB 105. In some embodiments, the source gNB 105 and/or a component of the source gNB 105 may transfer the Xn handover request message to initiate the handover of the UE 102 from the source gNB 105 to the target gNB 105.

At operation 825, the source gNB 105 and/or a component of the source gNB 105 may receive an Xn handover request acknowledgement message. In some embodiments, the source gNB 105 and/or a component of the source gNB 105 may receive the Xn handover request acknowledgement message at the gNB-CU-CP 107.

At operation 830, the source gNB 105 and/or a component of the source gNB 105 may transfer an F1 UE context modification request message. In some embodiments, the source gNB 105 and/or a component of the source gNB 105 may transfer the F1 UE context modification request message from the gNB-CU-CP 107 to the gNB-DU 109. In some embodiments, the source gNB 105 and/or a component of the source gNB 105 may transfer the F1 UE context modification request message to indicate that the gNB-DU 109 is to stop transmission of downlink data to the UE 102, although the scope of embodiments is not limited in this respect.

At operation 835, the source gNB 105 and/or a component of the source gNB 105 may transfer a downlink data delivery status (DDDS) message. In some embodiments, the source gNB 105 and/or a component of the source gNB 105 may transfer the DDDS message from the gNB-DU 109 to the gNB-CU-UP 108. In some embodiments, the source gNB 105 and/or a component of the source gNB 105 may transfer the DDDS message to indicate that the gNB-CU-UP 108 is to stop transfer, to the gNB-DU 109, of downlink data intended for the UE 102, although the scope of embodiments is not limited in this respect.

In some embodiments, the source gNB 105 and/or a component of the source gNB 105 may encode the DDDS message to include a cause value field. In some embodiments, the source gNB 105 and/or a component of the source gNB 105 may encode the cause value field to: a predetermined value to indicate a stoppage of transmission of downlink data to the UE 102, and another predetermined value to indicate a stoppage of transmission of uplink data from the UE 102.

In some embodiments, the source gNB 105 and/or a component of the source gNB 105 may further encode the cause value field to another predetermined value to indicate both the stoppage of the transmission of the downlink data to the UE 102 and the stoppage of the transmission of the uplink data from the UE 102.

In some embodiments, the source gNB 105 and/or a component of the source gNB 105 may further encode the cause value field to one or more of: another predetermined value to indicate an outage of a radio link, another predetermined value to indicate a resumption of the radio link, another predetermined value to indicate an outage of an uplink radio link, another predetermined value to indicate a resumption of the uplink radio link, another predetermined value to indicate an outage of a downlink radio link, and another predetermined value to indicate a resumption of the downlink radio link.

In some embodiments, the source gNB 105 and/or a component of the source gNB 105 may further encode the DDDS message to further include one or more of: a highest sequence number (SN) of a packet data convergence protocol (PDCP) packet that was successfully delivered to the UE 102; a highest SN of a PDCP packet that was transmitted to the UE 102; and/or other.

In some embodiments, the source gNB 105 and/or a component of the source gNB 105 (including but not limited to the gNB-DU 109) may transfer the DDDS message to alleviate dropping of downlink data intended for the UE 102 before the transfer of the bearer context modification request.

At operation 840, the source gNB 105 and/or a component of the source gNB 105 may transfer an F1 UE context modification response message. In some embodiments, the source gNB 105 and/or a component of the source gNB 105 may transfer the F1 UE context modification message from the gNB-DU 109 to the gNB-CU-CP 108. In some embodiments, the source gNB 105 and/or a component of the source gNB 105 may transfer the F1 UE context modification response message to acknowledge the F1 UE context modification request message, although the scope of embodiments is not limited in this respect.

In some embodiments, the source gNB 105 and/or one or more components of the source gNB 105 may transfer the F1 UE context modification request message, the DDDS message, and the F1 UE context modification response message as part of an F1 UE context modification procedure, although the scope of embodiments is not limited in this respect.

At operation 845, the source gNB 105 and/or a component of the source gNB 105 may refrain from transmission of downlink data to the UE 102. In some embodiments, the gNB-DU 109 may refrain from transmission of downlink data to the UE 102. In some embodiments, the gNB-DU 109 may refrain from transmission of downlink data to the UE 102 in response to reception of the F1 UE context modification request message at the gNB-DU 109, although the scope of embodiments is not limited in this respect.

At operation 850, the source gNB 105 and/or a component of the source gNB 105 may stop transfer/transmission of downlink data from the gNB-CU-UP 108 to the gNB-DU 109. In some embodiments, the gNB-CU-UP 108 may stop transfer/transmission of downlink data (intended for the UE 102) to the gNB-DU 109 in response to reception of the DDDS message, although the scope of embodiments is not limited in this respect.

At operation 855, the source gNB 105 and/or a component of the source gNB 105 may transfer a bearer context modification request. In some embodiments, the gNB-CU-CP 107 may transfer the bearer context modification request to the gNB-CU-UP 108. In some embodiments, the bearer context modification request may include information related to data forwarding (including but not limited to subsequent forwarding of downlink data intended for the UE 102 to the target gNB 105).

At operation 860, the source gNB 105 and/or a component of the source gNB 105 may transfer an SN status message to the target gNB 105. In some embodiments, the gNB-CU-CP 107 may transfer the SN status message to the target gNB 105. In some embodiments, the SN status message may indicate an SN of a downlink data packet for the UE 102.

At operation 865, the source gNB 105 and/or a component of the source gNB 105 may forward downlink data to the target gNB 105. In some embodiments, if additional downlink data intended for the UE 102 is received at the gNB-CU-UP 108 (such as from the UPF entity and/or other component), the additional downlink data may be forwarded from the gNB-CU-UP 108 to the target gNB 105 and/or a component of the target gNB 105 (including but not limited to a gNB-CU-UP 108 of the target gNB 105). In some embodiments, the gNB-CU-UP 108 may forward the additional downlink data if the additional downlink data is received after an event (including but not limited to the transfer of the SN status message), although the scope of embodiments is not limited in this respect.

In some embodiments, the source gNB 105 and/or a component of the source gNB 105 may transfer, from the gNB-CU-CP 107 to the gNB-DU 109, an F1 UE context modification request message to indicate that the gNB-DU 109 is to stop transmission of downlink data to a UE 102 before a handover of the UE 102 from the source gNB 105 to a target gNB 105. In some embodiments, the source gNB 105 and/or a component of the source gNB 105 may encode a DDDS message to indicate that the gNB-CU-UP 108 is to stop transfer, to the gNB-DU 109, of downlink data intended for the UE 102. In some embodiments, the source gNB 105 and/or a component of the source gNB 105 may encode a cause value field of the DDDS to: a predetermined value to indicate a stoppage of downlink data to the UE 102, and another predetermined value to indicate a stoppage of uplink data from the UE 102.

In some embodiments, the source gNB 105 and/or a component of the source gNB 105 may transfer, from the gNB-DU 109 to the gNB-CU-CP 107, an F1 UE context modification response message to acknowledge the F1 UE context modification request message.

In some embodiments, the source gNB 105 and/or a component of the source gNB 105 may encode the cause value field to other predetermined values to indicate one or more of: both the stoppage of the downlink data to the UE 102 and the stoppage of the uplink data from the UE 102, an outage or a resumption of a radio link, an outage or a resumption of an uplink radio link, and an outage or a resumption of a downlink radio link.

In some embodiments, the source gNB 105 and/or a component of the source gNB 105 may transfer, from the gNB-CU-CP 107 to a target gNB 105, an Xn handover request message to initiate the handover of the UE from the source gNB 105 to the target gNB 105. In some embodiments, the source gNB 105 and/or a component of the source gNB 105 may receive, from the target gNB 105, an Xn handover request acknowledgement message for the handover of the UE 102.

In some embodiments, the source gNB 105 and/or a component of the source gNB 105 may perform one or more of: transfer downlink data intended for UE 102 from the gNB-CU-UP 108 to the gNB-DU 109 for transmission to the UE 102; determine that a handover of the UE 102 from the source gNB 105 to a target gNB 105 is to be performed; transfer signaling to the target gNB 105 to indicate the handover; refrain from transmission of the downlink data from the gNB-DU 109 to the UE 102; transfer, from the gNB-DU 109 to the gNB-CU-UP 108, a DDDS message to indicate that the gNB-CU-UP 108 is to stop transfer, to the gNB-DU 109, of downlink data intended for the UE 102; receive the downlink data from a UPF entity.

In some embodiments, an apparatus of a source gNB 105 (and/or an apparatus of a gNB 105) may comprise memory. The memory may be configurable to store at least a portion of the Xn handover request message. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of downlink data. The apparatus may include a transceiver to transmit the downlink data. The transceiver may transmit and/or receive other blocks, messages and/or other elements.

Figure 16:
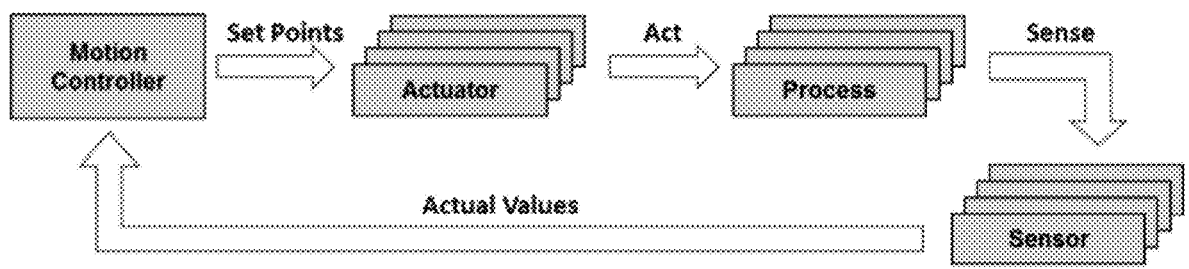
FIG. 16 illustrates example components in accordance with some embodiments.
Figure 17:
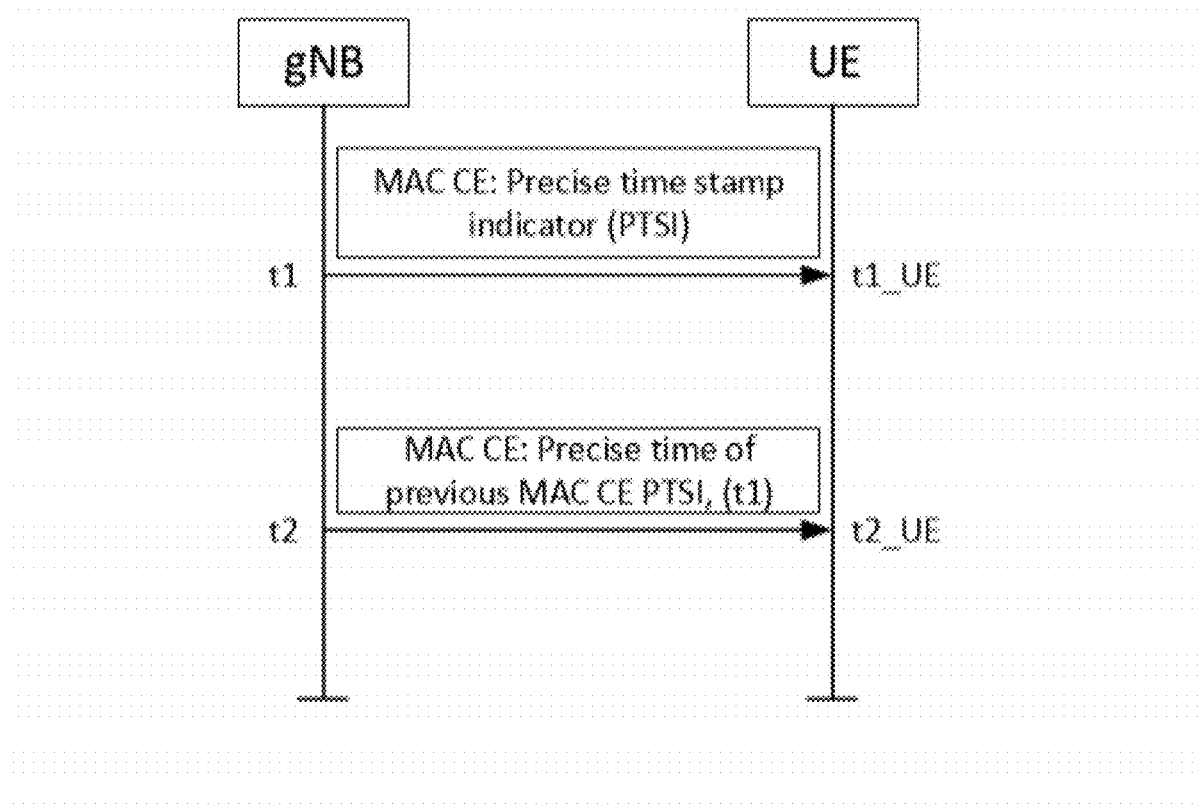
FIG. 17 illustrates example messages that may be exchanged in accordance with some embodiments.
Figure 18:
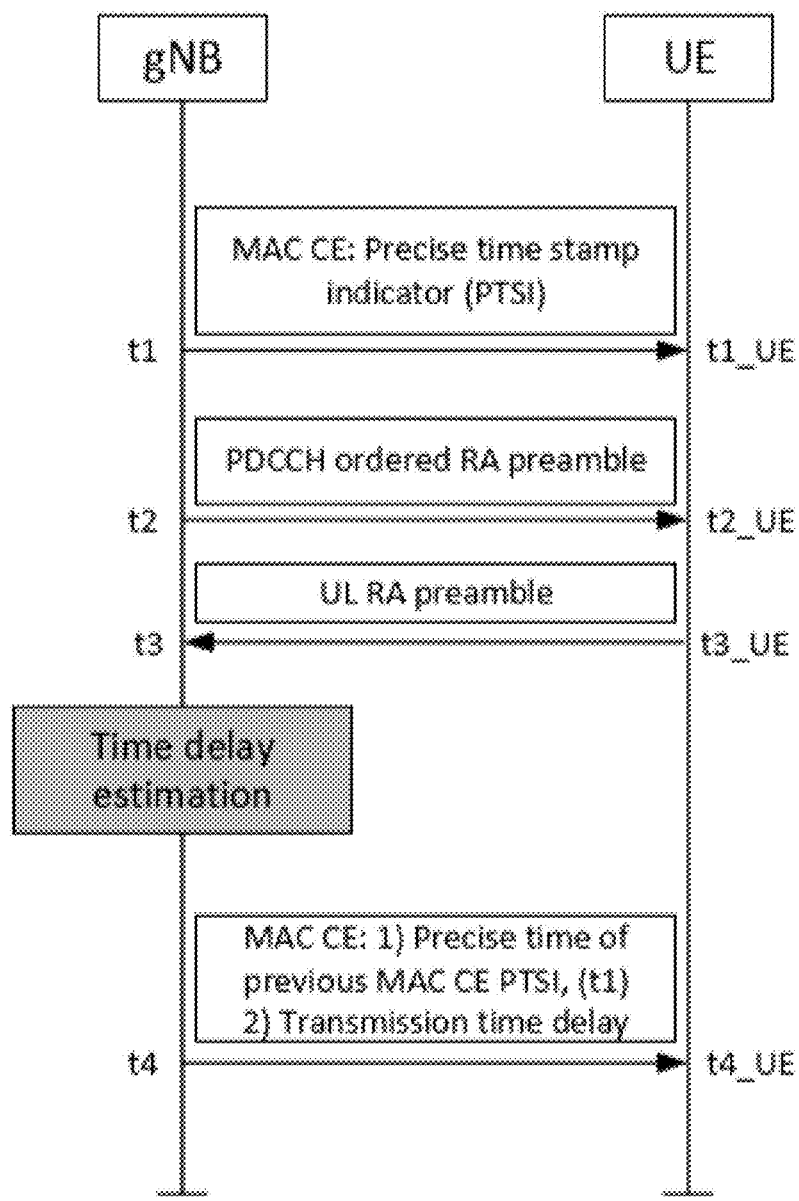
FIG. 18 illustrates example messages that may be exchanged in accordance with some embodiments.
Figure 19:
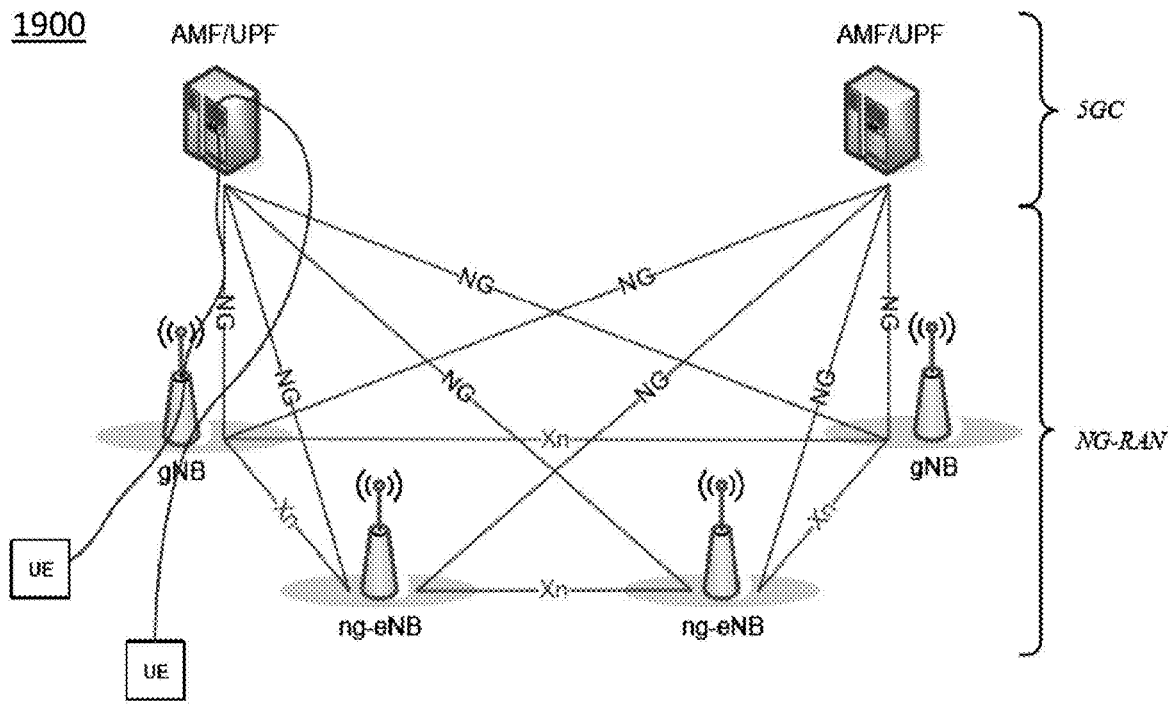
FIG. 19 illustrates an example network in accordance with some embodiments.
Figure 20:
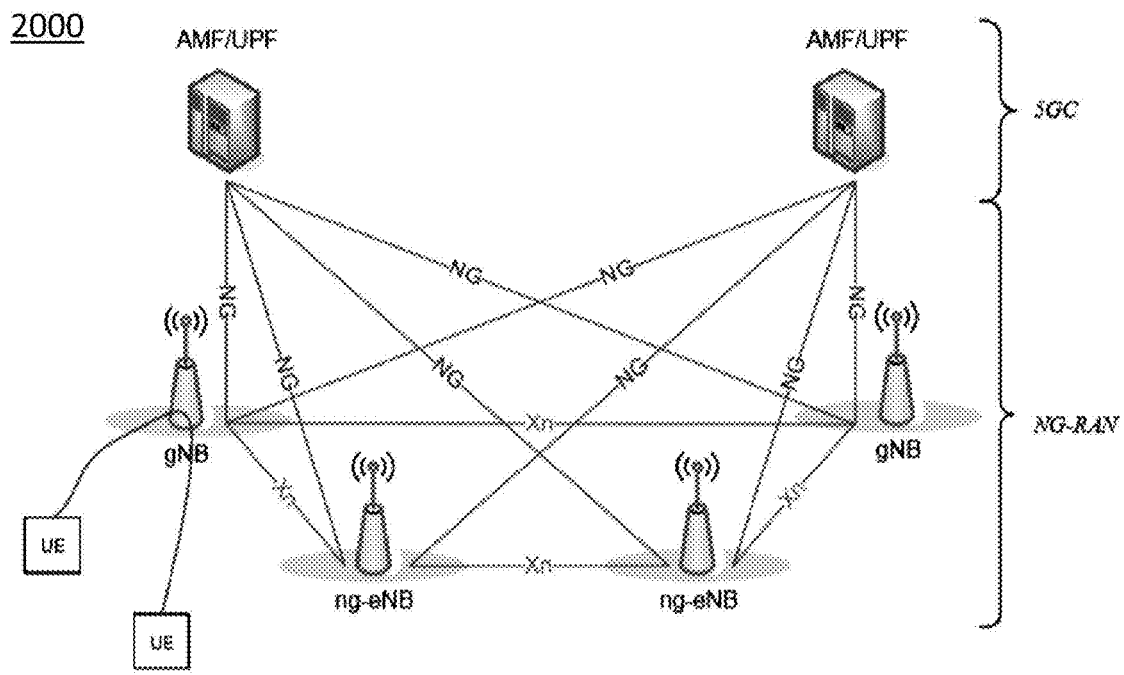
FIG. 20 illustrates an example network in accordance with some embodiments.
Figure 21:
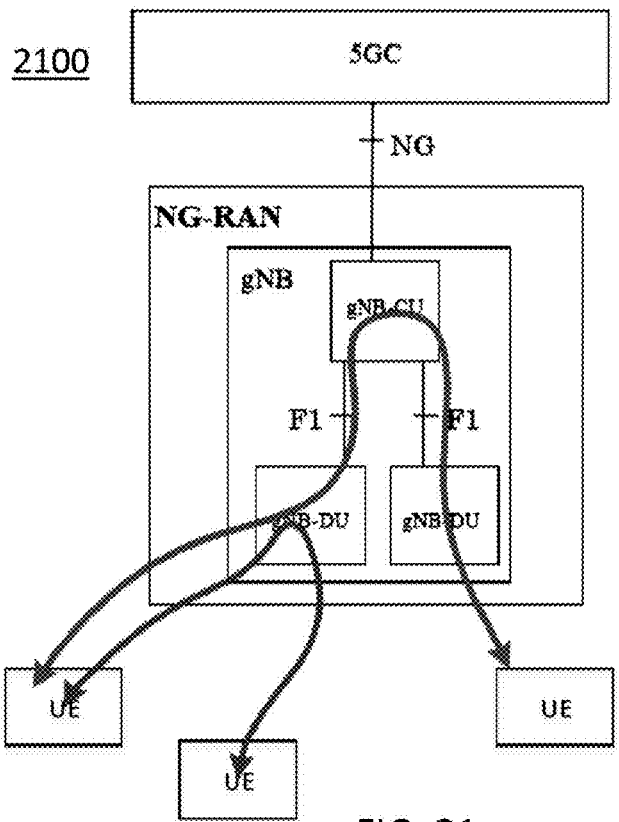
FIG. 21 illustrates example flows in accordance with some embodiments.
Figure 23:
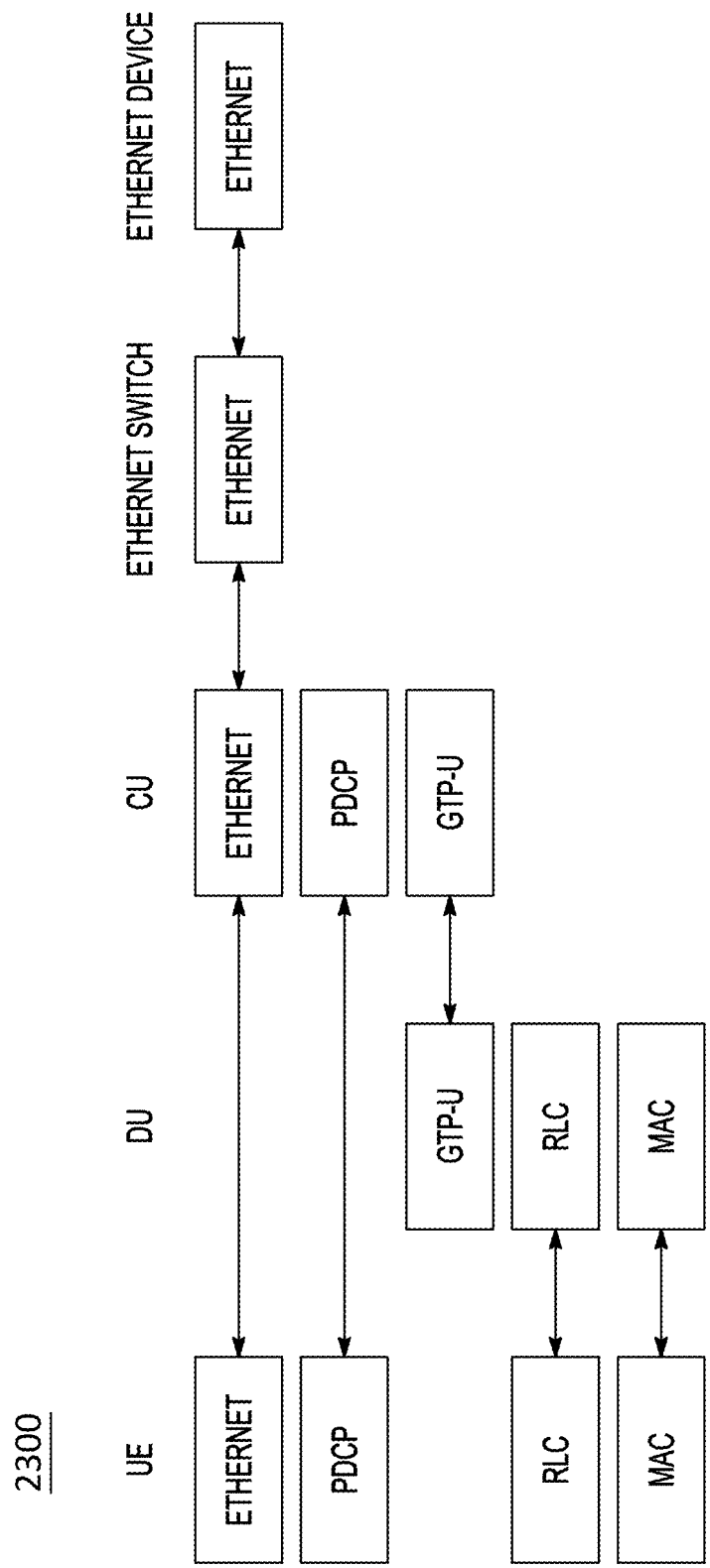
FIG. 23 illustrates an example arrangement of protocol layers in accordance with some embodiments.
Figure 24:
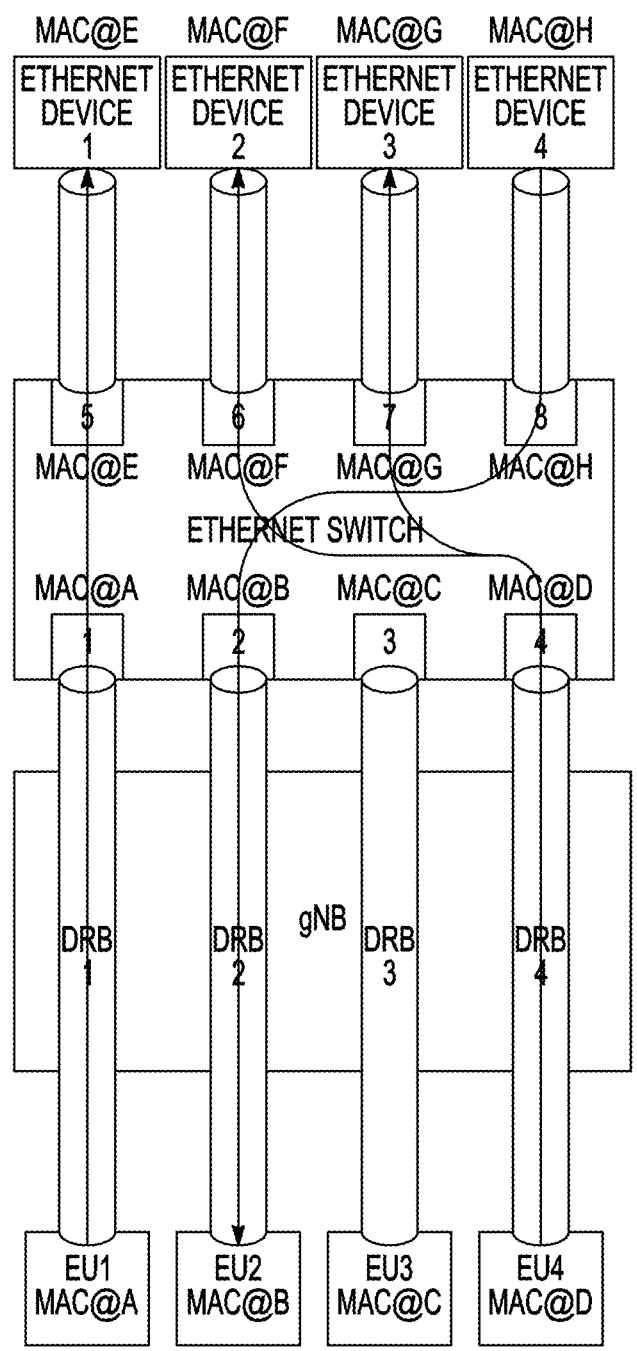
FIG. 24 illustrates example flows in accordance with some embodiments.
Figure 25:
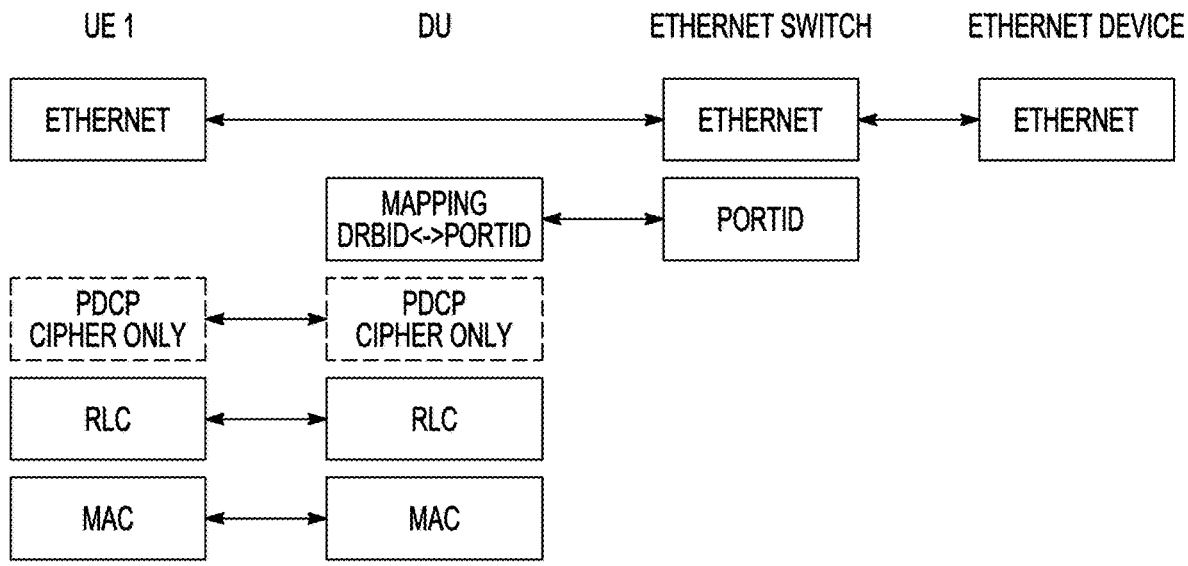
FIG. 25 illustrates an example arrangement of protocol layers in accordance with some embodiments.
Figure 26:
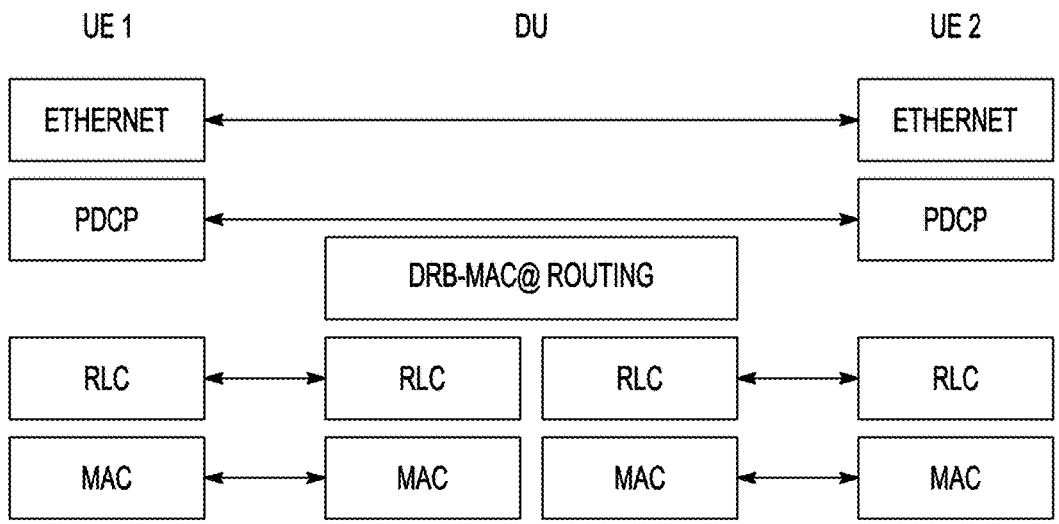
FIG. 26 illustrates an example arrangement of protocol layers in accordance with some embodiments.
Figure 31:
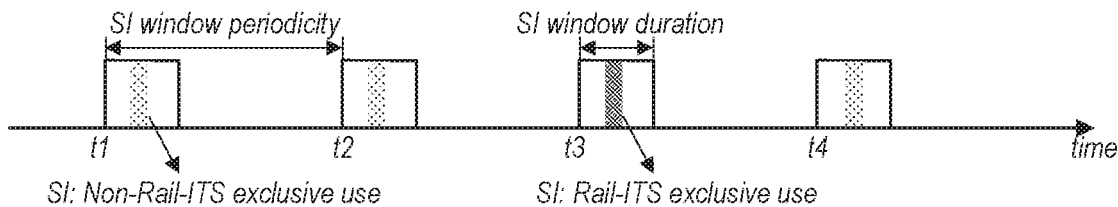
FIG. 31 illustrates example time windows in accordance with some embodiments.
Figure 32:
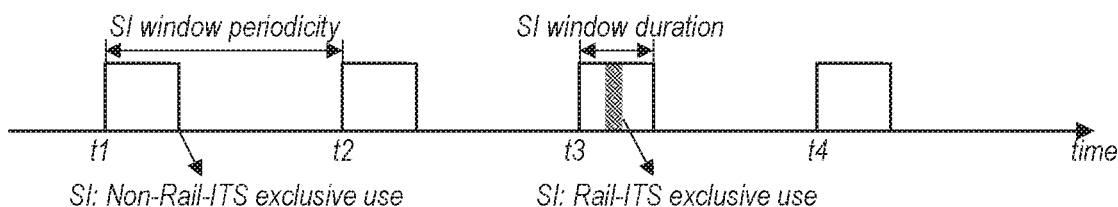
FIG. 32 illustrates example time windows in accordance with some embodiments.
Figure 33:
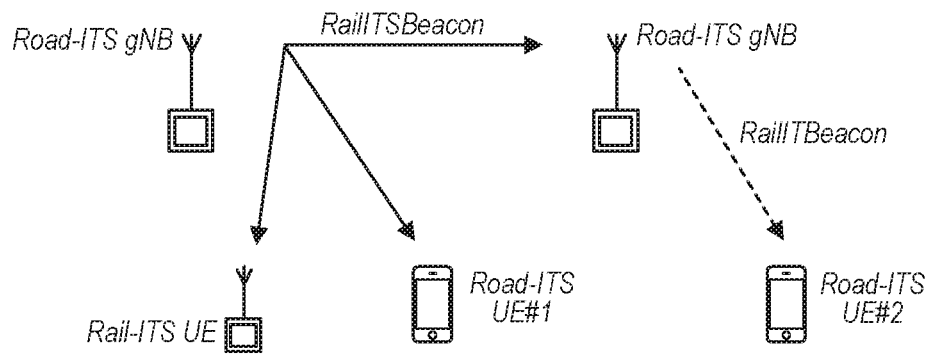
FIG. 33 illustrates an example scenario related to rail ITS in accordance with some embodiments.
Figure 34:
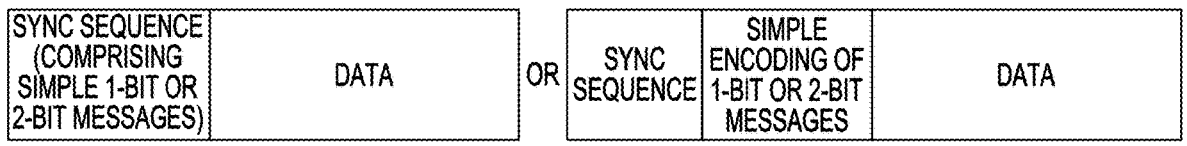
FIG. 34 illustrates example elements that may be exchanged in accordance with some embodiments.

FIGS. 9, 11, 12, and 14 illustrate example operations in accordance with some embodiments. FIG. 10 illustrates example components of a Next Generation Node-B (gNB) in accordance with some embodiments. FIGS. 13 and 15 illustrates an example element in accordance with some embodiments. FIG. 16 illustrates example components in accordance with some embodiments. FIGS. 17-18 illustrate example messages that may be exchanged in accordance with some embodiments. FIGS. 19-20 illustrates example networks in accordance with some embodiments. FIGS. 21, 22, 24, and 27 illustrate example flows in accordance with some embodiments. FIGS. 23, 25, and 26 illustrate example arrangements of protocol layers in accordance with some embodiments. FIG. 28 illustrates example components in accordance with some embodiments. FIGS. 29, 30, 33, and 35 illustrate example scenarios related to rail ITS in accordance with some embodiments. FIGS. 31 and 32 illustrates example time windows in accordance with some embodiments. FIG. 34 illustrates example elements that may be exchanged in accordance with some embodiments.

Figure 40:
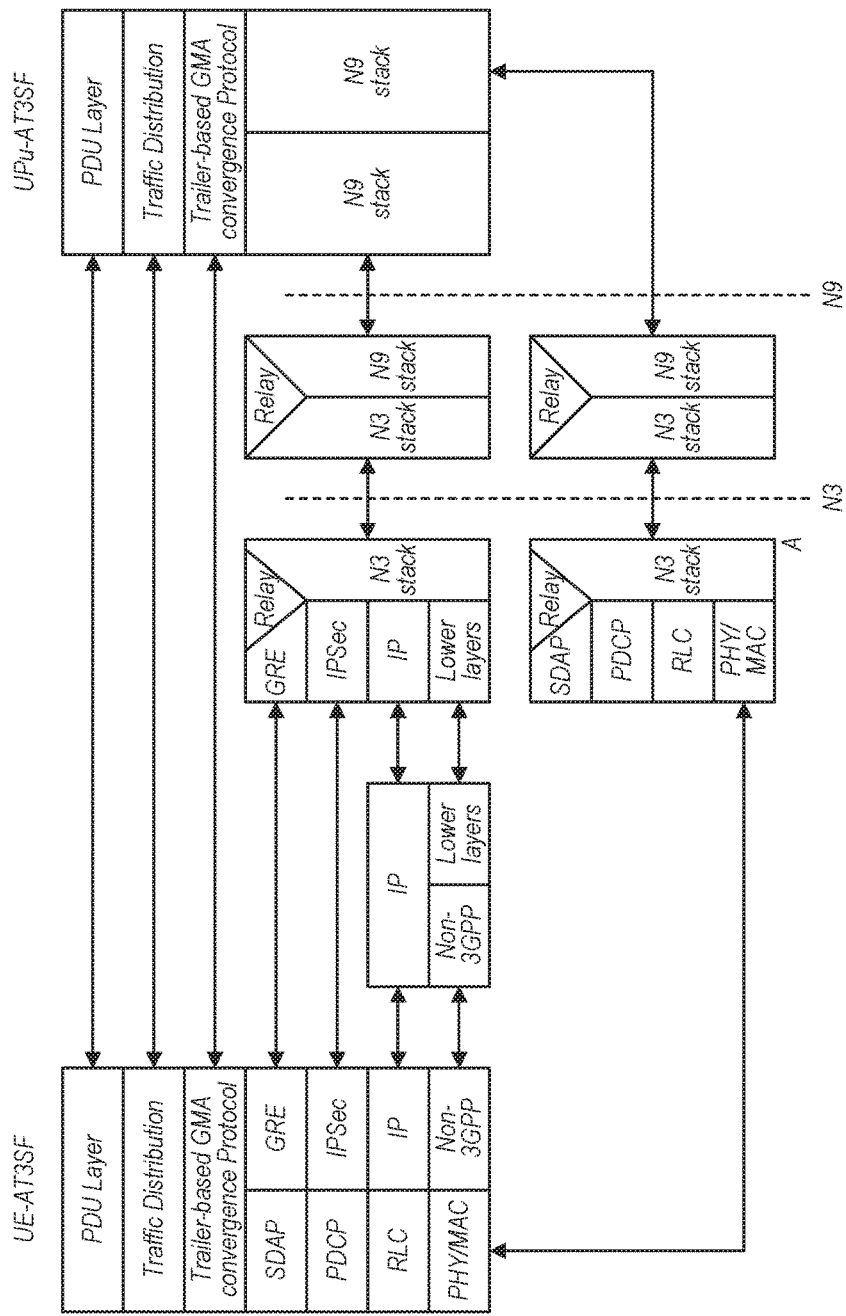
FIG. 40 illustrates example protocol layers in accordance with some embodiments.
Figure 41:
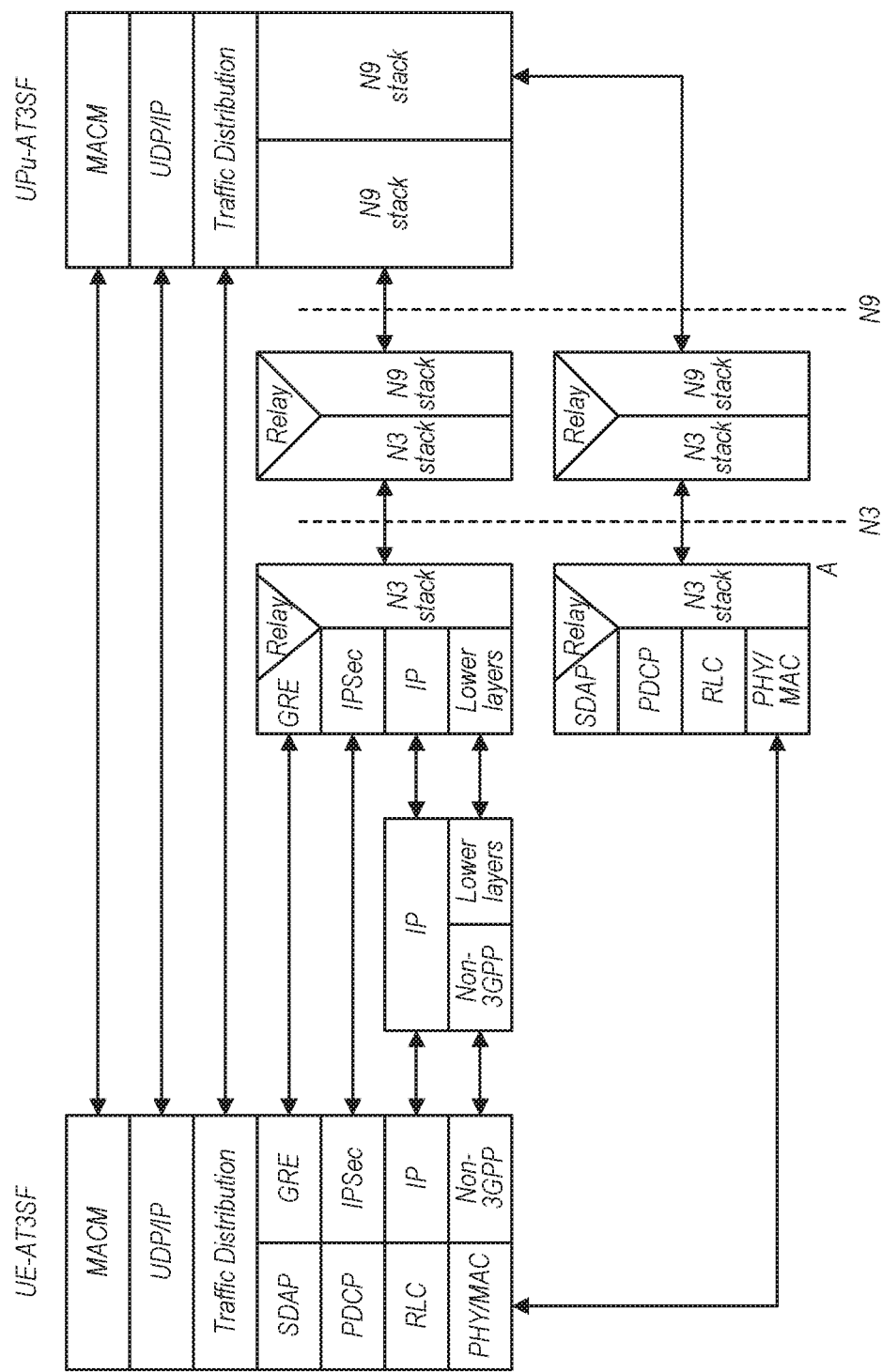
FIG. 41 illustrates example protocol layers in accordance with some embodiments.
Figure 42:
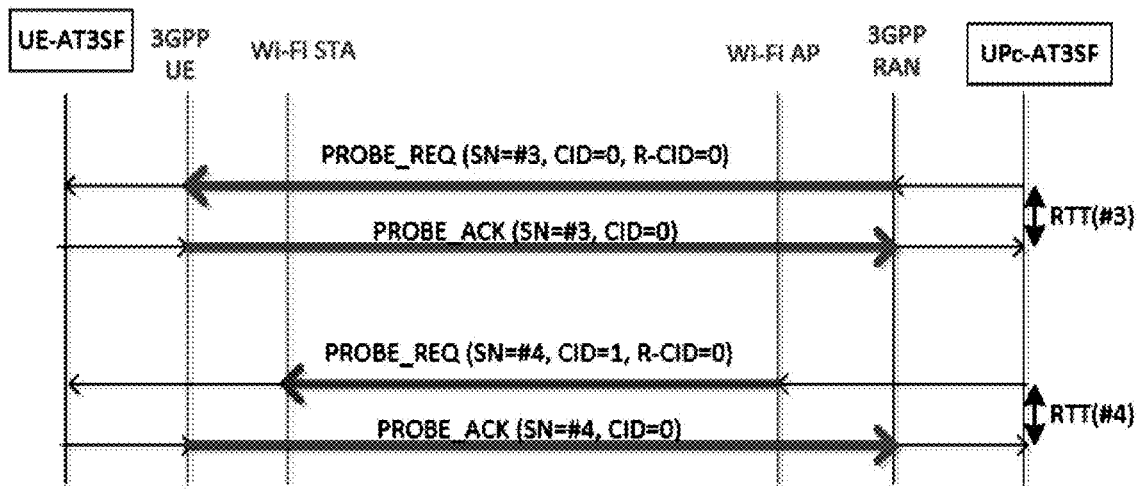
FIG. 42 illustrates example messages that may be exchanged in accordance with some embodiments.
Figure 43:
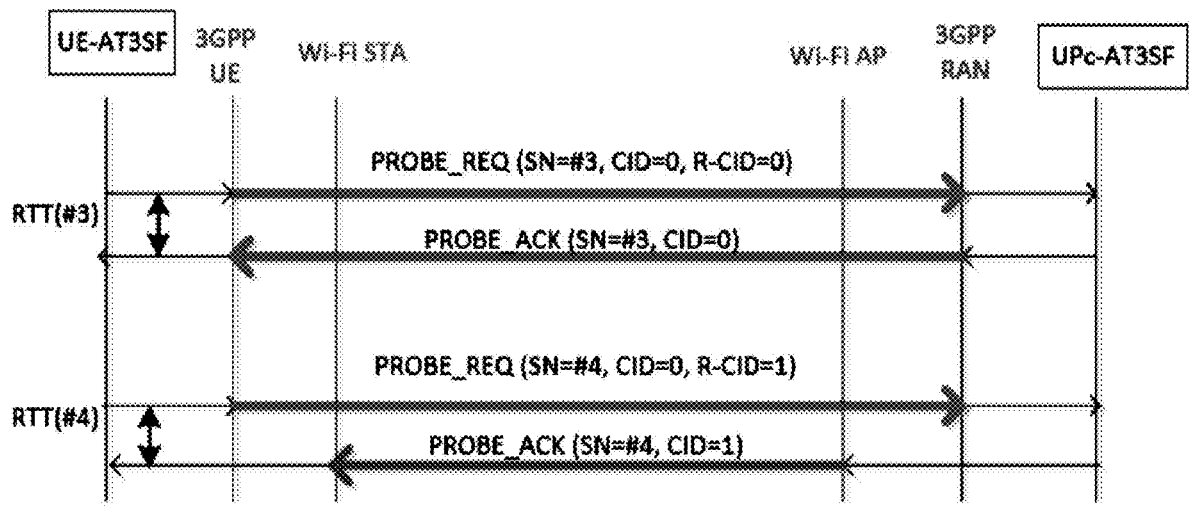
FIG. 43 illustrates example messages that may be exchanged in accordance with some embodiments.

FIGS. 36, 37, 38, 40, and 41 illustrate example protocol layers in accordance with some embodiments. FIG. 39 illustrates example packets in accordance with some embodiments. FIGS. 42, 43 and 45 illustrate example messages that may be exchanged in accordance with some embodiments. FIG. 44 illustrates an example element in accordance with some embodiments. FIGS. 46-51 and 53-54 illustrate example messages that may be exchanged in accordance with some embodiments. FIG. 52 illustrates example fields in accordance with some embodiments.

It should be noted that the examples shown in FIGS. 9-54 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 9-54. Although some of the elements shown in the examples of FIGS. 9-54 may be included in a 3GPP standard, 3GPP LTE standard, NR standard, 5G standard and/or other standard, embodiments are not limited to usage of such elements that are included in standards.

In some embodiments, a method of mobility management in NG-RAN may be used. Some embodiments may be related to RAN3, NG-RAN. Some work items, including but not limited to "Separation of CP and UP for split option 2 of NR" (UID: 780071), may be related to one or more of the following objectives: specification of the E1 general principles, functions, and procedures; specification of the E1 application protocol (E1AP). The E1AP includes the stage-3 description of the E1 elementary procedures and messages, and it also includes the tabular description as well as the ASN.1 coding for the messages.

Figure 9:
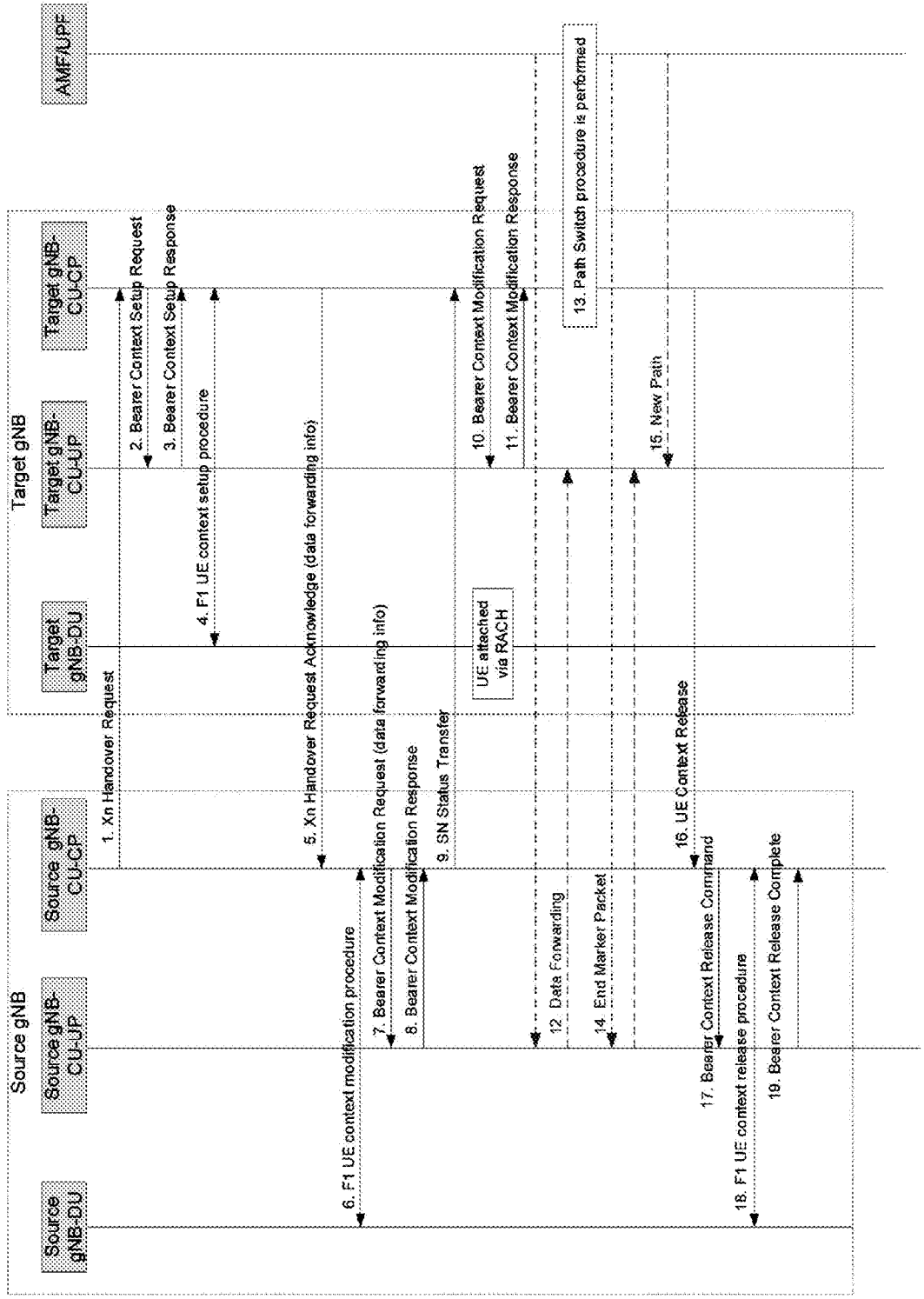
FIG. 9 illustrates example operations in accordance with some embodiments.
Figure 10:
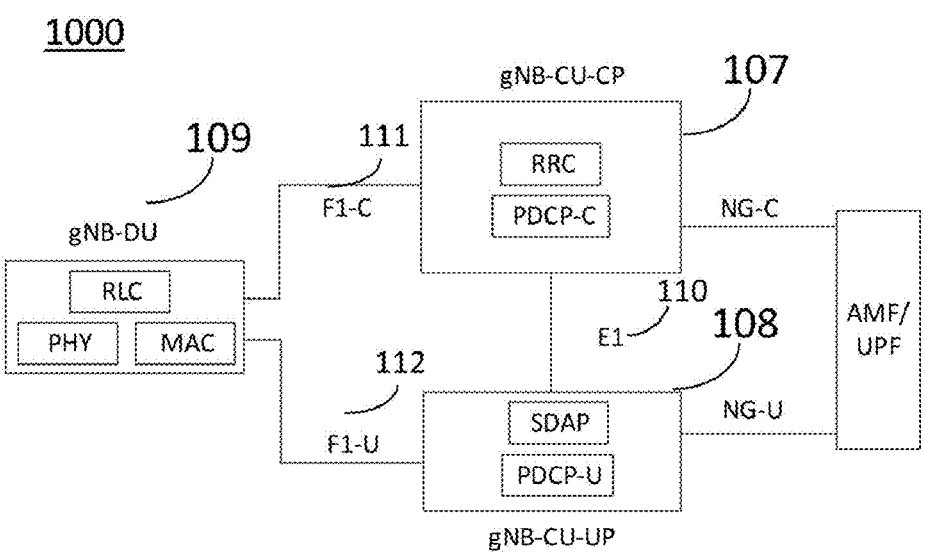
FIG. 10 illustrates example components of a Next Generation Node-B (gNB) in accordance with some embodiments.

The specification on overall architecture, TS38.401, captured inter-gNB handover procedure as shown in 900 in FIG. 9. Since the gNB-DU 109 stops transmitting data to the UE 102 in operation #6 of 900, while the gNB-CU-UP 108 may not be notified to stop delivering PDCP packets to gNB-DU 109 until operation #7 of 900 is executed, those sent between operation #6 and operation #7 of 900 are likely to be dropped by gNB-DU 109 and the F1-U bandwidth is wasted. Some embodiments may include solutions that can alleviate packet dropping and improve the utilization of F1-U bandwidth. In 900 in FIG. 9, inter-gNB handover (including E1 procedures) from TS38.401 is illustrated.

In some embodiments, in the uplink, if gNB-DU 109 still sends UL PDCP packets to gNB-CU-UP 108 after PDCP UL Counter has been reported in Bearer Context Modification Response, those packets have to be retransmitted by the UE 102, leading to a waste of the Uu bandwidth. To avoid being suboptimal, explicit signaling on the F1-U interface may be used.

In some embodiments, to alleviate packet dropping and improve the utilization of F1-U bandwidth, several solutions are proposed herein. In one solution, E1 bearer context modification procedure is performed followed by the F1 UE context modification procedure so that gNB-CU-UP 108 will stop delivering downlink PDCP towards gNB-DU 109 before gNB-DU 109 is asked to stop transmitting data to the UE. In this solution no packets will be dropped by gNB-DU 109, but RRC connection reconfiguration message to the UE 102 may be delayed.

In another solution, the user plane message, e.g. Downlink Data Delivery Status (DDDS) is adopted to notify gNB-CU-UP 108 to stop delivering downlink PDCP as soon as F1 UE context modification request is received. In this solution, RRC connection reconfiguration message to the UE 102 may not necessarily be delayed, but one or more packets sent between F1 UE context modification request and DDDS may be dropped by gNB-DU 109.

In some embodiments, a method to enhance mobility management in the separated Control Plane (CP)/User Plane (UP) deployment may be used, which may alleviate packet dropping and/or improve the utilization of F1-U bandwidth.

In some embodiments, the gNB 105, as shown in FIG. 10, comprises one or more distributed units (gNB-DU) 109 and one central unit (gNB-CU) 106. The gNB-CU 106 is further split into gNB-CU-CP 107, the control plane entity including RRC and PDCP of the signaling radio bearer (SRB), and gNB-CU-UP 108, the user plane entity including PDCP of the data radio bearer (DRB) and service data application protocol (SDAP). The E1 interface 110 between gNB-CU-CP 107 and gNB-CU-UP 108, is a control plane interface that may exchange UE-associated and non-UE associated information. The F1 interface between gNB-DU 109 and gNB-CU 106 can be split into the control plane interface F1-C 111 and user plane interface F1-U 112.

TS38.401 specifies the inter-gNB handover procedure as shown in FIG. 9, wherein F1 UE context modification procedure is performed before E1 bearer context modification procedure, likely leading to enormous packets dropped at gNB-DU 109.

Figure 11:
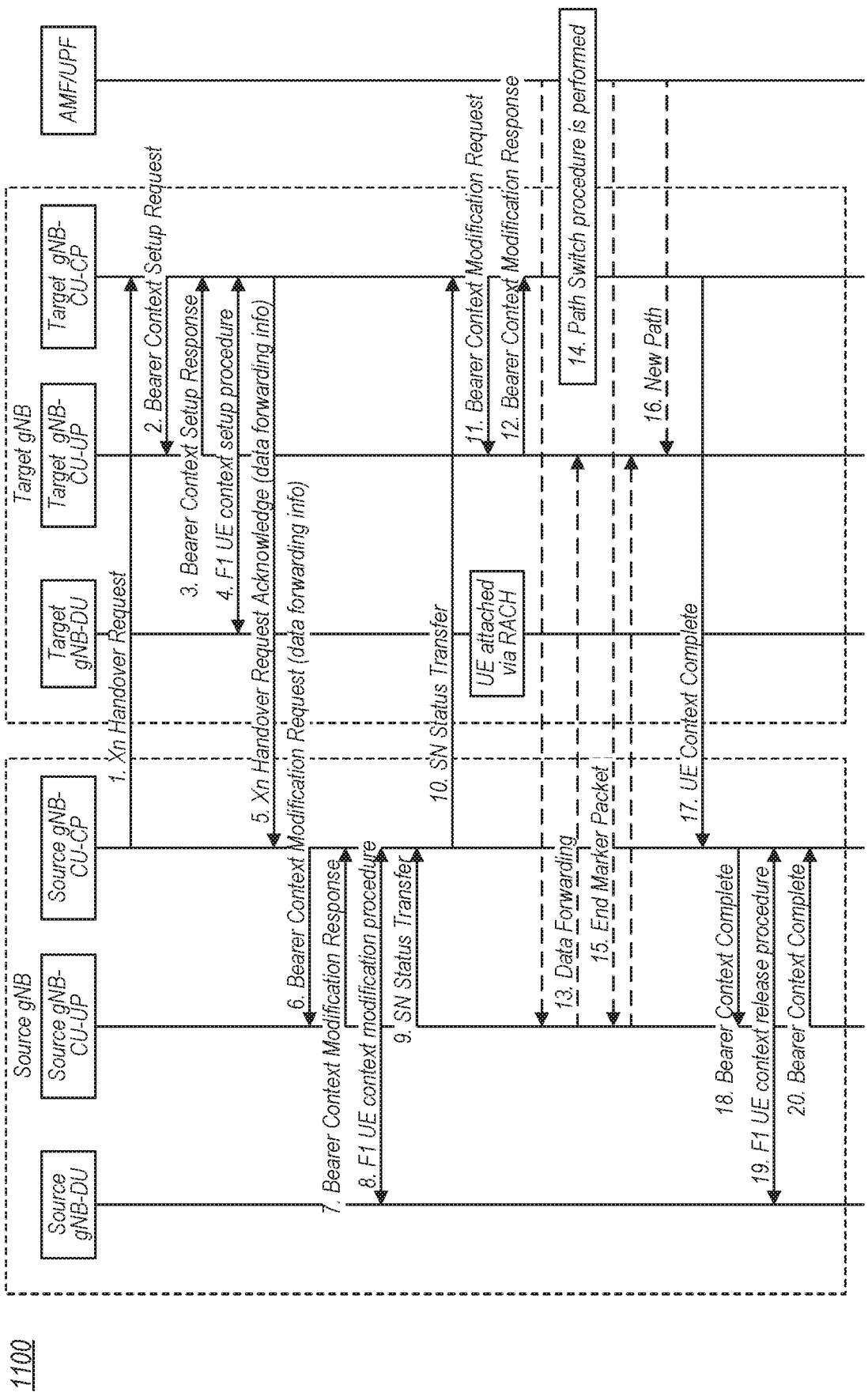
FIG. 11 illustrates example operations in accordance with some embodiments.

In some embodiments, which may be related to a control plane approach, E1 bearer context modification procedure is performed before F1 UE context modification procedure as shown in 1100 in FIG. 11. In 1100, a handover procedure is illustrated, wherein control plane signaling is employed to stop source gNB-CU-UP 108 from delivering DL DPCP to the source gNB-DU 109. In some embodiments, one or more of the operations of 1100 in FIG. 11 may be performed. Some embodiments may not necessarily include all operations shown in FIG. 11. Some embodiments may include one or more additional operations not shown in FIG. 11. Embodiments are not limited to the name, number, type, ordering, chronological ordering, arrangement or other aspects of the elements shown in FIG. 11.

In the following descriptions, the operations are numbered 1-19 and refer to operations in 1100 in FIG. 11. In operation #1 of 1100, the source gNB-CU-CP 107 sends XN HANDOVER REQUEST message to the target gNB-CU-CP 107. In operation #2 of 1100, the target gNB-CU-CP 107 sends the E1AP BEARER CONTEXT SETUP REQUEST message to establish the bearer context in the target gNB-CU-UP 108. In operation #3 of 1100, the target gNB-CU-UP 108 sends the E1AP BEARER CONTEXT SETUP RESPONSE message to gNB-CU-CP 107, including F1-U UL TEID and transport layer address allocated by gNB-CU-UP 108. In operation #4 of 1100, the F1 UE context setup procedure is performed to setup one or more bearers in the target gNB-DU 109. In operation #5 of 1100, the target gNB-CU-CP 107 responds the source gNB-CU-CP 107 with an XN HANDOVER REQUEST ACKNOWLEDGE message. In operations #6-#7 of 1100, a bearer context modification procedure (gNB-CU-CP 107 initiated) is performed to stop gNB-CU-UP 108 from sending DL PDCP to gNB-DU 109, and to exchange data forwarding information for the bearer. In operation #8 of 1100, the F1 UE Context Modification procedure is performed to send the handover command to the UE 102. In operation #9 of 1100, the source gNB-CU-UP 108 sends an SN STATUS TRANSFER message to enable the source gNB-CU-CP 107 to retrieve the PDCP UL/DL status. In operation #10 of 1100, the source gNB-CU-CP 107 sends an SN STATUS TRANSFER message to the target gNB-CU-CP 107. In operation #11 of 1100, the target gNB-CU-CP 107 sends the E1 AP BEARER CONTEXT MODIFICATION REQUEST message to the target gNB-CU-UP 108, including F1-U DL TEID and transport layer address allocated by the target gNB-DU 109, as well as PDCP UL/DL status. In operation #12 of 1100, the target gNB-CU-UP 108 sends the E1 AP BEARER CONTEXT MODIFICATION RESPONSE message to the target gNB-CU-CP 107. In operation #13 of 1100, data forwarding may be performed from the source gNB-CU-UP 108 to the target gNB-CU-UP 108. In operations #14-#16 of 1100, a path switch procedure is performed to update the DL TNL address information for the NG-U towards the core network. In operation #17 of 1100, the target gNB-CU-CP 107 sends an UE CONTEXT RELEASE message to the source gNB-CU-CP 107. In operations #18 and #20 of 1100, an E1 Bearer context release procedure is performed. In operation #19 of 1100, an F1 UE context release procedure is performed to release the UE context in the source gNB-DU 109.

Figure 12:
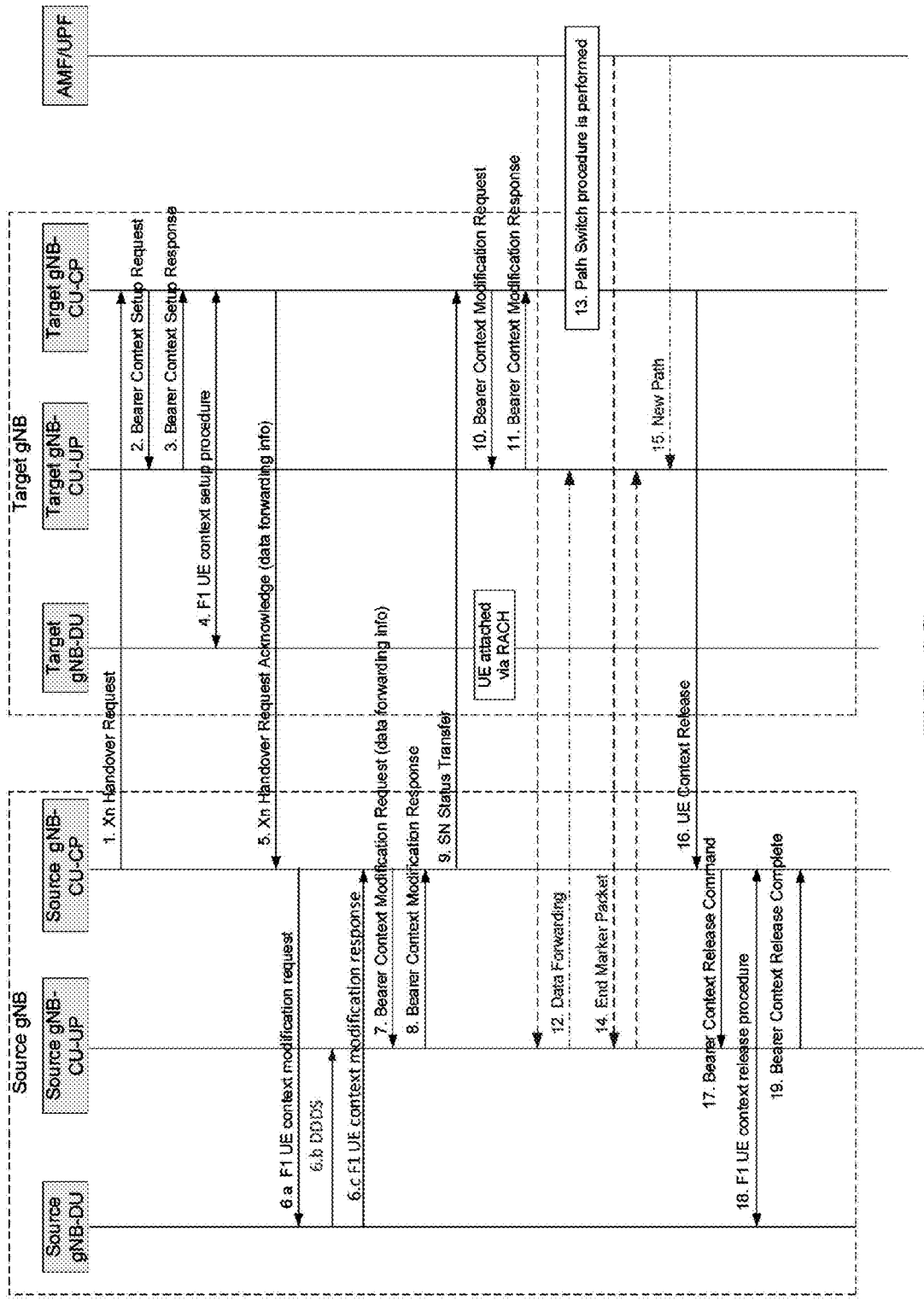
FIG. 12 illustrates example operations in accordance with some embodiments.

In some embodiments, the user plane message Downlink Data Delivery Status (DDDS) may be extended to notify source gNB-CU-UP 108 to stop delivering DL PDCP as shown in 1200 in FIG. 12. In 1200 in FIG. 12, a handover procedure is illustrated, wherein the user plane message DDDS is employed to stop the source gNB-CU-UP 108 delivering DL PDCP to the source gNB-DU 109. In some embodiments, one or more of the operations of 1200 in FIG. 12 may be performed. Some embodiments may not necessarily include all operations shown in FIG. 12. Some embodiments may include one or more additional operations not shown in FIG. 12. Embodiments are not limited to the name, number, type, ordering, chronological ordering, arrangement or other aspects of the elements shown in FIG. 12.

In the following descriptions, the operations are numbered 1-19 and refer to operations in 1200 in FIG. 12. In some embodiments, one or more of operations #1-#5 of 1200 in FIG. 12 may be the same as or similar to one or more of the operations #1-#5 of 1100 in FIG. 11, although the scope of embodiments is not limited in this respect. In some embodiments, one or more of operations #1-#5 of 1200 in FIG. 12 may be the same as or similar to one or more of the operations #1-#5 of 900 in FIG. 9, although the scope of embodiments is not limited in this respect. In operation 6a of 1200, the source gNB-CU-CP 107 sends F1 UE CONTEXT MODIFICATION REQUEST to the source gNB-DU 109 to stop transmission of data for the UE 102. In operation 6b of 1200, the source gNB-DU 109 sends Downlink Data Delivery Status (DDDS) to notify the source gNB-CU-UP 108 to stop delivering DL PDCP. In operation 6c of 1200, the source gNB-DU 109 sends F1 UE CONTEXT MODIFICATION RESPONSE to the source gNB-CU-CP 107. In operations #7-#8 of 1200 in FIG. 12, an E1 Bearer context modification procedure (gNB-CU-CP initiated) is performed to enable the gNB-CU-CP 107 to retrieve the PDCP UL/DL status and to exchange data forwarding information for the bearer. In some embodiments, one or more of operations #9-#19 of 1200 in FIG. 12 may be the same as or similar to one or more of the operations #10-#20 of 1100 in FIG. 11, although the scope of embodiments is not limited in this respect.

A non-limiting example DDDS frame 1300 is shown in FIG. 13. A non-limiting example of an extension of Cause Value can be as {0=UNKNOWN, 1=RADIO LINK OUTAGE, 2=RADIO LINK RESUME, 3=UL RADIO LINK OUTAGE, 4=DL RADIO LINK OUTAGE, 5=UL RADIO LINK RESUME, 6=DL RADIO LINK RESUME, 7=TRANSMISSION HALT, 8=DL TRANSMISSION HALT, 9=UL TRANSMISSION HALT, 10-228=reserved for future value extensions, 229-256=reserved for test purposes}. It should be noted that embodiments are not limited to the assignment of values 7/8/9 to the cases given above. Accordingly, in some embodiments, other values (other than 7/8/9) may be assigned to those cases.

In some embodiments, the field "Desired buffer size for the data radio bearer" of DDDS may be set to "0" to notify source gNB-CU-UP 108 to stop delivering DL PDCP. In some embodiments, the call flow may be the same as the flow shown in FIG. 12, although the scope of embodiments is not limited in this respect.

In some embodiments, the flag "Final Frame Indication" of DDDS may be set to "1", which may mean that no more UL or DL data is expected to be transmitted between gNB-DU 109 and UE 102. Therefore gNB-CU-UP 108 may consider stopping delivering DL PDCP upon the reception of Final Frame Indication whose value is set to '1'.

Figure 14:
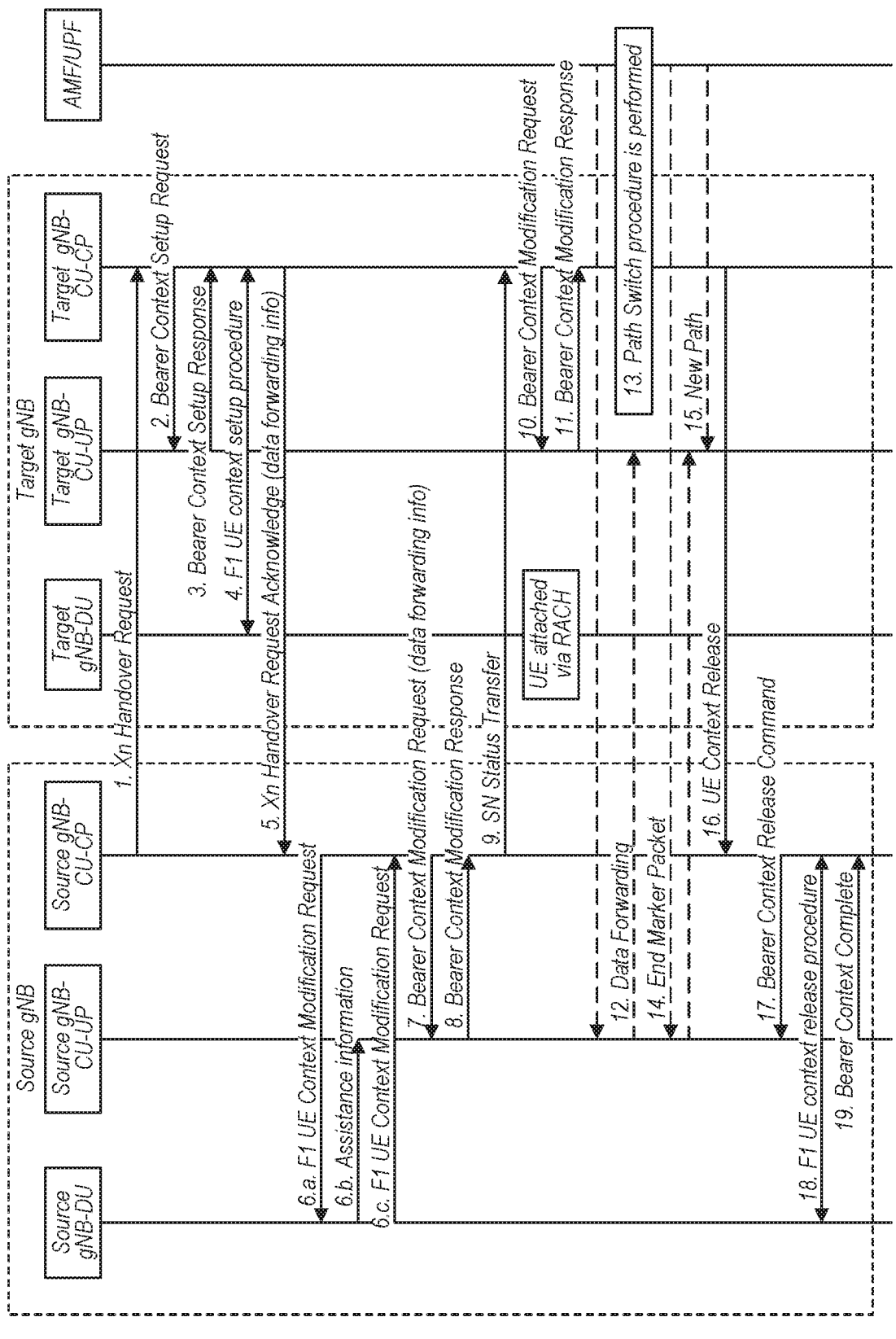
FIG. 14 illustrates example operations in accordance with some embodiments.

In some embodiments, the user plane message Assistance Information may be adopted to notify source gNB-CU-UP 108 to stop delivering DL PDCP as shown in 1400 in FIG. 14. In 1400 in FIG. 14, a handover procedure is illustrated, wherein the user plane message Assistance Information is employed to stop the source gNB-CU-UP 108 from delivering DL PDCP to the source gNB-DU 109.

A non-limiting example of the Assistance Information frame is shown in 1500 in FIG. 15. A non-limiting example of an Assistance Information frame that is adopted to stop gNB-CU-UP 108 from delivering DL PDCP is shown in 1530 in FIG. 15, wherein both DL and UL Radio Quality Index are set to "0", which may be the lowest quality (although the scope of embodiments is not limited in this respect). In some embodiments, other configurations of Assistance Information may be possible.

In some embodiments, a new user plane message may be defined to notify source gNB-CU-UP 108 to stop delivering DL PDCP. A non-limiting example of such a message 1560 is shown in FIG. 15, wherein the field PDU Type is set to 3 and only one bit flag DL Transmission Halt Indication (=true) and UL Transmission Halt Indication (=true) is included. In some embodiments, other message definitions may be possible.

It should be noted that some embodiments are described for inter-gNB handover, but the scope of embodiments is not limited in this respect. One or more of the techniques, operations, methods and/or concepts described herein that are based on intra-gNB handover may be modified to be based on intra-gNB handover. For instance, an operation may be performed as part of an inter-gNB handover in descriptions herein, and the same operation (and/or similar operation) may be performed as part of an intra-gNB handover, in some embodiments.

In some embodiments, a gNB-CU-CP 108 may modify UE or bearer context on the corresponding network entities during handover for the affected UE 102. In some embodiments, a first message may be sent to a gNB-CU-UP 108 to modify the bearer context for the affected UE 102. In some embodiments, the first message may include one or more of: a DRB to modified list; PDU session resource to be modified list; data forwarding information; and/or other information. In some embodiments, a second message may be received from the gNB-CU-UP 108 to indicate the successful modification of the bearer context. In some embodiments, a third message may be sent to a gNB-DU 109 to modify the UE context for the affected UE 102. In some embodiments, the third message may include one or more of: a DRB to be modified list; a transmission stop indicator; and/or other information. In some embodiments, a fourth message may be received from the gNB-DU 109 to indicate the successful modification of the UE context.

In some embodiments, a gNB-CU-UP 108 may deliver DL PDCP to a gNB-DU 109 and may receive UL PDCP from the gNB-DU 109 for a UE 102. In some embodiments, a first message may be received from the gNB-DU 109 to notify the gNB-CU-UP 108 to stop delivering DL PDCP for a UE 102. In some embodiments, the first message may be a "Downlink Data Delivery Status" (DDDS). In some embodiments, the field "Cause Value" of the DDDS may be set to a specific value, like TRANSMISSION HALT, DL TRANSMISSION HALT, UL TRANSMISSION HALT, and/or other. In some embodiments, the field "Desired buffer size for the data radio bearer" of the DDDS may be set to "0". In some embodiments, the flag "Final Frame Indication" of the DDDS may be set to "1" meaning that no more UL or DL data is expected to be transmitted between gNB-DU 109 and UE 102. In some embodiments, the first message may be an "Assistance Information". In some embodiments, the field "Assistance Information Type" of the Assistance Information message may be set to DL Radio Quality index or UL Radio Quality index, and the field "Radio Quality Assistance Information" may be set to "0", the lowest quality. In some embodiments, the first message may be a message different than DDDS and Assistance Information, which is adopted to notify gNB-CU-UP 108 to stop delivering DL PDCP. In some embodiments, a field of the first message may indicate the halt of DL/UL transmission.

In some embodiments, a second message may be received from a gNB-CU-CP 107 to modify bearer context for a UE 102. In some embodiments, the second message may include one or more of: a DRB to modified list; a PDU session resource to be modified list; data forwarding information; and/or other. In some embodiments, the data forwarding information may be taken as an indicator to stop gNB-CU-UP 108 delivering DL PDCP for the UE 102. In some embodiments, a third message may be sent to the gNB-CU-CP 107 to indicate the successful modification of bearer context. In some embodiments, a fourth message may be sent to the gNB-CU-CP 107 to report the DL/UL PDCP status.

In some embodiments, a gNB-DU 109 may transmit data to a UE 102. In some embodiments, a first message may be received from the gNB-CU-CP 107 to modify the UE context for a UE 102. In some embodiments, the first message may include one or more of: a DRB to be modified list; a transmission stop indicator; and/or other. In some embodiments, a second message may be sent to a gNB-CU-UP 108 to stop delivering DL PDCP for the UE 102. In some embodiments, the second message may be a DDDS, an "Assistance Information" frame or another message. In some embodiments, a third message may be sent to the gNB-CU-CP 107 to indicate the successful modification of the UE context.

In some embodiments, signaling methods for precise timing synchronization in new radio based time sensitive network may be used.

In some cases, the manufacturing industry is currently subject to a fundamental change, which is often referred to as the "Fourth Industrial Revolution" or simply "Industry 4.0". The main goals of Industry 4.0 are the improvement of flexibility, versatility, resource efficiency, cost efficiency, worker support, and quality of industrial production and logistics. These improvements are important for addressing the needs of increasingly volatile and globalised markets. A major enabler for all this are cyber-physical production systems based on a ubiquitous and powerful connectivity and computing infrastructure, which interconnects people, machines, products, and all kinds of other devices in a flexible, secure and consistent manner. Instead of static sequential production systems, future smart factories will be characterised by flexible, modular production systems. This includes more mobile and versatile production assets, which require powerful and efficient wireless communication and localisation services.

As an important use case category of industry 4.0, factory automation deals with the automated control, monitoring and optimization of processes and workflows within a factory. This includes aspects like closed-loop control applications, robotics, as well as aspects of computer-integrated manufacturing. Factory automation generally represents a key enabler for industrial mass production with high quality and cost-efficiency and corresponding applications are often characterized by highest requirements on the underlying connectivity infrastructure, especially in terms of latency, communication service availability and determinism. Specifically, motion control (MC) is among the most challenging and demanding closed-loop control applications in industry. A motion control system is responsible for controlling moving and/or rotating parts of machines in a well-defined manner, for example in printing machines, machine tools or packaging machines. Due to the movements/rotations of components, wireless communications based on powerful 5G systems constitutes a promising approach.

As illustrated in 1600 in FIG. 16, a motion controller periodically sends desired set points to one or several actuators which perform a corresponding action on one or several processes. At the same time, sensors determine the current state of the process(es) and send the actual values back to the motion controller. This is done in a strictly cyclic and deterministic manner, such that during one communication cycle time $T_{cycle}$ the motion controller sends updated set points to all actuators, and all sensors send their actual values back to the motion controller. In general, lower cycle times allow for faster and more accurate movements/rotations. To realize such automated motion control by 5G connectivity, it is critical that all the nodes connected by 5G NR technology can achieve precise timing synchronization so that a timing sensitive network (TSN) can be constituted by 5G NR.

In some embodiments, methods to achieve precise time synchronization among different nodes in 5G NR cells may be used, so that the proposed methods enable NR system to constitute a timing sensitive network.

Disclosed herein are several MAC signaling enhancement methods to enable the NR gNB as master clock source to distribute precise time (PT) information to the TSN capable UEs. Specifically, the following MAC control elements (CE)s are proposed to assist the precise timing information transmission.

1. MAC CE precise time stamp indicator (PTSI): This MAC CE is signaled to UE to store the arrival time of the MAC CE which will to be used for precise time calculation in the later step. This MAC CE can be identified by a new logical channel ID (LCD) in the respective MAC subheader, and no associated payload is transmitted.

2. MAC CE precise time information (PTI): This MAC CE contains the absolute transmission time of the first transmission of previous MAC CE PTSI. This MAC CE shall be used for calculating the precise time synchronized with the master clock source, e.g., gNB.

For PT calculation, to achieve the transmission time delay estimation with higher time resolution than the one used for MAC timing advance (TA) command, the following options are proposed. Option 1: Configurable resolution of timing advance signaling: in the option, the time resolution for TA command can be configured by RRC signaling. With configured TA time resolution, a finer time resolution than the one in current standard can be achieved for TA command as well as the resulted transmission delay estimation which is half of the TA value.

Option 2: Explicit transmission delay estimation. In this option, the transmission time delay can be estimated by gNB with a greater time resolution than the one of TA command by virtue of a PDCCH ordered UL random access preamble. The estimated transmission delay can be signaled to UE in the same MAC CE PTI.

In some cases, methods disclosed herein may enable precise time synchronization for TSN capable UEs with gNB as master clock. As a result, TSN can be constituted by NR based network, and advanced 5G connectivity can be employed for TSN based automated motion control.

Currently in LTE and NR, the absolute time broadcasted from system information block has the timing resolution of 10 ms. Due to the need for finer timing resolution from automated motion control [1], timing granularity of 1 us could be required in some cases. The following method is proposed to enable NR to provide precise timing synchronization for TSN capable UEs.

In some embodiments, MAC signaling for precise timing synchronization may be used. In this method, new MAC control elements (CE) in downlink direction can be added so that precise time information can be sent from gNB which can serve as the master clock source in the cell to the UE requiring/tracking precise time information. Specifically, two MAC CEs can be used as follows.

1. MAC CE precise time stamp indicator (PTSI): This MAC CE is signaled to UE to store the arrival time of the MAC CE which will to be used for precise time calculation in the later step. And the MAC CE can be identified by a new logical channel ID (LCID) in the respective MAC subheader, and no associated payload is transmitted.

2. MAC CE precise time information (PTI): This MAC CE contains the absolute transmission time of the first transmission of previous MAC CE PTSI. The MAC CE can be identified by a new LCID in the MAC subheader, and the payload contains precise time information within the absolute time span of 10 ms broadcasted in SIB. The payload can have one or several octets. For example, one octet can provide the time resolution of 39.1 us, and two octets can provide the resolution of 0.15 us.

The following methods can be used for employing proposed MAC CEs to achieve precise time information for UEs. Method-1: Precise time synchronization with timing advance command based transmission delay estimation. The signaling diagram of this method is illustrated in FIG. 17. As illustrated in FIG. 17, at time t1 of gNB (master clock) sends a MAC CE PTSI. The UE receives MAC CE PTSI at time t1_UE (UE clock). At time t2 (master clock), gNB sends the MAC CE PTI (t1) associated with MAC CE PTSI transmitted at time t1. At time t2_UE (UE clock), UE receives the MAC CE PTI. Then UE can adjust its clock according to the following: Eq. (1)—T2_UE_new=t1+(t2_UE−t1_UE)+TTD, wherein t1 is the time signaled in MAC CE PTI received at t2_UE, and t1_UE and t2_UE are UE times at which MAC CE PTSI and PTI are received, respectively. The transmission delay TTD can be calculated as TTD=TTA/2, wherein TTA is the current calculated timing advance based on MAC CE TA command recorded for UL transmission.

The transmission delay calculated above by MAC CE TA command has the time resolution of MAC CE TA command which depends on the numerology of the carrier as follows: TRes_TA=16000/(2048*15*2μ) (us) for subcarrier of 15*2μkHz, where μ=0,1,2,3,4,5. The table below lists the value TRes_TA for different subcarrier spacing. The table below illustrates time resolution of timing advancement for different SCSs.

| | SCS [kHz] | | | | | |
|---|---|---|---|---|---|---|
| | 15 | 30 | 60 | 120 | 240 | 480 |
| $T_{RES\_TA}$ [us] | 52 | 26 | 13 | 6.5 | 3.25 | 1.625 |

For precise time information signaling, if the resolution of transmission time delay estimation for a particular SCS needs be smaller than the one listed in the table above, the following approaches can be used.

Method-2: Configurable resolution of timing advance signaling. To have configurable time resolution for timing advance command and the consequent transmission time delay estimate, in this method, we propose to add a configurable time resolution parameter "tagTimeResolution" in RRC signaling for TAG-ToAddMod as follows: TAG-ToAddMod::=SEQUENCE {tag-Id TAG-Id, timeAlignmentTimer TimeAlignmentTimer, tagTimeResolution ENUMERATED {1, 2, 4, 8, 16} . . . }

Based on configured parameter tagTimeResolution, for a subcarrier spacing of $(2^\mu)$*15 kHz, the timing advance command for a TAG indicates the change of the uplink timing relative to the current uplink timing for the TAG as multiples of $N_{Res-TA}*64*T_c/2^\mu$, wherein $N_{Res-TA}$ refers to the signaled tagTimeResolution configured by the above RRC parameter. As a result, the time resolution of TA becomes $T_{Res\_TA}=(1000*N_{Res-TA})/(2048*15*2^\mu)$ (us).

Method-3: Explicit transmission delay estimation. In this option, an explicit transmission time delay value calculated by gNB can be signaled to the UE to enable the finer resolution of transmission time delay. FIG. 18 illustrates precise time synchronization for UEs based on MAC CE on PTI and transmission time delay. As illustrated in FIG. 18, in this method, at time t1 (master clock), gNB sends a MAC CE PTSI. At time t2 (master clock), gNB sends a PDCCH ordered RA preamble request. At time t3_UE (UE clock), UE sends a requested RA preamble. At time t3 (master clock), gNB receives the PDCCH ordered RA preamble. Based on the received RA preamble, gNB can estimate the transmission delay which can be equal to the half of time difference between the expected arrival time and actual arrival time of ordered RA preamble. The estimated transmission time delay can be quantized with the resolution of gNB PTI (master clock). At time t4 (master clock), gNB shall send MAC CE including 1) PTI of previously transmitted MAC CE PTSI and 2) the transmission delay $T_{TD}$. At time t4_UE, UE receives the MAC CE including PTI and TTD. Then UE can adjust its clock according to the following Eq. (2): T4_UE_new=t1+(t4_UE−t1_UE)+$T_{TD}$, wherein $T_{TD}$ is the received time delay estimate from MAC CE.

Possible claim examples are given below. 1. MAC control elements (CE) in downlink direction can be added so that precise time information can be sent from gNB which can serve as the master clock source in the cell to the UE requiring/tracking precise time information. 2. A MAC CE signaling precise time stamp indicator (PTSI) can be added in standard. This MAC CE is signaled to UE to store the arrival time of the MAC CE which will to be used for precise time calculation in the later step. 3. The MAC CE PTSI can be identified by a new logical channel ID (LCD) in the respective MAC subheader, and no associated payload is transmitted. 4. A MAC CE signaling precise time information (PTI) can be added in standard. This MAC CE contains the absolute transmission time of the first transmission of previous MAC CE PTSI. 5. The MAC CE PTI can be identified by a new LCID in the MAC subheader, and the payload contains precise time information within the absolute time span of 10 ms broadcasted in SIB. 6. The payload of MAC CE PTI can have one or several octets. For example, one octet can provide the time resolution of 39.1 us, and two octets can provide the resolution of 0.15 us.

Method-1: Precise time synchronization with timing advance command based transmission delay estimation. 7. As illustrated in FIG. 2, at time t1 of gNB (master clock) sends a MAC CE PTSI. 8. The UE receives MAC CE PTSI at time t1_UE (UE clock). 9. At time t2 (master clock), gNB sends the MAC CE PTI (t1) associated with MAC CE PTSI transmitted at time t1. 10. At time t2_UE (UE clock), UE receives the MAC CE PTI. 11. UE can adjust its clock according to the following: T2_UE_new=t1+(t2_UE−t1_UE)+$T_{TD}$, wherein t1 is the time signaled in MAC CE PTI received at t2_UE, and t1_UE and t2_UE are UE times at which MAC CE PTSI and PTI are received, respectively. The transmission delay $T_{TD}$ can be calculated as $T_{TD}=T_{TA}/2$, wherein $T_{TA}$ is the current calculated timing advance based on MAC CE TA command recorded for UL transmission. 12. The transmission delay calculated above by MAC CE TA command has the time resolution of MAC CE TA command.

Method-2: Configurable resolution of timing advance signaling. 13. A configurable time resolution parameter "tagTimeResolution" in RRC signaling for TAGToAddMod as follows can be added in standard. TAG-ToAddMod::= SEQUENCE {tag-Id TAG-Id, timeAlignmentTimer TimeAlignmentTimer, tagTimeResolution ENUMERATED {1, 2, 4, 8, 16} . . . } 14. Based on configured parameter tagTimeResolution, for a subcarrier spacing of $2^\mu$*15 kHz, the timing advance command for a TAG indicates the change of the uplink timing relative to the current uplink timing for the TAG as multiples of $N_{Res-TA}*64*T_c/2^\mu$, wherein $T_{Res-TA}$ refers to the signaled tagTimeResolution configured by the above RRC parameter. As a result, the time resolution of TA becomes $T_{Res\_TA}=(1000*N_{Res-TA}/(2048*15*2^\mu))$ (us).

Method-3: Explicit transmission delay estimation. 15. An explicit transmission time delay value calculated by gNB can be signaled to the UE to enable the finer resolution of transmission time delay. 16. As illustrated in FIG. 18, in this method, at time t1 (master clock), gNB sends a MAC CE PTSI. At time t2 (master clock), gNB sends a PDCCH ordered RA preamble request. At time t3_UE (UE clock), UE sends a requested RA preamble. At time t3 (master clock), gNB receives the PDCCH ordered RA preamble. 17. Based on the received RA preamble, gNB can estimate the transmission delay which can be equal to the half of time difference between the expected arrival time and actual arrival time of ordered RA preamble. 18. The estimated transmission time delay can be quantized with the resolution of gNB PTI (master clock). 19. At time t4 (master clock), gNB shall send MAC CE including 1) PTI of previously transmitted MAC CE PTSI and 2) the transmission delay TTD. At time t4_UE, UE receives the MAC CE including PTI and TTD. Then UE can adjust its clock according to the following—T4_UE_new=t1+(t4_UE+t1_UE)+$T_{TD}$, wherein $T_{TD}$ is the received time delay estimate from MAC CE.

In some embodiments, end-to-end latency reduction via direct communications via DU with gNB CU/DU split [RAN2, SA2] may be used.

Most, if not all, efforts to reduce latency (for URLLC and other use cases) are focused on the air interface. While the air interface latency is of course important, if the overall end-to-end latency remains high, air interface latency reduction is largely pointless.

Herein is proposed an enhancement which can substantially reduce end-to-end latency at least in one use cases, which is relevant for many URLLC deployments (e.g. factory automation, etc)—that is, the case when two UEs are connected to the same gNB and more specifically to the same Distributed Unit (DU) in case the gNB is split into a Central Unit (CU) and Distributed Units.

NOTE: one can argue that sidelink communications may solve this issue, one important distinction between sidelink and the proposed method is that the latter has no UE impact.

In FIGS. 19 and 20, the normal user plane data path is illustrated (FIG. 19, via UPF) and the optimized data path (FIG. 20, directly via gNB, bypassing the UPF).

As mentioned above, sidelink/PC5 may be considered as an alternative solution. This however rely on a broadcast solution and may not work well in case of high density of device. This may be the case for large factory. A managed solution with a network controlled radio resource allocation is more efficient.

Potential disadvantages of other solutions may include larger latency of existing solution due to hop at UPF; a broadcast solution may face congestion in case of high device density.

Figure 22:
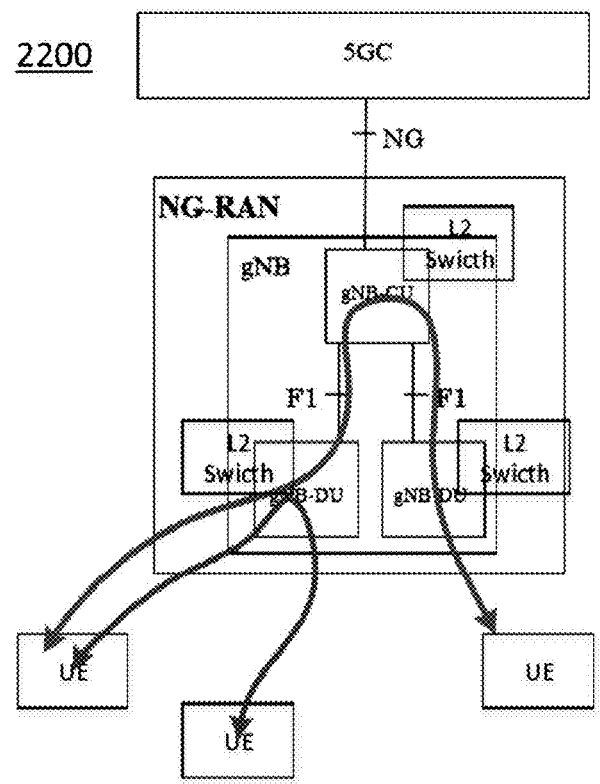
FIG. 22 illustrates example flows in accordance with some embodiments.

A core idea of some embodiments described herein may be described at the high level as the integration of a (e.g. Ethernet) layer-2 switch with the gNB-DU, as illustrated in FIG. 22.

Use of legacy Ethernet switch, a proposed procedure works as follows. 1. UE1 sends Address Resolution Protocol (ARP) request for UE2's Ethernet MAC address. 2. L2 switch receives the ARP request from the gNB-DU and broadcasts it to all UEs connected to the gNB-DU. If not successful response received, gNBDU forward the ARP-Request to gNB-CU. gNB-CU can forward to the L2 switch it is associated to or forward the request to all other gNB-DU it is controlling. 3. UE2 replies with ARP response. 4. UE1 and UE2 exchange Ethernet packets directly via gNB-DU, without going through a UPF. Note: in case of IPv6 Neigbhor Discovery Protocol (NDP) is used instead of ARP.

gNB-DU and gNB-CU handle some routing functionality. With this alternative, the gNB retrieves the Ethernet MAC address to the connected UEs. The gNB-CU can then associate each connected UE with its MAC address. The gNB-CU can then setup dedicated DRB with filter rules based on UE source MAC address and destination MAC address to identify and route the traffic between these devices. For UEs within the same gNB-DU coverage, PDCP layer may also be disabled. Potential advantages of some embodiments described herein are as follows: low end-to-end latency, some alternatives have no UE impact.

For simplicity, it is assumed that: special PDU session is designated for direct communications and that PDU session is of the Ethernet PDU Session type. IPv4 is used, UE has acquired IP address, UE is in RRC connected.

In Alternative 1: Usage of legacy Ethernet switch and ARP/NDP protocol for Ethernet address resolution (no UE impact). The following steps illustrate how the proposed method works. 1. UE1, wanting to communicate with UE2, sends L2 Address Resolution Protocol (ARP) request to the gNB. The gNB has multiple alternatives. Alternative 1: gNB-CU forwards the received Ethernet packet to its local L2 switch. Alternative 2: gNB-CU forwards the received Ethernet packet to the L2 switch of each gNB-DU. Alternative 3: gNB-CU forward the ARP-Request to gNB-DU using F1 interface and gNB-forwards the received Ethernet packet to its local L2 switch. If the UE2's Ethernet MAC address is not known to the L2 switch, it learns which part UE2 is connected to (if any) using standard L2 switch functionality (e.g. the spanning tree protocol). L2 switch forwards the ARP request, via the gNB, to UE2. UE2 replies with ARP response, which is forwarded to UE1 in the same manner. UE1 and UE2 can now exchange Ethernet packets directly, without going to the UPF. For the communication between gNB (DU or CU) and the Ethernet switch, there can be a one to one mapping between a DRB managed by the gNB and a port at the Ethernet switch.

Alternative 2: gNB-DU and gNB-CU handle some Ethernet routing functionality. With this variant, the UE notifies the gNB what is the Ethernet MAC address of the device. This can be done upon request from the gNB or upon unsollicated solicitation from the UE when Ethernet based communication is required. The Ethernet MAC address of the UE can be provided in the RRCConnectionReconfigurationComplete message or in a new message.

The gNB has then the capability to identify which UE is connected to which gNB-DU and what is the associated UE MAC address. The gNB-CU can then identify if some traffic is being exchanged between UE within the same DU and establish with the UE dedicated DRB and configure the with a filter rule to directly route traffic between UEs (in such case no Ethernet switch functionality required). The gNB-CU can identify the route of the traffic by checking the source MAC address and destination MAC address or upon notification of the Ethernet switch.

An example of filter rule configured by the gNB can be: map all traffic generated by the UE to DRB X if Ethernet MAC destination address is Y. The configuration and definition of filter may reuse the concept defined for 5G New Radio and quality flow indicator. The reflective mapping can be used as well. For instance if the UE receives an Ethernet packet with source MAC address A on DRB X, then the UE shall route all outgoing packet to destination MAC address A on DRB X.

As an example we may have: UE 1 with MAC address 1 with DRB 2 established; UE 2 with MAC address 2 with DRB 5 established; UE 1 has the rule configured to route all traffic with destination MAC address 2 to DRB 2; UE 2 has the rule configured to route all traffic with destination MAC address 1 to DRB 5; gNB-CU or gNB DU will map traffic between DRB 2 and DRB5. The Ethernet routing can then be performed with gNB with the need of an Ethernet switch.

The following use cases can be handled. 1—Communication with a wireless UE and a non-wireless Ethernet device. With this configuration, the gNB-CU forward the traffic received from UE to the Ethernet switch and the Ethernet switch route the data to the Ethernet device. In the other direction the Ethernet switch shall route the data generated by the Ethernet device to the gNB-CU and the gNB-CU shall forward this data to the UE. To enable this routing, an interface shall be created between the Ethernet switch and the gNB-CU to map a Switch port number with a DRB and Ethernet MAC address. FIG. 24 illustrates a non-limiting example of DRB-MAC address-Ethernet switch port mapping.

2—Communication with a wireless UE and a non-wireless Ethernet device via gNB-DU. This alternative is a variant of the solution above. The same DRB-MAC address-port mapping can be done. The main difference is that the Ethernet traffic is routed from the gNB-Du to an Ethernet switch directly. For this purpose, the DRB can be configured with a transparent PDCP layer, i.e. the Ethernet frame is directly encapsulated in a RLC packet. Another alternative would be to enable only the ciphering capability of PDCP with no reordering capability. A non-limiting example 2500 is shown in FIG. 25. FIG. 25 illustrates non-limiting example protocol stacks for UE-ethernet device communication via gNB-DU.

3—communication between wireless UEs via gNB-DU. This alternative presents the UE to UE communication via gNB-DU. This method very low latency communication between UE with the same DU coverage. As described previously the gNB-CU can setup DRB with filter rules to map Ethernet frame to DRB based on the destination MAC address. This enables the gNB-DU to the routing within the DU itself even without support of the Ethernet switch.

In order to easily de-capsulate the Ethernet frame, the PDCP layer may be disable or configured in transparent mode. If the network operator requires security it may rely on upper layers integrity and ciphering protection such as IPSec.

Another alternative is that the PDCP packet is simply forward by the gNB-DU from the source DRB to the target DRB. The source PDCP will be in the source UE and the target PDCP on the target UE without PDCP management on the PDCP-DU. A non-limiting example 2600 is shown in FIG. 26. FIG. 26 illustrates non-limiting example protocol stacks for UE-UE communication via gNB-DU.

Figure 27:
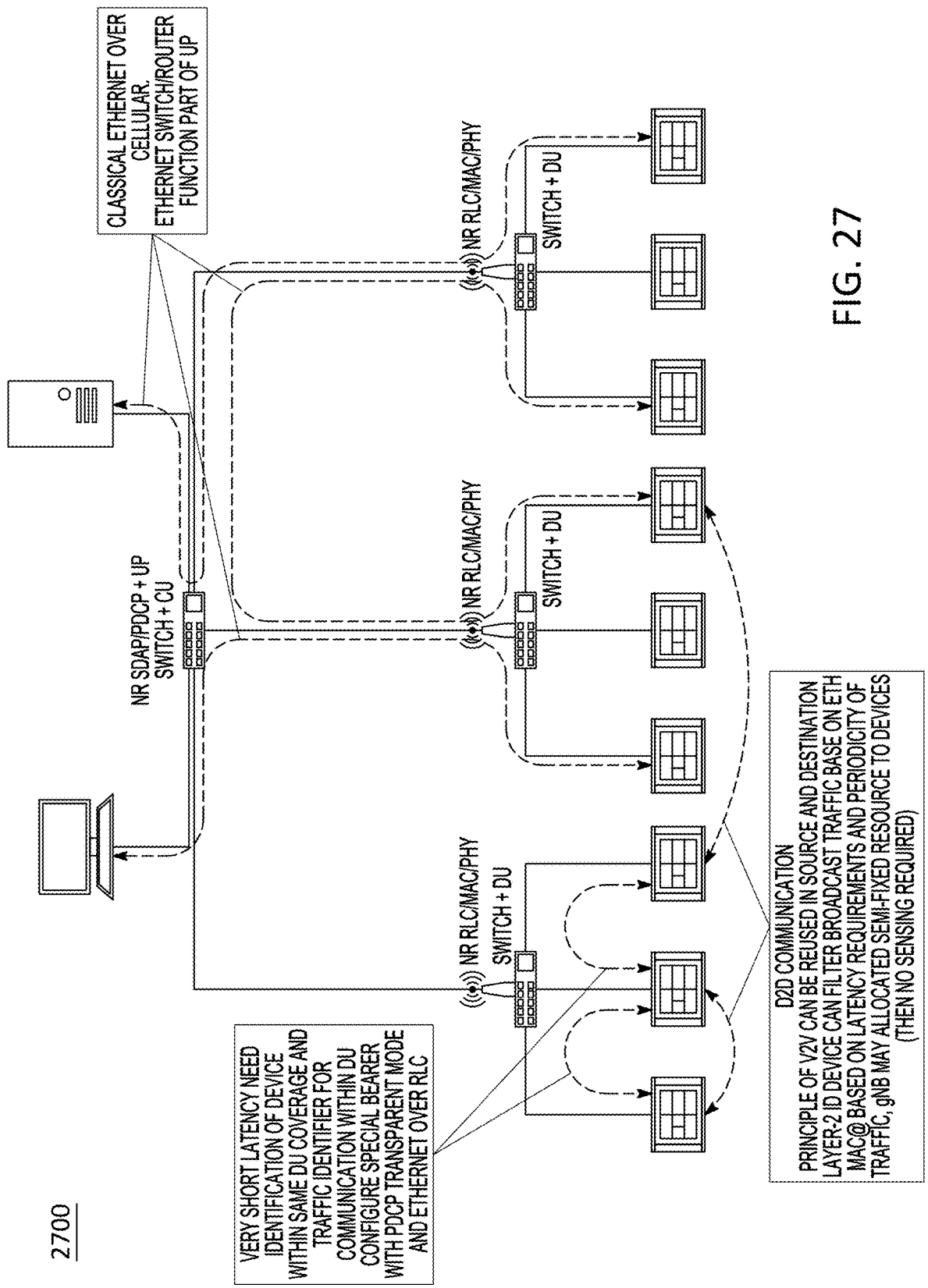
FIG. 27 illustrates example flows in accordance with some embodiments.
Figure 28:
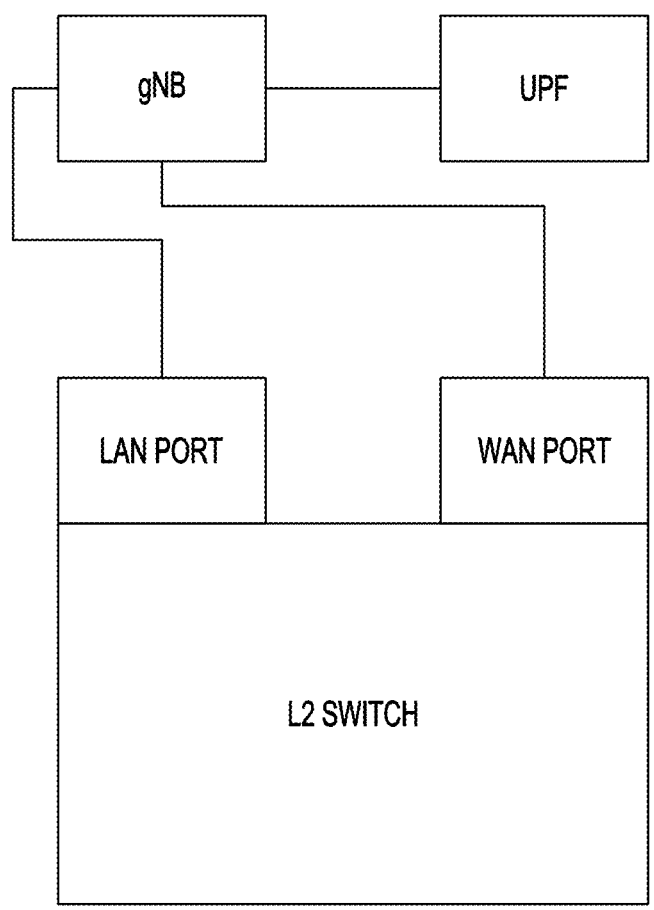
FIG. 28 illustrates example components in accordance with some embodiments.

FIG. 27 illustrates an example for Cellular-Ethernet network integration. It should be noted that the gNB may need to be connected to two ports of the L2 Ethernet switch—the LAN port and the "WAN" port (the port which is used to communicate traffic to the UPF). This is because the Ethernet switch cannot have the NG interface functionality to communicate with a UPF. This is illustrated in FIG. 28.

For mobility, if one of the UEs involved in direct communications goes idle or is handed over to another gNB, the L2 switch learns (e.g. using the spanning tree protocol) that the UE is no longer connected to it and starts forwarding traffic directed to that UE to the UPF—e.g. normal operation resumes. Additionally, the gNB may indicate (via internal or external interface) to the L2 switch when one of the UEs connected to it goes idle or is handed over.

In case of mobility from one DU to another DU, and the UE communicating together are no more under the coverage of the same DU, then the DU will remove the local routing rule and transfer the packet to the CU. The CU is also aware of the DRB-ID-MAC address mapping and can forward the packet to the new DU serving the UE after mobility procedure.

The idea may be further extended to support: 1. Authorization for direct communication; multiple gNBs; IPv6; direct communications via DU, in case of CU/DU split gNB; direct communications between two UEs over PDU session of the IP PDU Session type (i.e. with some "flows" going directly and some "flows" going via UPF).

Non-limiting example claims are described below. Claim 0—gNB, comprising a gNB-DU and a gNB-CU, connected to a L2 Ethernet switch. Claim 1 the gNB of claim 0, where the said gNB-DU (distributed unit) is connected to the said L2 Ethernet switch via internal or external interface. Claim 2—the gNB-DU of claim 1, connected to both LAN and WAN ports of the said L2 Ethernet switch. Claim 3—the gNB-DU of claim 2, configured to forward traffic received from the WAN port of the said L2 Ethernet switch to the UPF. Claim 4—the gNB-DU of claim 2, further configured to indicate to the L2 Ethernet switch when a UE is handed over or goes idle. Claim 5—the gNB-DU of claim 2, further configured to indicate to the L2 Ethernet switch when a new UE connects to it. Claim 6—the gNB-DU of claim 2, to associate a DRB configured for one UE to be associated to a local port of the L2 ethernet switch. Claim 7—the gNB-DU of claim 6, to send all traffic received from UE on the configured DRB to the associated port of the L2 Ethernet switch. Claim 8—the gNB-DU of claim 6, to send all traffic received from a local port of the L2 Ethernet to to the UE of the associated DRB. Claim 9—the gNB of claim 0, where the said gNB-CU determines the Ethernet MAC address of a client UE. Claim 10—the gNB-CU of claim 9 to use RRC signaling to determine UE MAC address. Claim 11—the gNB-CU of claim 9 to use notification of L2 Ethernet switch to determine UE MAC address. Claim 12—the gNB-CU of claim 9 to inspect PDCP SDU and read source MAC address in the Ethernet header to determine UE MAC address. Claim 13—the gNB-CU of claim 9 to notify a gNB-DU with the MAC address of all UEs which are client of this gNB-DU. Claim 14—the gNB-CU of claim 9 to configure the UE with a DRB with a filter rule to send all data with a given destination MAC address to this DRB. Claim 15—the gNB-CU of claim 14 to configure the DRB without active PDCP layer (in other work transparent PDCP layer). Claim 16, the gNB-DU of claim 1 to send all data received from one DRB from one UE with the destination MAC address of this data matching a configure MAC address to another DRB associated to another UE.

In some embodiments, methods for coexistence between Road-ITS and Rail-ITS systems may be used. ETSI has received a request by CEPT to provide solutions enabling a coexistence between Road-ITS and Rail-ITS systems in the upper 5.9 GHz band (5905-5925 MHz). For this purpose, a Joint Task Force of the Road ITS systems (TC ITS) and Rail communication systems (TC RT) committees has been created called JTFIR (Joint Task Force ITS Rail). JTFIR discusses solutions on how to achieve coexistence between such Road ITS and Rail ITS systems as illustrated in FIG.

Figure 29:
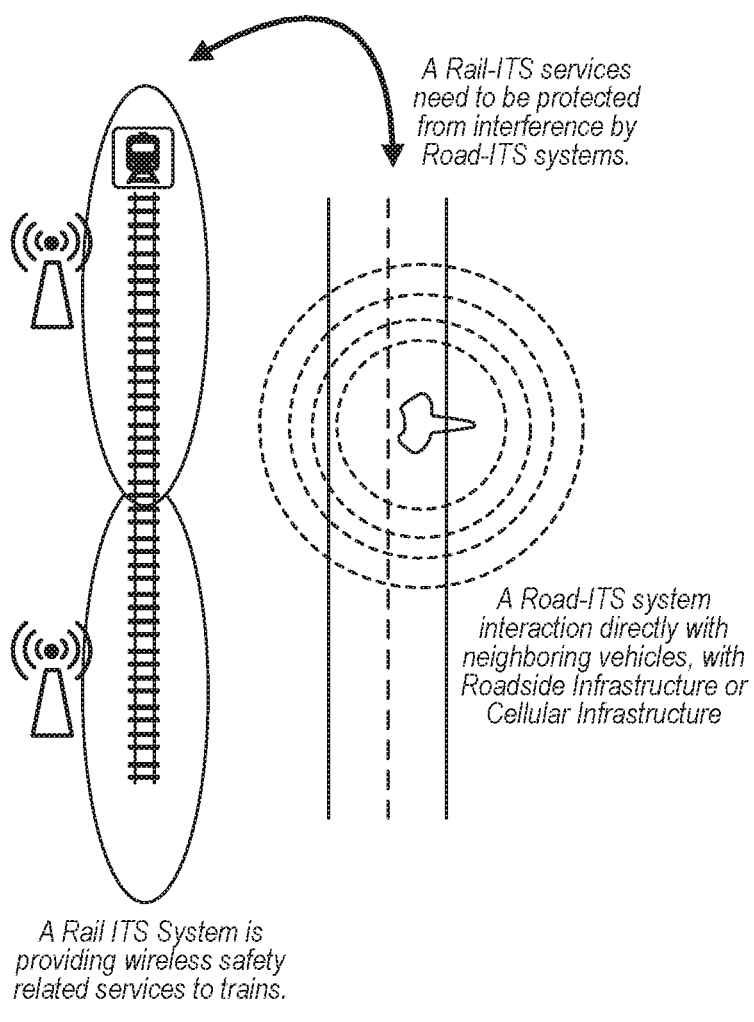
FIG. 29 illustrates an example scenario related to rail ITS in accordance with some embodiments.

29. In FIG. 29, a non-limiting example illustrates a Rail-ITS system being protected from Interference by Road-ITS systems.

A potential problem statement for some embodiments described herein is: how to ensure a suitable protection of Rail ITS services when Road ITS services may be operated in the same band (including but not limited to 5905-5925 MHz). Specifically, given that 3GPP new radio (NR) is used by RoadITS, how to handle the coexistence of the two ITS systems when same and different RAT technologies are used.

Herein are proposed several methods to tackle coexistence issues of Rail-ITS and Road-ITS systems. The proposed methods can improve the overall spectrum efficiency while meeting the high priority requirement of Rail-ITS.

A current solution is to reserve the upper 5.9 GHz band for Rail-ITS systems (5905-5925 MHz) exclusively and allocate Road-ITS to lower bands. This is highly inefficient since Rail-ITS systems are very sparsely distributed over the country.

In some embodiments, a Beacon based coexistence solution may take the specific requirements into account, including:—Beacon must be easily decodable by three distinct systems: ITS-G5/DSRC, LTE C-V2X and 5G NR V2X; Beacon should be provided by existing infrastructure (such as Road Side Units, Cellular Infrastructure, etc.); Beacon needs to protect Rail systems only when trains are actually approaching; and/or other.

Specifically, different scenarios where 3GPP and non-3GPP RATs are used by Rail-ITS and Road-ITS systems, are considered. A configurable NR based beacon signal and/or system information (SI) message are proposed for 3GPP RAT based Rail/Road-ITS system to communicate the exclusive frequency use for Rail-ITS system when needed. For scenario where non-3GPP RAT is used by RailITS, dual-mode gNB transceiver based solutions for Rail-ITS or Road-ITS are proposed to broadcast the beacon signal indicating the exclusive Rail-ITS frequency use.

Some embodiments described herein may enable the efficient usage of the upper 5.9 GHz band, in particular 5905-5925 MHz due to efficient sharing with Rail ITS systems. In areas where no Rail system is present or no train is approaching, no specific provisions need to be imposed to Road ITS systems. The frequency band will thus be largely available to Road ITS over most parts of the country.

Scenario 1 is based on NR based Rail-ITS and Road-ITS. In this scenario, both Rail-ITS and Road-ITS use NR technology. In order to protect Rail-ITS from being interfered by Road-ITS system, the following methods can be used. Method-1 is based on System information broadcasting about exclusive usage of Rail-ITS. In this method, Rail-ITS system shall broadcast a new system information (SI) message, e.g., named as SI-ExclusiveFreqForRailITS, which signals the exclusive frequency/spectrum usage of Rail-ITS services by an information element field, e.g., defined as exclusiveRailITS of Boolean type. Similar to other SI messages of LTE/NR, the SIB1 message schedules the time window and periodicity of the SI message SI-ExclusiveFreqForRailITS. When the SI-ExclusiveFreqForRailITS indicates the exclusively frequency usage of Rail-ITS system, all the other Non-Rail-ITS devices including RoadITS-gNBs and UEs shall not use the concerned frequency/spectrum for its communication.

Figure 30:
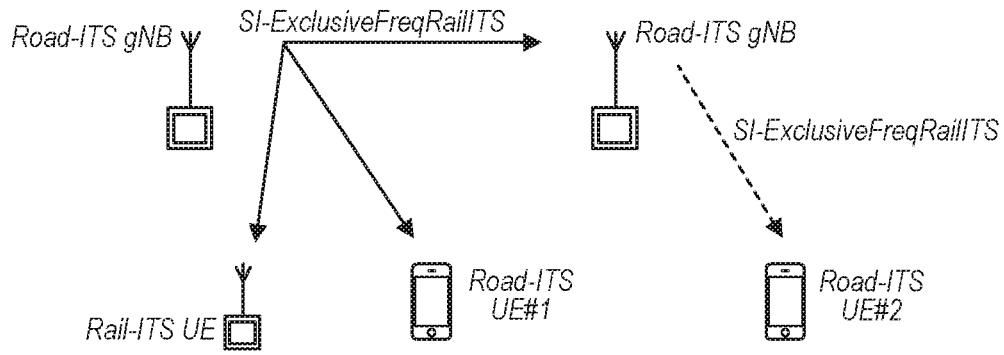
FIG. 30 illustrates an example scenario related to rail ITS in accordance with some embodiments.

FIG. 30 illustrates NR based co-existed Rail-ITS and Road-ITS systems. For Road-ITS UEs, e.g., UE #1 in FIG. 30, which can decode the SI-ExclusiveFreqForRailITS sent by RailITS gNB, they shall obey such restriction until an updated SI-ExclusiveFreqForRailITS message releasing the exclusive spectrum usage for Rail-ITS is received.

For Road-ITS gNBs which have a cell coverage overlapping with Rail-ITS, it can also monitor the SIExclusiveFreqForRailITS message from Rail-ITS gNB. Whenever Road-ITS gNB receives exclusive Rail-ITS spectrum usage from Rail-ITS gNB, it shall stop use the spectrum for Road-ITS communication. Moreover, if a second frequency/spectrum is available for the Road-ITS gNB, it can use the second spectrum/frequency to resume its Road-ITS communication and broadcast a SI message about the exclusive Rail-ITS spectrum usage to its served UEs, e.g., UE #2 in FIG. 30, operating at the second frequency to prevent them from attempting to use the Rail-ITS exclusive frequency/spectrum.

It is clear that the above SI-ExclusiveFreqForRailITS message serves as a "beacon" signal to prevent other Road-ITS gNB/UEs from using the exclusive spectrum during the time period in which high priority Rail-ITS traffic is transmitted.

To allow more efficient spectrum utilization adapting to actual Rail-ITS traffic demand, the Rail-ITS gNB can divide the spectrum to several bandwidth parts (BWP), and the SI-ExclusiveFreqForRailITS message can determine the actual amount of spectrum required by the current Rail-ITS traffic and signal the exclusive Rail-ITS BWP usage based on the actual traffic needs. For example, if shared spectrum is comprised of 4 non-overlapping BWPs, and only 2 of them are required by the current Rail-ITS traffic and signaled for the exclusive Rail-ITS usage by the SI-ExclusiveFreqForRailITS message, then the remaining two bandwidth parts can be still used by Road-ITS system.

As for the SI-ExclusiveFreqForRailITS message transmission timing, the following options can be used. In option-1.1, always-on transmission is used. In this option, the SI-ExclusiveFreqForRailITS is always transmitted within the allocated SI-window and indicates whether the whole ITS spectrum or some bandwidth parts in the spectrum shall be used exclusively for Rail-ITS system. FIG. 31 illustrates a scenario of periodic SI-ExclusiveFreqForRailITS transmitted in every allocated SI window. As shown in FIG. 31, the SI-ExclusiveFreqForRailITS message is transmitted in each allocated SI window. Specifically, as illustrated in FIG. 31, the SI-ExclusiveFreqForRailITS messages within the SI windows starting from t1, t2 and t4, indicate no Rail-ITS exclusive spectrum/BWP use, but the SIExclusiveFreqForRailITS message within the SI window starting from t3 signals exclusive Rail-ITS spectrum/BWP usage. As a result, the spectrum/BWP signaled by the SI-ExclusiveFreqForRailITS in SI window of t3 shall be exclusively used by Rail-ITS system from the transmission time of the SIExclusiveFreqForRailITS message until the SI message transmitted in the next SI window starting from t4 which releases the exclusive Rail-ITS spectrum use.

In option-1.2, transmission when exclusive Rail-ITS usage occurs is used. In this option, the SI-ExclusiveFreqForRailITS is only transmitted within the allocated SI-window when the ITS spectrum or some bandwidth parts thereof shall be exclusively used for Rail-ITS system. FIG. 32 illustrates a scenario in which SI-ExclusiveFreqForRailITS is transmitted only when exclusively Rail-ITS frequency used. As shown in FIG. 32, there is no SI-ExclusiveFreqForRailITS message transmitted within the SI windows starting from t1, t2 and t4, but the SI-ExclusiveFreqForRailITS message is only transmitted within the SI window starting from t3. As a result, the spectrum/BWP signaled by the SIExclusiveFreqForRailITS in SI window of t3 shall be exclusively used by Rail-ITS system from the transmission time of the SI-ExclusiveFreqForRailITS message until the end of the next SI window of t4 where no SI-ExclusiveFreqForRailITS message is transmitted.

In Method-2, a physical beacon signal indicating exclusive usage of Rail-ITS may be used. In this method as shown in FIG. 33, a physical beacon signal, e.g., named as Rail-ITSBeacon signal, can be designed and transmitted by Rail-ITS system whenever the exclusive Rail-ITS use is needed. The waveform characterized by e.g., the sequence, allocated time-frequency resource elements as well as the transmission periodicity, can be configured/broadcasted by the SI message in Rail/Road-ITS system. When the Rail-ITSBeacon signal is transmitted and detected by non-Rail-ITS devices, all the Non-Rail-ITS devices including Road-ITS gNBs and UEs shall not use the Rail-ITS exclusive frequency/spectrum for their communications. FIG. 33 illustrates a scenario in which Physical Beacon signal based exclusive Rail-ITS spectrum usage is used. To enable finer granularity of exclusive Rail-ITS spectrum usage, the Rail-ITSBeacon can be associated with a particular bandwidth part within the Rail-ITS spectrum instead of the whole ITS spectrum. And different bandwidth parts can have own RailITSBeacon signal configuration. When a particular BWP needs to be exclusively used by Rail-ITS system, only the respective RailITSBeacon signal is transmitted.

Scenario 2 may be related to: Non-NR/Non-3GPP RAT based Rail-ITS and NR based Road-ITS. It is envisioned that Rail-ITS system can use other radio access technology (RAT) than 3GPP RAT. Such non-3GPP RAT can include DSRC or proprietary solution. In such case, in order to avoid 3GPP RAT based Road-ITS system from interfering incumbent Rail-ITS system, the following methods are proposed to cope with the problem.

Method-3 may be related to: Non-3GPP RAT based Rail-ITS transmitting 3GPP RAT compliant beacon signal. In this method, the Rail-ITS system can include a simple transmitter capable of sending the 3GPP/NR compliant "beacon" channel/signal as proposed for scenario 1 in Method-1 and Method2. For example, the DSRC/proprietary Rail-ITS transmitter can send a beacon signal and/or the SI message about the configuration of the beacon signal, so that NR based Road-ITS gNBs/UEs can detect such beacon signal and consequently avoid to use the exclusive Rail-ITS frequency resources whenever needed as shown in FIGS. 30 and 33. To send 3GPP RAT compliant beacon and/or SI message, non-3GPP RAT based Rail-ITS actually is equipped with a dual-mode transceiver wherein main ITS traffic is communicated through non-3GPP RAT and beacon signal/channel for exclusive frequency-occupation is signaled by 3GPP/NR technology.

Method-4 may be related to: 3GPP RAT based Road-ITS receiving non-3GPP RAT based beacon signal. In this method, the 3GPP RAT based Road-ITS gNB shall be able to detect the non-3GPP RAT based beacon signal transmitted by Rail-ITS system. For example, if Rail-ITS system is based on DSRC, and a DSRC compliant beacon signal is transmitted by Rail-ITS system when exclusive use of the concerned frequency resources is required, 3GPP RAT based Road-ITS gNB shall include a simple DSRC beacon signal receiver so as to detect such DSRC beacon signal. When the DRSC based frequency-occupation beacon signal is detected by 3GPP RAT based Road-ITS gNB, the Road-ITS gNB shall broadcast, as shown in FIGS. 30 and 33, 3GPP RAT based beacon signal and/or the respective SI message about the exclusive Rail-ITS use of the concerned frequency resources. As a result, all 3GPP RAT based Road-ITS devices in the coverage of Road-ITS gNB, i.e., in the vicinity of Rail-ITS system, shall not use the shared spectrum when Rail-ITS exclusive spectrum usage is needed.

To receive DSRC/proprietary solution based beacon signal, 3GPP RAT based Road-ITS gNB actually has a dual-mode transceiver whereby main ITS traffic is communicated through 3GPP RAT and beacon signal for exclusive frequency-occupation is received by a non-3GPP RAT receiver.

In some embodiments, methods of UE reception of "Beacon" signal/channel may be used. A basic principle is illustrated below—a weighted sync sequences (e.g., through suitable weighting or rotation of the sync sequence (e.g., multiplication of (part of) the sync sequence by $e^{\{j^* \ldots \}}$ such as $e^{\{j^*pi/2\}}$ or similar) or a simple-to-detect signal carrying a single bit (or 2 bits) may be used. FIG. 34 illustrates a non-limiting example Beacon for Rail-ITS system.

Option-1 is related to: Cheap low-end Client Device, only partially able to decode beacon (such as cheap IEEE DSRC/ITS-G5 solution which is not able to decode a LTE C-V2X based beacon). In such a case, it is assumed that the Client Device will be able to decode the Sync Sequence and to extract the simple 1-bit/2-bits message which is encoded in the sync sequence or contained in a later part of the frame (e.g., immediately following the sync sequence).

Figure 35:
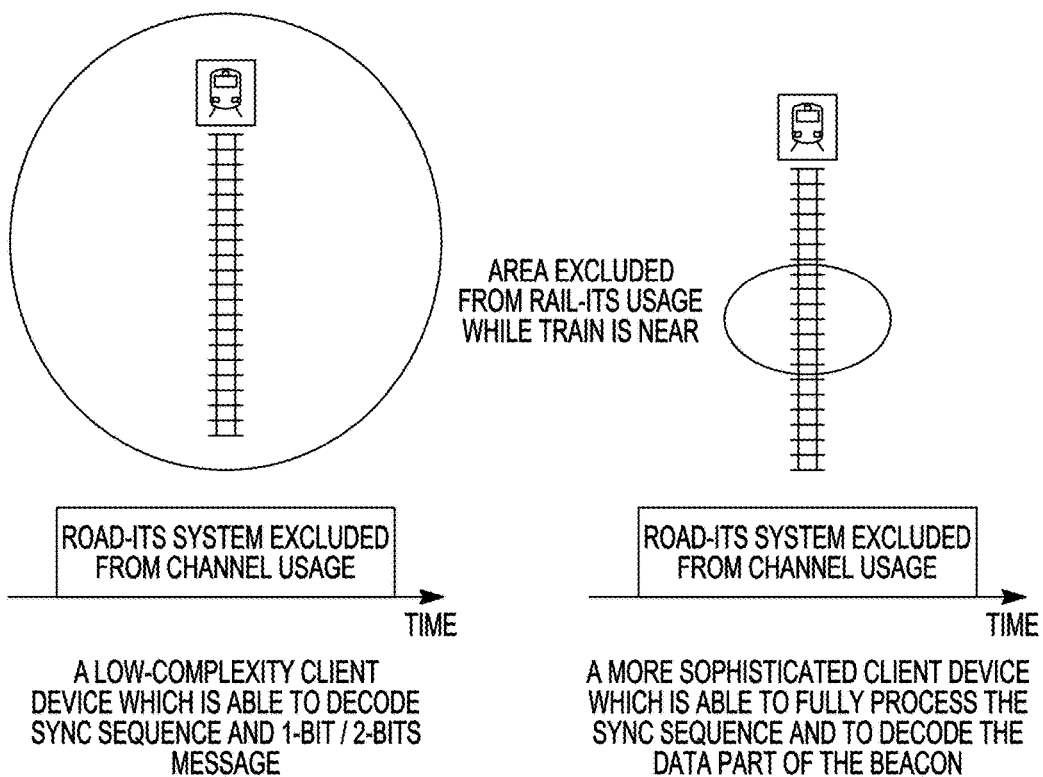
FIG. 35 illustrates an example scenario related to rail ITS in accordance with some embodiments.

Only a more sophisticated client may indeed be able to decode the full data part which may consist of information such as i) exact geographic protection area and its evolution over time, ii) exact train arrival schedule in which geographic area, etc. It is obvious that such a more sophisticated Client will have more information and the off-time (i.e., Client required to stay silent on the shared Rail-/Road-ITS channel) is minimized. The basic principle is illustrated in FIG. 35. FIG. 35 may be related to: a level of available information i) for a low-complexity Client Implementation (e.g., IEEE 802.11 based system accessing to 3GPP Beacon) and ii) for a more sophisticated beacon accessing to the full information of the beacon.

Option-2 may be related to: a Client Device implementation being able to decode the entire beacon (such as a LTE CV2X Client Device which is able to decode a LTE C-V2X based beacon). In such a case, the Client device will have typically access to the following information: —Exact geographic area to protected and its evolution over time—Exact schedule of arriving trains, precisely defining the area to be protected—If available, counter indicating until when the beacon will not change over time (this is typically possible since it is known a-priori to the source of the beacon when a new train will be arriving, etc.). Based on this information, a more fine-grained estimation is possible in order to determine when and where exactly Rail-ITS systems need to be protected.

Example claims are given below. Some claims may be related to: scenario 1: NR based Rail-ITS and Road-ITS; method-1: System information broadcasting about exclusive usage of Rail-ITS; and/or other. 1. In the scenario where both Rail-ITS and Road-ITS use NR technology, Rail-ITS system shall broadcast a new system information (SI) message, e.g., named as SIExclusiveFreqForRailITS, which signals the exclusive frequency/spectrum usage of Rail-ITS services by an information element field, e.g., defined as exclusiveRailITS of Boolean type. 2. The system information block 1 (SIB1) message schedules the time window and periodicity of the SI message SI-ExclusiveFreqForRailITS. 3. When the SI-ExclusiveFreqForRailITS indicates the exclusively frequency usage of Rail-ITS system, all the other Non-Rail-ITS devices including Road-ITS-gNBs and UEs shall not use the concerned frequency/spectrum for its communication. 4. For Road-ITS UEs, e.g., UE #1 in FIG. 30, which can decode the SI-ExclusiveFreqForRailITS sent by Rail-ITS gNB, they shall obey such restriction until an updated SI-ExclusiveFreqForRailITS message releasing the exclusive spectrum usage for Rail-ITS is received. 5. For Road-ITS gNBs which have a cell coverage overlapping with Rail-ITS, it can also monitor the SI-ExclusiveFreqForRailITS message from Rail-ITS gNB. Whenever Road-ITS gNB receives exclusive Rail-ITS spectrum usage from Rail-ITS gNB, it shall stop use the spectrum for Road-ITS communication. 6. If a second frequency/spectrum is available for the Road-ITS gNB, it can use the second spectrum/frequency to resume its Road-ITS communication and broadcast a SI message about the exclusive Rail-ITS spectrum usage to its served UEs, e.g., UE #2 in FIG. 30, operating at the second frequency to prevent them from attempting to use the Rail-ITS exclusive frequency/spectrum. 7. The Rail-ITS gNB can divide the spectrum to several bandwidth parts (BWP), and the SIExclusiveFreqForRailITS message can determine the actual amount of spectrum required by the current Rail-ITS traffic and signal the exclusive Rail-ITS BWP usage based on the actual traffic needs. 8. If shared spectrum is comprised of x non-overlapping BWPs, and only y of them are required by the current Rail-ITS traffic and signaled for the exclusive Rail-ITS usage by the SI-ExclusiveFreqForRailITS message, then the remaining two bandwidth parts can be still used by Road-ITS system.

Some claims may be related to: Option-1.1: always-on transmission; and/or other. 9. The SI-ExclusiveFreqForRailITS can be always transmitted within the allocated SI-window and indicates whether the whole ITS spectrum or some bandwidth parts in the spectrum shall be used exclusively for Rail-ITS system. 10. As shown in FIG. 31, the SI-ExclusiveFreqForRailITS message is transmitted in each allocated SI window. For example, as illustrated in FIG. 31, the SI-ExclusiveFreqForRailITS messages within the SI windows starting from t1, t2 and t4, indicate no Rail-ITS exclusive spectrum/BWP use, but the SI-ExclusiveFreqForRailITS message within the SI window starting from t3 signals exclusive Rail-ITS spectrum/BWP usage. As a result, the spectrum/BWP signaled by the SI-ExclusiveFreqForRailITS in SI window of t3 shall be exclusively used by Rail-ITS system from the transmission time of the SIExclusiveFreqForRailITS message until the SI message transmitted in the next SI window starting from t4 which releases the exclusive Rail-ITS spectrum use.

Some claims may be related to Option-1.2: transmission when exclusive Rail-ITS usage occurs. 11. The SI-ExclusiveFreqForRailITS can be only transmitted within the allocated SI-window when the ITS spectrum or some bandwidth parts thereof shall be exclusively used for RailITS system. 12. As shown in FIG. 32, there is no SI-ExclusiveFreqForRailITS message transmitted within the SI windows starting from t1, t2 and t4, but the SI-ExclusiveFreqForRailITS message is only transmitted within the SI window starting from t3. As a result, the spectrum/BWP signaled by the SI-ExclusiveFreqForRailITS in SI window of t3 shall be exclusively used by Rail-ITS system from the transmission time of the SI-ExclusiveFreqForRailITS message until the end of the next SI window of t4 where no SI-ExclusiveFreqForRailITS message is transmitted.

Some claims may be related to Method-2: Physical beacon signal indicating exclusive usage of Rail-ITS. 13. As shown in FIG. 33, a physical beacon signal, e.g., named as RailITSBeacon signal, can be designed and transmitted by Rail-ITS system whenever the exclusive Rail-ITS use is needed. 14. The waveform of beacon signal in example 13 characterized by e.g., the sequence, allocated time-frequency resource elements as well as the transmission periodicity, can be configured/broadcasted by the SI message in Rail/Road-ITS system. 15. When the RailITSBeacon signal is transmitted and detected by non-Rail-ITS devices, all the Non-Rail-ITS devices including Road-ITS gNBs and UEs shall not use the Rail-ITS exclusive frequency/spectrum for their communications. 16. The RailITSBeacon signal can be associated with a particular bandwidth part within the Rail-ITS spectrum instead of the whole ITS spectrum. And different bandwidth parts can have own RailITSBeacon signal configuration. When a particular BWP needs to be exclusively used by Rail-ITS system, only the respective RailITSBeacon signal is transmitted.

Some claims may be related to Scenario 2: Non-NR/Non-3GPP RAT based Rail-ITS and NR based Road-ITS. Some claims may be related to Method-3: Non-3GPP RAT based Rail-ITS transmitting 3GPP RAT compliant beacon signal. 17. For Rail-ITS system using non-3GPP RAT, the Rail-ITS system can include a simple transmitter capable of sending the 3GPP/NR compliant "beacon" channel/signal as proposed for scenario 1 in Method-1 and Method-2. 18. Non-3GPP RAT based, e.g. DSRC/proprietary, Rail-ITS transmitter can send a beacon signal and/or the SI message about the configuration of the beacon signal, so that NR based Road-ITS gNBs/UEs can detect such beacon signal and consequently avoid to use the exclusive Rail-ITS frequency resources whenever needed as shown in FIGS. 30 and 33. 19. Non-3GPP RAT based Rail-ITS actually is equipped with a dual-mode transceiver wherein main ITS traffic is communicated through non-3GPP RAT and beacon signal/channel for exclusive frequency-occupation is signaled by 3GPP/NR technology.

Some claims may be related to Method-4: 3GPP RAT based Road-ITS receiving non-3GPP RAT based beacon signal. 20. For non-3GPP RAT based, e.g., DSRC or proprietary, beacon signal, the 3GPP RAT based Road-ITS gNB shall be able to detect the non-3GPP RAT based beacon signal transmitted by Rail-ITS system. 21. If Rail-ITS system is based on DSRC, and a DSRC compliant beacon signal is transmitted by Rail-ITS system when exclusive use of the concerned frequency resources is required, 3GPP RAT based Road-ITS gNB shall include a simple DSRC beacon signal receiver so as to detect such DSRC beacon signal. 22. When the DRSC based frequency-occupation beacon signal is detected by 3GPP RAT based Road-ITS gNB, the Road-ITS gNB shall broadcast, as shown in FIGS. 30 and 33, 3GPP RAT based beacon signal and/or the respective SI message about the exclusive Rail-ITS use of the concerned frequency resources. As a result, all 3GPP RAT based Road-ITS devices in the coverage of Road-ITS gNB, i.e., in the vicinity of Rail-ITS system, shall not use the shared spectrum when Rail-ITS exclusive spectrum usage is needed. 23. To receive DSRC/proprietary solution based beacon signal, 3GPP RAT based Road-ITS gNB actually has a dual-mode transceiver whereby main ITS traffic is communicated through 3GPP RAT and beacon signal for exclusive frequency-occupation is received by a non-3GPP RAT receiver.

Figure 36:
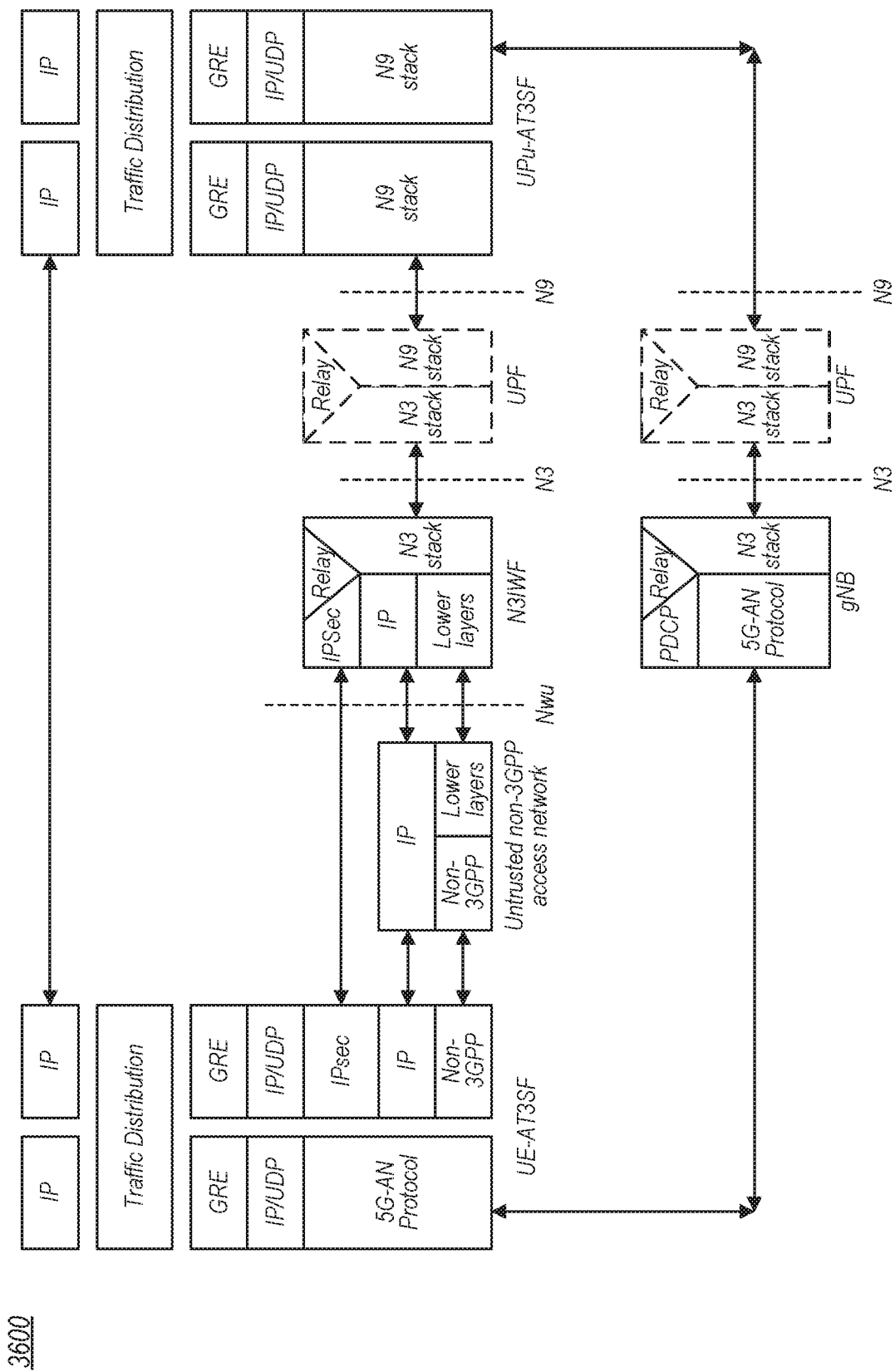
FIG. 36 illustrates example protocol layers in accordance with some embodiments.

In some embodiments, Multi-Access Convergence Methods may support Access Traffic Steering, Switching, and Splitting (ATSSS) in Next-Gen 3GPP Cellular Network integrated with Non-3GPP Network. As shown in FIG. 36, a GRE tunneling based user plane convergence method was included in TR 23.793 as one of the options for solution #1, wherein the GRE tunnel is terminated at UPu-AT3SF on the network side. On the other hand, the GRE tunneling method is used as the user-plane transport for non3GPP Access via N3IWF (see FIG. 37), wherein the GRE tunnel is terminated at N3IWF. As a result, we observed that the GRE-based method would require establishing two GRE tunnels, one terminating at N3IWF, and the other terminating at UPu-AT3SF (see FIG. 38).

GRE is originally designed for tunneling, and its header format has already been specified in RFC 2784 and RFC 2890. Hence, it is difficult to extend for new usages, such as ATSSS. For example, we may want to support fragmentation or concatenation in the convergence layer if the MTU size is very different between the 3GPP network and the non-3GPP network. Lastly, GRE requires additional IP-over-IP tunneling, adding overhead to the user-plane.

Figure 37:
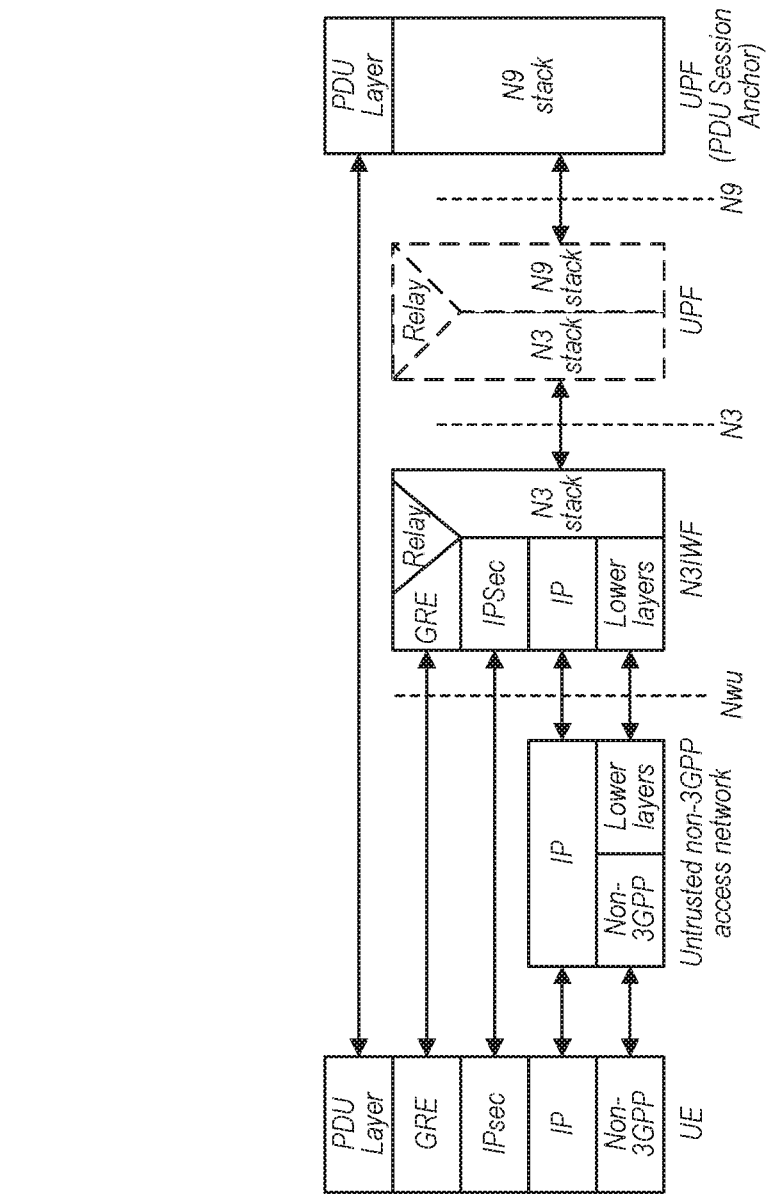
FIG. 37 illustrates example protocol layers in accordance with some embodiments.
Figure 38:
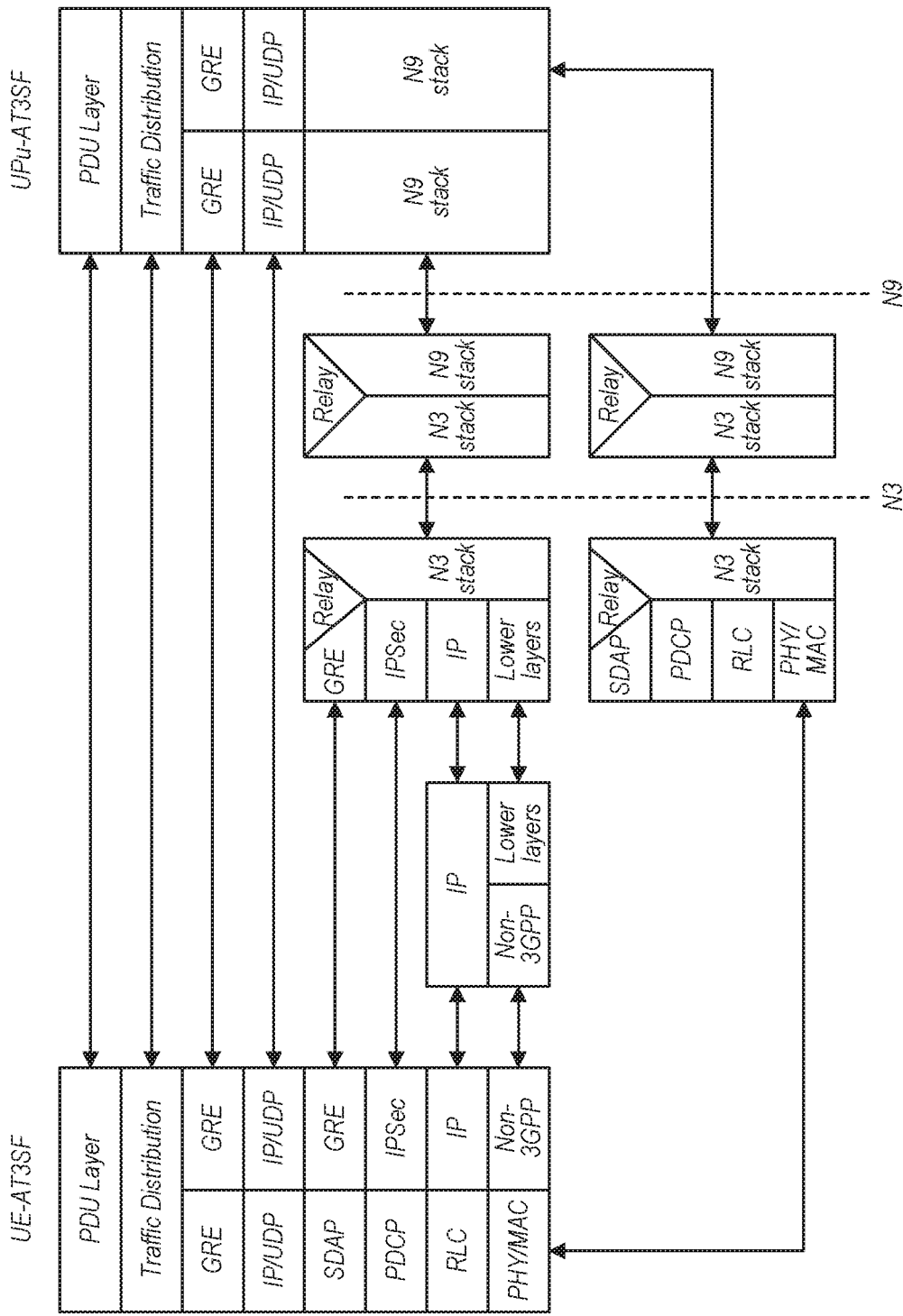
FIG. 38 illustrates example protocol layers in accordance with some embodiments.

FIG. 36 illustrates a User Plane Protocol Stack with GRE tunnel between UE-AT3SF and UPu-AT3SF (TR 23.793). FIG. 37 illustrates a User Plane Protocol Stack with GRE tunnel between UE and N3IWF (TS 23.501). FIG. 38 illustrates a GRE tunneling based ATSSS User Plane Stack.

Some embodiments described herein may be related to an alternative u-plane convergence method by appending the additional control information, e.g. Sequence Number, for convergence as a trailer, and avoid the IPover-IP tunneling overhead. Moreover, the trailer format can be customized to meet the specific requirements of ATSSS.

In some embodiments, a method allows transport of the PDN PDUs across both accesses with the generic Multi-Access (GMA) convergence user-plane protocol. The GMA protocol appends new control info as a trailer to avoid the use of IP-over-IP tunneling. FIG. 39 shows the trailer-based GMA convergence PDU format for IP-based and Ethernet-based PDU session respectively. If the PDU session is based on IP, the "Protocol Type" field of the IP header, is set to a special value, e.g. 114 ("any 0-Hop protocol" for IP-based PDU session), to indicate the presence of the GMA Trailer. The "Length" field and the "Checksum" field in the IP header are recalculated with the GMA trailer. The original "Protocol Type" value of the IP packet is stored in the GMA trailer. If the PDU session is based on Ethernet, the "Eth-Type" field of the Ethernet frame header, is set to a special value, e.g. 114 ("any 0-Hop protocol" for IP-based PDU session), to indicate the presence of the GMA Trailer. The "CRC Checksum" field at the end of the Ethernet frame is recalculated with the GMA trailer. The original "EthType" value of the IP packet is stored in the GMA trailer. FIG. 39 illustrates a Trailer-based Convergence Data PDU Format: a) illustrates a PDU session Type: IP v4 or v6, b) illustrates: PDU session Type: Ethernet.

The GMA trailer format can be flexibly specified to meet today and future needs. For example, if a Non3GPP connection, 5G, has a much bigger MTU size (e.g. 9K) than the 5G connection, the GMA convergence protocol can support concatenation, i.e. putting multiple IP packets into a single (bigger) GMA PDU, to improve data transfer efficiency, and the GMA trailer will carry necessary info for segmentation and reassembly. In another example, the trailer-based GMA convergence sublayer may support aggregation, i.e. using multiple connections/paths to deliver an IP flow for higher e2e throughput, and the GMA trailer will carry necessary info, e.g. Sequence Number, for splitting and reordering. The GMA trailer may also carry information, e.g. Connection ID, to indicate which access or connection should be used to deliver the Ethernet frame. If multiple PDU sessions are active simultaneously, the GMA trailer may also carry a PDU session ID to identify which PDU session a packet or frame belongs to. The associated user plane protocol stack is shown in FIG. 40. FIG. 40 illustrates a User Plane Protocol Stack with Trailer-based GMA protocol between UE-AT3SF and UPuAT3SF.

In some embodiments, a procedure to measure one-way-delay (OWD) between UE-AT3SF and UPuAT3SF may be used. FIG. 41 shows the Control Plane Protocol Stack between UE-AT3SF and UPc-AT3SF over multiple accesses. The Traffic Distribution layer is needed to distribute the traffic of the control message via a UDP connection corresponding to the associated access. In support of multiple accesses, the UDP connection needs to be established with the corresponding access for delivering the control message. For a MA-PDU session using the same IP address, multiple UDP connections are established, one per access, for MACM between UE-AT3SF and UPc-AT3SF. The UPc-AT3SF sends control message to UEAT3SF via a UDP flow over the corresponding access. FIG. 41 illustrates a Control Plane Protocol Stack between UE-AT3SF and UPc-AT3SF.

The OWD evaluation procedure is executed under the control of the UPc-AT3SF on the two or more accesses for which OWD is to be evaluated. The UPc-AT3SF sends a PROBE_REQ to the terminal over the chosen access. The PROBE_REQ carries the following information: Sequence Number (SN): to identify the PROBE_REQ message itself; Connection ID (CID), to indicate the access (connection) that is used to send the PROBE_REQ message; Reverse Connection ID (R-CID): to indicate the access (connection) that is used to send the corresponding PROBE_ACK message.

The terminal device is expected to reply as soon as possible with a PROBE_ACK that carries the same Sequence Number that was received in the PROBE_REQ. On receiving the PROBE_ACK, the UPc-AT3SF determines the updated value of the RTT of the associated link. The PROBE_REQ carries the following information: Sequence Number (SN): to identify the corresponding PROBE_REQ message; Connection ID (CID), to indicate the access (connection) that is used to send the PROBE_ACK message.

If downlink OWD is to be evaluated, PROBE_REQ will be sent over multiple accesses respectively, and PROBE_ACK will be sent back over the same access. Similarly, if uplink OWD is to be evaluated, PROBE_REQ will be sent over the same access, and PROBE_ACK will be sent over multiple accesses respectively.

FIG. 42 shows an example. In this example, Wi-Fi access is identified as CID=1, and the 3GPP access is identified as CID=0. As shown in the FIG. 42, PROBE_REQ #3 is sent over the 3GPP access, and PROBE_REQ #4 is sent over the Wi-Fi access. On the reverse path, both PROBE_ACK #3 and #4 are sent over the 3GPP access. After that, UPc-AT3SF can evaluate (downlink) OWD of the two accesses by comparing RTT #3 and #4 measurements. FIG. 42 illustrates a network-initiated OWD evaluation procedure.

The OWD evaluation procedure may be initiated by UE. FIG. 43 shows an example. As shown in FIG. 43, both PROBE_REQ #3 are #4 are sent over the 3GPP access. On the reverse path, PROBE_ACK #3 and #4 are sent over the 3GPP access and the Wi-Fi access respectively. After that, UE-ATS3F can evaluate (uplink) OWD of the two accesses by comparing RTT #3 and #4 measurements. FIG. 43 illustrates a UE-initiated OWD evaluation procedure.

Example claims are described below. 1. A method to support trailer-based convergence protocol between UE and 3GPP network. 2. A new or special IP protocol type is used to indicate the presence of the trailer in a IP packet, and the original IP protocol type of the packet is stored in the trailer.

3. A new or special Ether-Type is used to indicate the presence of the trailer in a Ethernet frame, and the original Ether-Type of the frame is stored in the trailer. 4. The GMA trailer may carry additional control information to support convergence, for example, sequence number, fragmentation & concatenation control info, delivery access/connection ID, PDU connection/session ID, and traffic class ID. 5. A new control protocol stack to support Multi-Access control message exchange between UE and 3GPP network. 6. A new traffic distribution function to steer Multi-Access control message towards an access/connection based on UDP port number. 7. A new OWD evaluation procedure to evaluate and compare one-way-delay among multiple accesses/connections through round trip time measurements. 8. A new control field in the Probe REQ (Ping-REQ) message to indicate the access/connection that the Probe ACK (Ping-RSP) should be using for delivery.

Some embodiments may be related to early data transmission. Some embodiments may be related to control plane and user plane optimization for NAS early data transmission.

The work item for even further enhanced MTC for LTE and further enhancement for NB-IoT have a common objective: Evaluate power consumption/latency gain and specify necessary support for DL/UL data transmission on a dedicated resource during the Random Access procedure (after PRACH transmission and before the RRC connection setup is completed.

As a part of this work, the following was agreed in RAN2 #99: intend to support early UL data transmission in Msg3 for control plane and user plane CIoT EPS optimization; intend to support early DL data transmission in Msg4 for control plane and user plane CIoT EPS optimization; early data transmission feature is considered when AS security was not established for only transmitting data using CP. Early data transmission feature is considered when AS security was established for transmitting data using CP and/or UP.

Herein is proposed potential solution(s) for early DL data transmission for CP DL data. The problem addressed in this document is to send DL data from the MME to the UE (UE is in IDLE mode) by enabling early data transmission between eNB and UE in message 3 (RRC connection request) and message 4 (RRC connection setup) and associated enhancements required on the core network to support early DL CP data transmission.

One or more of the solutions presented here includes enhancements proposed between MME and eNB to support early data transmission of the CP data on RRC message 3 and message 4.

Some embodiments may relate to UE early data transmission capability information update: If a UE is capable of supporting control plane and/or user plane optimization, it sends an early data transmission capability indication to the network during the Attach procedure. The new capability indication bit introduced in the UE core network capability IEI is shown in the figure below. If a UE does not support both control plane and user plane CIoT optimization, then the early data transmission bit in the UE network capability IEI is set to not be supported.

An element such as element 4400 in FIG. 44 may be used. One or more of the following may be applicable: control plane CIoT EPS optimization (CP CIoT) (octet 8, bit 3), this bit indicates the capability for control plane CIoT EPS optimization; control plane CIoT EPS optimization not supported; control plane CIoT EPS optimization supported; user plane CIoT EPS optimization (UP CIoT) (octet 8, bit 4), this bit indicates the capability for user plane CIoT EPS optimization; user plane CIoT EPS optimization not supported; user plane CIoT EPS optimization supported; early data transmission optimization (ED Tx) (octet 9, bit 4), this bit indicates the capability for early data transmission for CIoT EPS optimization; early data transmission optimization not supported; early data transmission optimization supported.

Alternatively, different indications are used to signal the UE's capability on whether early data transmission is supported for data sent over CP, and/or for data sent over CP CIoT optimization, and/or for data sent over UP, and/or for data sent over UP CIoT optimization. This could be done with independent bits or via a group of bits (e.g. with 2 bits up to 4 options can be signaled).

Some embodiments may be related to optimization for DL NAS early data transmission. Consider the mobile terminating case—the UE is in IDLE mode; downlink data for the UE has arrived at the MME. A proposed solution and the associated call flow for early transmission of DL control plane data to the UE is given below. Option #1: S1 AP paging message includes early DL data. 1) When the DL data arrives at the MME, it sends the S1AP paging message to one or more eNB(s) in which the UE is registered based on the optimization techniques selected. The S1AP paging message can include a new information element to carry the CP DL data to be sent to the UE. 2) Upon reception of the S1AP paging message, the eNB stores the DL data (which was sent in the S1AP paging message) with the associated S-TMSI which is also sent in the UE paging identity IE of the S1AP paging message. 3) There are different approaches considered for sending the DL CP data from the eNB to the UE: 3a) DL data send after UL data or any other UL NAS PDU: When the UE sends the UL NAS data PDU in message 3 (or any other UL NAS PDU), the eNB sends the DL data for this UE (stored in the eNB) in message 4. 3b) DL data sent without UL data (with early data transmission indication): When the UE sends message 3 without UL NAS data PDU then the UE includes the early data transmission indication to receive any DL data stored for this UE in the eNB in message 4. The early data transmission indication is required in the message 3 (though the UE has indicated its capability for early data transmission in the network capability IE during the Initial attach procedure) since the eNB has no context maintained in the UE when the UE is in IDLE mode. The early data indication received by the eNB in message 3 confirms that the eNB can send any DL data for the UE in message 4. 3b) DL data sent without UL data and without any early data transmission indication: As the eNB already have the early data for DL, the eNB knows that this UE supports early data transmission feature by fetching the context of UE when S-TMSI is received in msg3. Therefore upon receiving msg.3 (RRCConnectionRequest message with S-TMSI), the eNB can send msg.4 with the DL NAS PDU. 4) The following options are considered here for sending DL data delivery confirmation to the MME: 4a) No UL NAS data PDU sent by UE in message 5: When the eNB sends the DL data (stored in the eNB) to the UE through message 4 as shown in FIG. 45: a) the eNB generates a S1AP data delivery indication message to indicate that the previous DL data sent to the UE from the MME is successfully delivered to the UE. The eNB may send the S1AP data delivery indication message to the MME, i) before the DL NAS PDU is sent over the message 4. ii) after the DL NAS PDU is sent over the message 4. b) the eNB sends a NAS delivery notification to the MME to report the successful delivery of the NAS PDU to the UE that was previously received within a DOWNLINK NAS TRANSPORT message. c) After msg4, UE goes back to RRC IDLE mode. In another option, msg includes a stay in IDLE indication which tells UE to go to IDLE mode. In FIG. 45, S1 AP paging message includes early DL data and no UL data follows (option #1). 4b) UL NAS data PDU sent by UE in message 5: There is no UL NAS data PDU sent from the UE in message 3 (message 3 may include the early data transmission indication). The eNB sends the DL data (stored in the eNB) to the UE through message 4 as shown in FIG. 2. The UE sends a UL NAS PDU in message 5 to report the successful delivery of the DL data sent by the MME. The eNB sends an S1AP message embedded with the UL NAS PDU (report of DL data delivery) sent by the UE in message 5 to the MME. After msg5, UE may go back to RRC IDLE mode or eNB may send RRC connection release message after receiving msg5.

Figure 46:
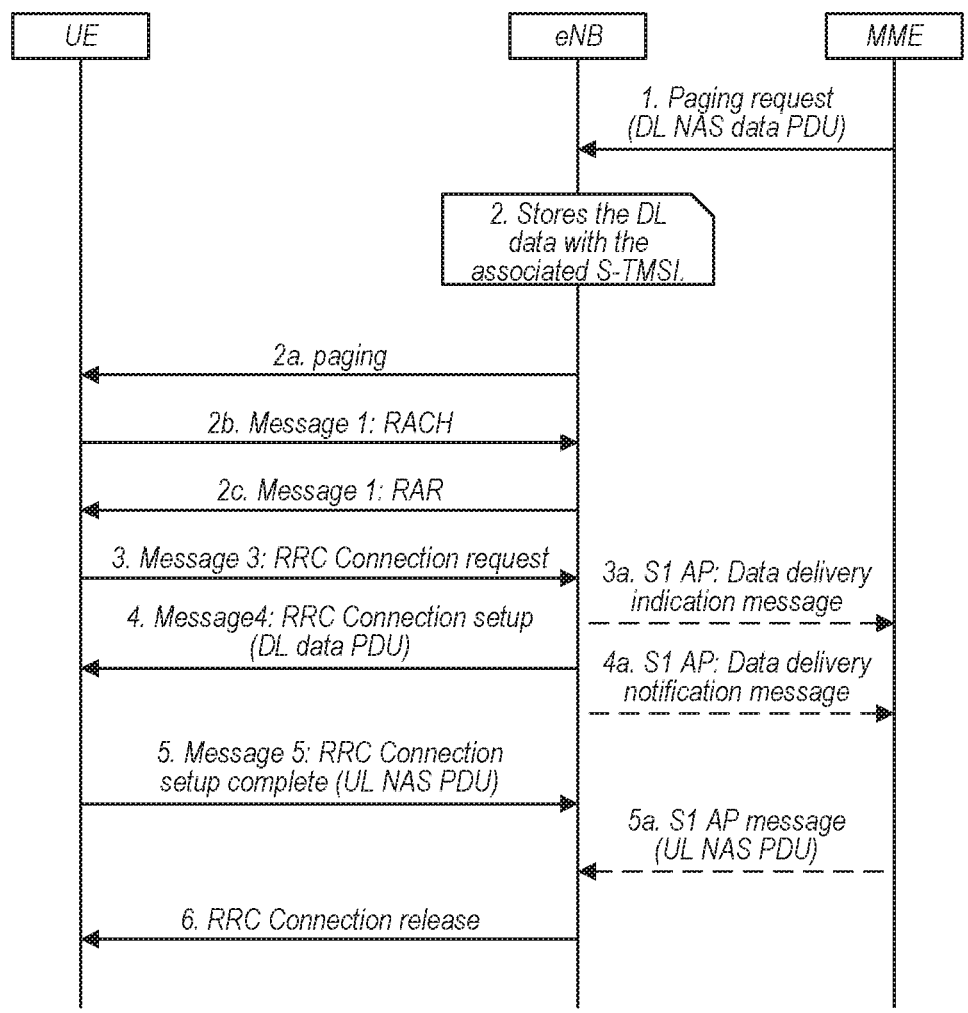
FIG. 46 illustrates example messages that may be exchanged in accordance with some embodiments.

One of the call flow for MT early data transmission is presented in FIG. 46. In FIG. 46, S1 AP paging message includes early DL data and UL data follows (option #1). Option #2: S1 AP paging message includes only early DL data indication 1.) When MME has a control DL data, it sends the S1-AP paging message which includes the DL data indication field set. 2.) Upon eNB receives the S1AP paging message, the eNB detects the early data indication for a given UE to be paged (A) In one option, it sends the RAN paging message with early DL data indication. This indication can be sent as a new IE defined within the RAN paging message. a. UE detects the early DL data transmission in the RAN paging message b. UE sends msg1 with early data transmission indication. Alternatively, a new PRACH resource (new preamble set) can be allocated for indication of DL EDT so that eNB knows it needs to provide UL grant in RAR that is sufficient to transmit service request or dedicatedInfoNAS message (no UL data) in Msg3 avoiding excessive padding. c. eNB provides the larger UL grant for msg3 with the NAS service request message. Note that step b can be optional as the eNB can keep the early data indication for the given UE and upon eNB receives the UE's msg.3, the eNB could directly know via its UE ID that DL early data transmission is waiting in MME to be sent.

(B) In another option, it sends the legacy RAN paging message. a. UE receives the legacy paging message b. UE sends msg1. c. Since eNB knows there is DL data indication and UE needs to send the service request message, the eNB provides the larger UL grant for Msg3 with the NAS service request message.

Alternatively UE does not sent any NAS PDU in Msg3 but instead eNB upon receiving UE's Msg3, it triggers some form of S1AP indication or message to MME that let it know when the given UE is requesting the establishment of the connection and DL early data can be sent to eNB so it gets included in Msg4. d. An EDT capable UE always prepares two types of RRC messages upon reception of legacy RRC paging message or upon reception of paging message indicating DL EDT, 1) legacy RRCConnectionRequest message with S-TMSI and 2) RRCEarlyDataRequest message with dedicatedInfoNAS (but without UL user data) and a new release cause "mt-access". When UE receives the larger grant that can fit the RRCEarlyDataRequest, it transmits the RRCEarlyDataRequest message otherwise legacy RRCConnectionRequest message and optionally with the spare bit set to "1" to indicate it supports DL EDT as shown in figure below. a. In another option, UE may use EDT preamble in Msg1 to request for EDT grant.

Figure 47:
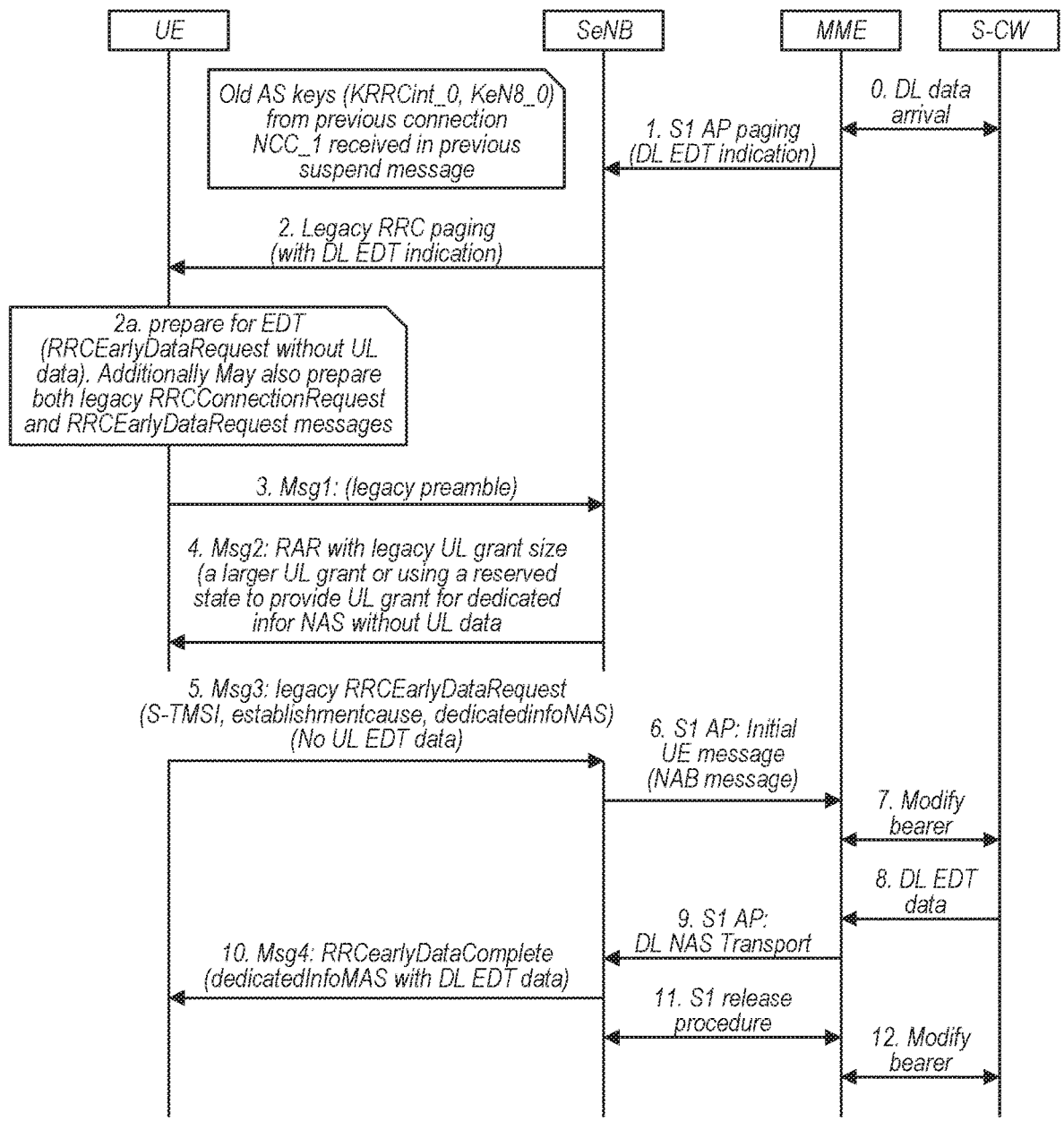
FIG. 47 illustrates example messages that may be exchanged in accordance with some embodiments.

In FIG. 47, S1 AP paging message includes only early DL data indication but with legacy preamble (option #2.2.B).

(C) In another option, eNB sends the RAN paging message with DL EDT indication. This indicates UE to transmit legacy preamble in Msg1. eNB provides the legacy UL grant for Msg3. UE now includes the S-TMSI in RRCConnectionRequest message and sends in msg3. Using S-TMSI, eNB retrieves the UE context and knows UE capability for DL EDT in msg4. Then after receiving DL EDT data from MME, eNB sends RRCEarlyDataComplete message with EDT DL data to UE. If eNB is not able to retrieve the UE context and know UE capability for DL EDT within contention resolution window period, it sends RRCConnectionSetup or RRCConnectionReject message. UE may indicate the DL EDT capability indication during initial attach procedure. (D) In another option, it sends the RAN paging message with explicit Random Access Preamble (ra-PreambleIndex) or NPRACH subcarrier indication for NB-IoT to be sent in Msg1 as described in embodiment #4 and/or DL EDT indication. In another option, Random Access Preamble (ra-PreambleIndex) and PRACH mask index (ra-PRACHMaskIndex) (or NPRACH subcarrier indication and Carrier indication of NPRACH for NBIoT) can be included in the RAN paging message. This could be one of the reserved preamble index for contention free random access procedure. In another option, a PDCCH (or NPDCCH) order can be included in the RAN paging message to initiate the Random Access. a. UE detects the early DL data transmission in the RAN paging message. b. UE sends msg1 with the preamble and/or PRACH resource indicated in the paging message. c. eNB provides the sufficient UL grant in RAR to send NAS service request in Msg3. i. UE transmits RRCEarlyDataRequest or RRCConnectionResumeRequest in Msg3 including the NAS service request without message container (no user UL data). d. In another option, eNB provides legacy UL grant for Msg3 i. UE transmits RRCConnectionRequest message with S-TMSI (or RRCConnectionResumeRequest for UP C-IoT optimization) with spare bit set to "1" indicating it is ready to receive DL EDT in Msg4.

3.) UE sends the msg3 which includes the NAS service request message. a. eNB forwards the NAS service request to MME. The eNB waits to receive the DL data from the MME for the maximum time allowed by the contention resolution timer of the UE before sending the Msg4. i. In another option, if eNB does not receive DL data within this time period, it may send msg4 without DL data and follow legacy RRC connection and DL data transmission procedure or it can send indication in the msg4 that UE keep monitoring the PDCCH to receive the DL data for a certain period of time T before sending msg5 to eNB. b. Now MME knows the UE is connected, it forwards the DL data to eNB. 4.) eNB includes the NAS DL data in the RRC connection setup message and sends as msg4 to UE. a. eNB sends the NAS DL data delivery confirmation to MME. b. If this is the use-case where there is no UL data following, eNB also indicates in the msg4 that UE now can go to idle mode. 5.) If there is following UL data required, UE sends the NAS UL data in RRC connection setup complete as msg5 to eNB. a. eNB forwards the UL NAS data to MME. 6.) After msg5, UE itself goes back to IDLE mode and eNB release any UE context. a. In another option, eNB can transmit the RRC connection release message to UE.

Figure 48:
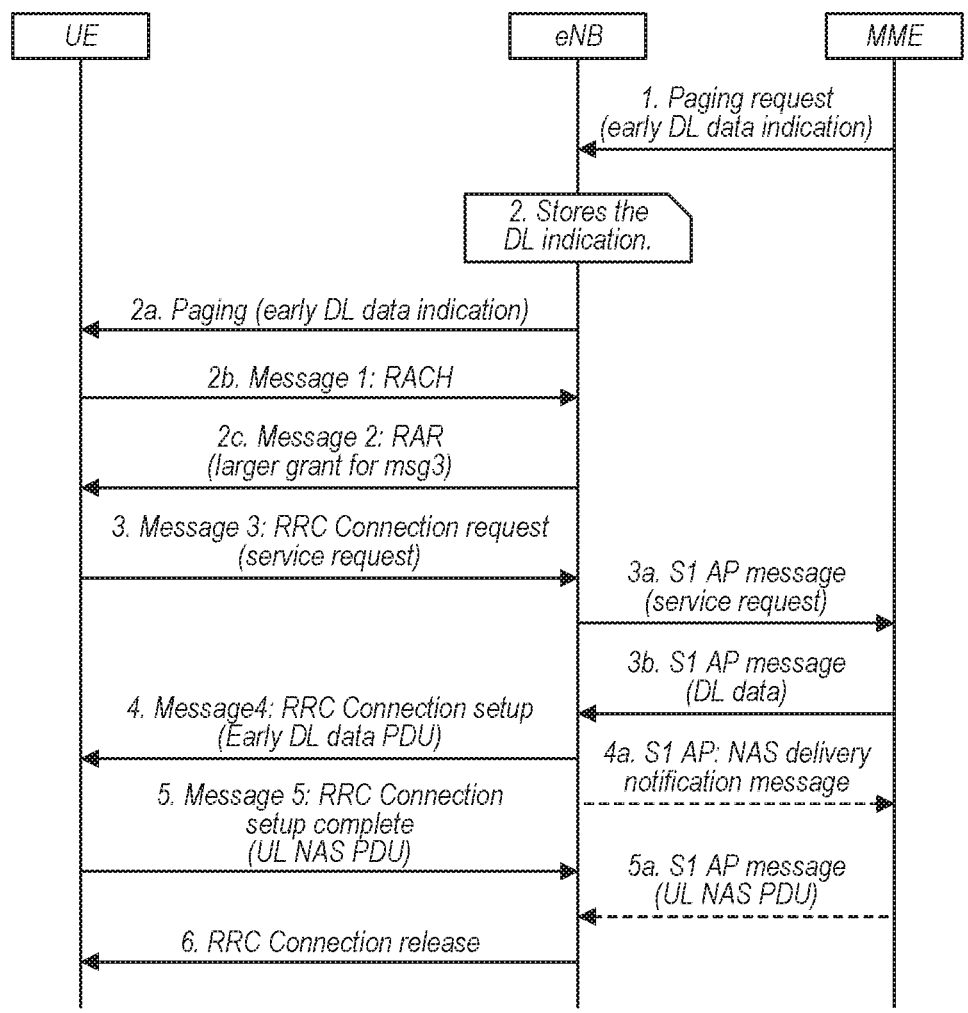
FIG. 48 illustrates example messages that may be exchanged in accordance with some embodiments.

In FIG. 48, S1 AP paging message includes only early DL data indication (option #2).

Option #3 MSG UE capability indication 1. When MME has DL data, legacy procedure follows for sending paging message to UE. 2. After receiving paging, UE performs RACH to get the UL grant for msg3. 3. In the msg3, the RRC connection request message includes an additional indication (or a NAS PDU) which tells the eNB that it is capable of early data transmission. a. After receiving msg3, eNB knows the UE capability for early data transmission. Therefore, it check with MME if there is an early DL data transmission (for example, just small single data). If UE had sent a NAS PDU in msg.3, eNB can forward it to the MME, and this could be used to indicate that early data transmission is feasible. b. If MME determines this is not early DL data, it sends the NACK feedback to eNB. Otherwise, it forwards the DL data to the eNB. 4. If eNB receives the NACK feedback, it follows the legacy RRC connection procedure for CP C-IoT. Otherwise, it includes the DL data in the msg4 and transmits to UE. a. eNB sends the NAS DL data delivery confirmation to MME. b. If this is the use-case where there is no UL data following, eNB also indicates in the msg4 that UE now can go to idle mode. 5. If there is following UL data required, UE sends the NAS UL data in RRC connection setup complete as msg5 to eNB. a. eNB forwards the UL NAS data to MME. 6. After msg5, UE itself goes back to IDLE mode and eNB release any UE context. a. In another option, eNB can transmit the RRC connection release message to UE.

Figure 49:
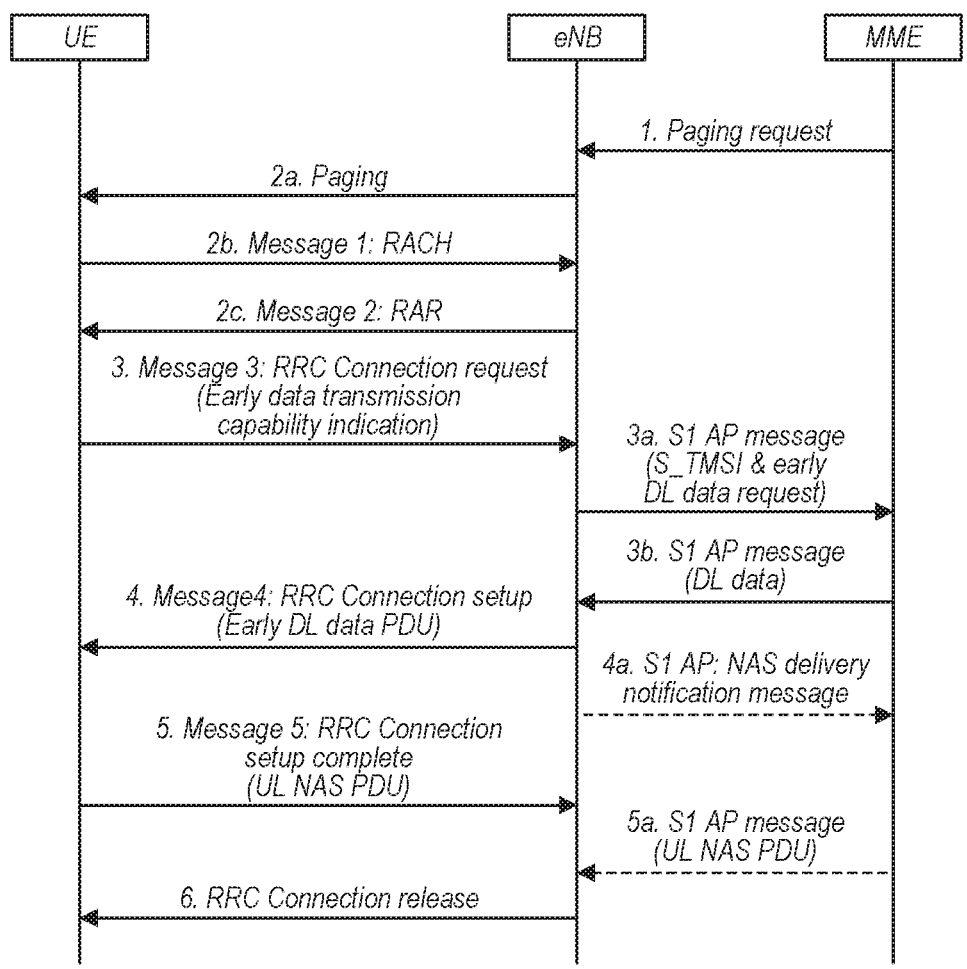
FIG. 49 illustrates example messages that may be exchanged in accordance with some embodiments.

In FIG. 49, MSG3 includes UE capability indication (option #3).

It is to note that the solutions here proposed for CP early data transmission, can also be applied similarly for UP early data transmission when using UP CIoT Optimization. With the difference that upon msg.3 the eNB would need to send an S1-AP message that also informs the MME about the resumption of the suspended context/bearers.

Some embodiments may relate to UE release procedures after early data transmission of UL/DL data. The following options are considered for UE release after the transmission of UL/DL data: 1) UE implicitly disconnects: Once the UE sends UL NAS data PDU in message 3 and/or receives DL NAS data PDU in message 4, the UE implicitly disconnects and is in IDLE mode. 2) MSG4 optimization: Once UE sends the UL NAS data PDU in msg3, eNB indicates in the msg4 that UE can go to IDLE mode. UE goes to IDLE if it finds the indication and/or other UE specific parameters in msg4. 3) Timer in UE/network: During paging procedure, network maintains paging timer and count to keep track of the time within which paging response is to be delivered to the network. If the MME receives no response from the UE to the paging request message, it may repeat the paging according to any applicable paging strategy. If the data sent in the paging request message is delivered to the UE, then the MME receives the delivery notification message and the UE goes back to IDLE state. If the data sent in the paging request is not delivered to the UE, then MME may resend the data in paging request according to the paging strategy or send a data delivery failed to the functional entity sending the DL data and UE goes back to IDLE state. 4) RRC connection release: The UE may send immediate RRC connection indication with the UL NAS data PDU in message 5 and the UE returns to the IDLE state.

Some embodiments may be related to DL EDT indication in paging message: In one option, a new DCI format scheduling the paging message can be defined to indicate the DL EDT. In another option, the legacy paging message can be extended to include the DL EDT indication as shown in FIG. 50. The Paging message is used for the notification of one or more UEs. One of more of the following may be applicable: signaling radio bearer: N/A; RLC-SAP: TM; logical channel: PCCH; direction: E-UTRAN to UE.

Or the DL EDT indication can be sent for each UE in the paging record list. A non-limiting example is shown in FIG. 51. Non-limiting examples of paging field descriptions are shown in FIG. 52.

Figure 53:
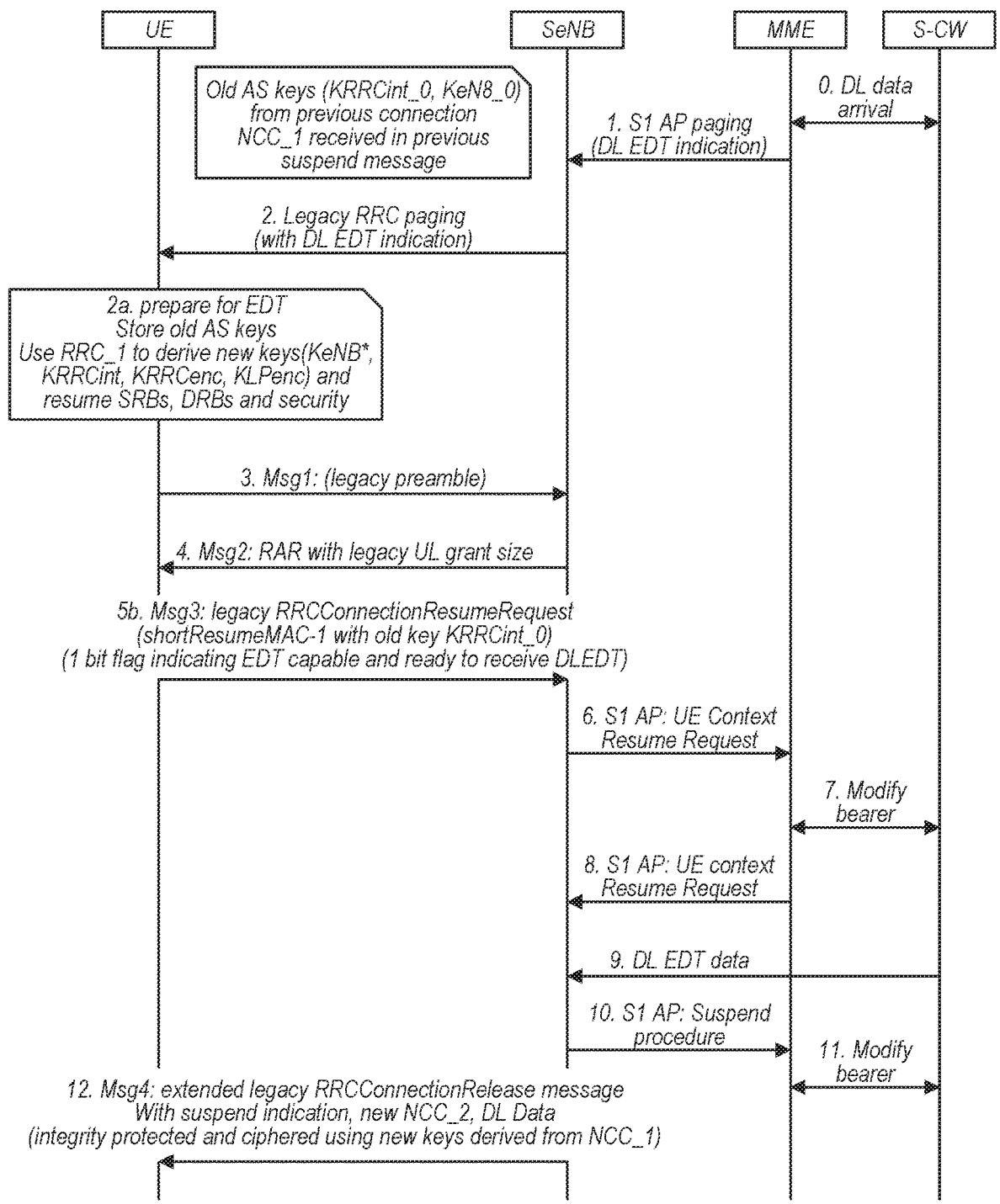
FIG. 53 illustrates example messages that may be exchanged in accordance with some embodiments.

Some embodiments may be related to DL EDT in user plane CIoT EPS optimizations: The procedures described above for control plane CIoT optimizations are also applicable to user plane CIoT optimization and the difference is that UE has to resume SRBs, DRBs, PDCH and AS security prior to receiving Msg4 or before sending the Msg3. To receive DL EDT, UE still have to have the stored value of NCC that is provided during suspend procedure of the previous connection. In one option, UE prepares for EDT upon reception of paging message indicating the DL EDT. In this procedure, RRC constructs the RRConnectionResumeRequest message and resumes all SRBs, DRBs and PDCP. It derives new keys (KeNB, KRRCint, KRRCenc and KUPenc) using the NCC provided during suspend message in the previous connection as shown in FIG. 53. In another option, UE prepares for EDT upon reception of UL grant in RAR indicating DL EDT. In this procedure, UE sends the legacy RRCConnectionResume request message and in parallel resume SRBs, DRBs, PDCH and AS security before receiving the Msg4 as shown in FIG. 54.

Figure 54:
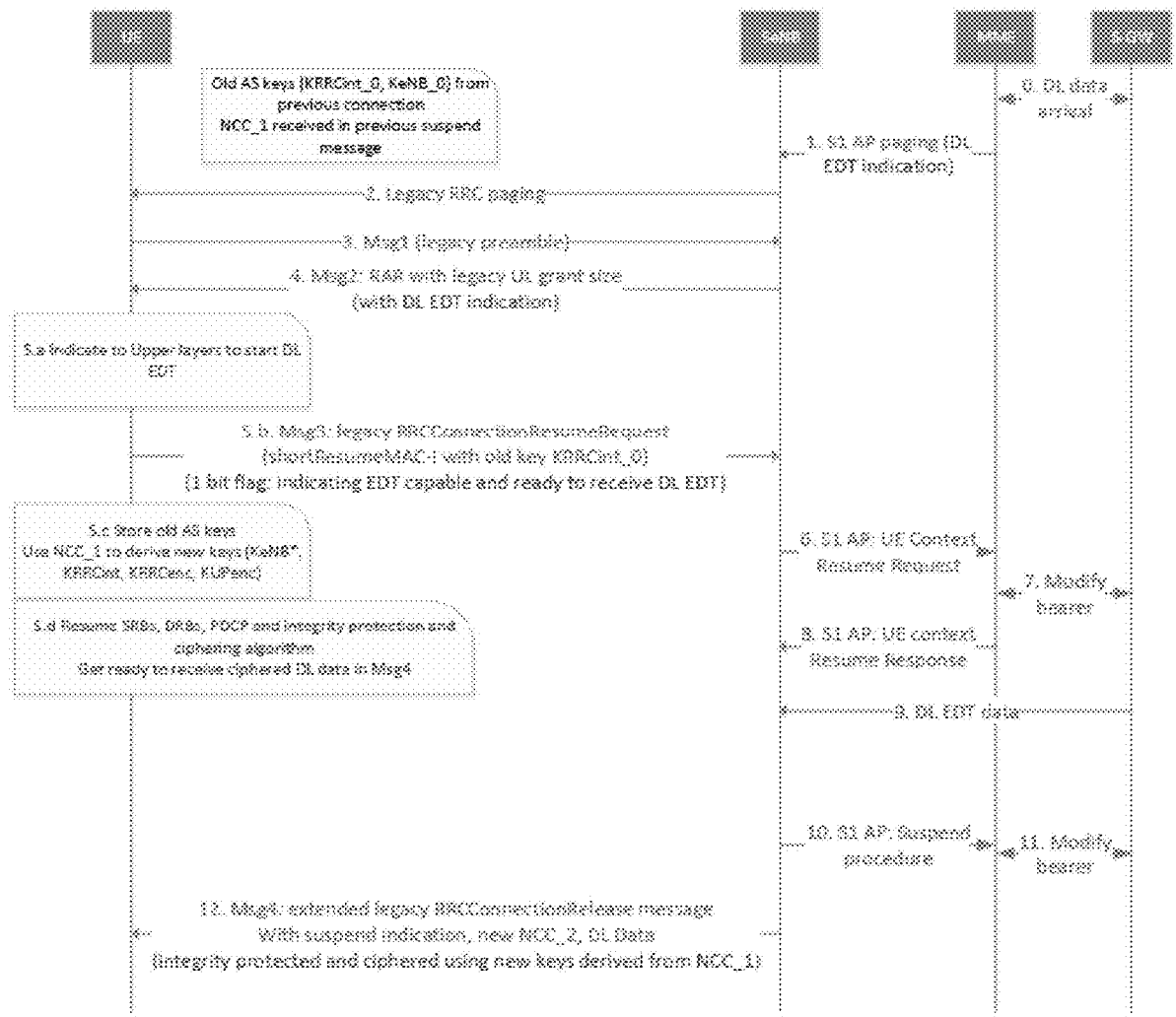
FIG. 54 illustrates example messages that may be exchanged in accordance with some embodiments.

In this case, the Msg3 also needs indication that UE supports DL EDT and resumed AS security being ready to receive ciphered DL data in Msg4 as shown in FIG. 53 and FIG. 54. This indication can be included in the RRCConnectionResumeRequest message using the one remaining spare bit. In another option, new RRCConnectionResumeRequest message can be defined to indicate UE is ready for DL EDT. In another option, UE sends the preamble for EDT (Msg1 for EDT) and follows EDT procedure. In another option, UE sends the Random Access Preamble indicated in new RAN paging message. This lets eNB know that UE is prepared to receive DL EDT in Msg4.

In another option, UE does not indicate that it supports DL EDT in Msg3. Instead, UE sends the legacy RRCConnectionResumeRequest message. Then eNB retrieves the UE context and determines the UE capability if it supports DL EDT. The indication of DL EDT can be sent during initial attach procedure. The indication of DL EDT indicates that, before sending Msg3, UE resumes SRBs, DRBs, re-establishes PDCP and activates AS security using the NCC provided in the suspend message of the previous connection. In this case, if UE supports the DL EDT and resume cause in Msg3 is set to "mt-Access", then it is understood that AS security is activated before Msg3.

FIG. 53 may be related to DL EDT started upon receiving DL EDT indication in paging message in user plane CIoT optimizations. The following numbered descriptions are related to FIG. 53. 0. S-GW indicates to MME on arrival of DL data. It may also indicate this can be transmitted as DL EDT. 1. MME decides to use DL EDT and sends S1 AP paging message to eNB with DL EDT indication. 2. eNB transmits paging message with indication of DL EDT. a. RRC prepares RRCConnectionResumeRequest message, resumes SRBs, DRBs, PDCP and AS security by deriving the new keys based on NCC provided during suspend procedure in the previous connection. 3. UE transmits legacy preamble in Msg1. 4. eNB provides legacy UL grant in RAR. 5. UE transmits the RRCConnectionResumeRequest message with 1 bit indication that it is ready to receive ciphered DL data in Msg4. For this purpose, 1 spare bit in RRCConnectionResumeRequest message can be used or RRCConnectionResumeRequest message can be extended. 6. From step 6 to 12, similar procedure as in UL EDT follows.

FIG. 54 may be related to DL EDT started upon receiving DL EDT indication in RAR in user plane CIoT optimizations. The following numbered descriptions are related to FIG. 54. 0. S-GW indicates to MME on arrival of DL data. It may also indicate this can be transmitted as DL EDT. 1. MME decides to use DL EDT and sends S1 AP paging message to eNB with DL EDT indication. 2. eNB transmits legacy paging message. 3. UE constructs the legacy RRCConnectionResumeRequest message and transmits legacy preamble in Msg1. 4. eNB provides UL grant in RAR with indication of DL EDT. This indication can be sent using a reserved state in UL grant in RAR or a reserved bit in RAR for NB-IoT UEs. For eMTC UEs, reserved bit in the RAR can be set to 1 but still legacy grant size is provided. a. In another option, DCI scheduling RAR can be used or a new DCI scheduling RAR can be defined to indicate the DL EDT in Msg2. 5. Upon indication of DL EDT, MAC indicates to upper layer to initiate DL EDT. a. UE transmits the RRCConnectionResumeRequest message including the DL EDT ready indication. In one option, DL EDT capable UE always constructs RRCConnectionResumeRequest message including the DL EDT ready indication. On another option, DL EDT capable UE constructs two RRC messages 1) legacy RRCConnectionResumeRequest and 2) RRCConnectionResumeRequest including the DL EDT ready indication and transmits the right one. b. The RRCConnectionResumeRequest includes the shorResumeMAC-I calculated using old KRRCinc. c. UE derives new keys (KeNB, KRRCint, KRRCenc and KUPenc) based on the NCC provided during suspend procedure in the previous connection. d. UE also stores the old AS security context including old KeNB in case of connection reject or fallback to legacy RACH procedure. e. UE resumes SRBs, DRBs, PDCH and integrity protection and ciphering algorithm. 6. From step 6 to 12, similar procedure as in UL EDT follows.

In another option, legacy RAN paging message is used. UE receives legacy paging message and sends legacy preamble in Msg1. UE receives legacy UL grant in Msg2 and sends Legacy RRCConnectionResumeRequest message in Msg3. It means UE follows legacy procedure until Msg4 is receive. After receiving Msg3, if eNB determines that UE supports DL EDT in Msg4, it inquires MME if there is any DL EDT data or if it determines there is DL EDT data for the UE, it sends the RRCConnectionRelease message with suspend indication including the NCC in DCCH multiplexed with DL EDT data in DTCH. The RRCConnectionRelease message is both integrity protected and ciphered using the NCC that was provided to UE in suspend message in the previous connection. A UE supporting DL EDT always resumes SRBs and DRBs before sending Msg3 to receive any message in DTCH but AS security still remains suspended. After receiving Msg4, UE de-multiplexes the data in DCCH and DTCH and determines the RRCConnectionRelease message is received in CCCH.

UE action upon receiving RRCConnectionRelease message in response to legacy RRCConnectionResumeRequest message. 1. Re-establish the PDCP 2. Derive new AS keys (KeNB, KRRCint, KRRCenc and KUPenc) based on the stored NCC that was provided in the suspend message in the preceding connection. 3. Configure lower layer to resume integrity protection and ciphering. 4. Configure lower layer to apply the integrity protection and ciphering to data received in CCCH (RRCConnectionRelease message) and ciphering to user data received in DTCH (DL EDT data) immediately. 5. If integrity protection is successful, forward the user data to upper layers. 6. Proceed the legacy RRC connection release procedure with appropriate release cause.

This procedure can also be used to receive legacy RRCConnectionResume message with multiplexed user data in DTCH in Msg4.

Example claims are given below. Example 1 may contain a user equipment (UE) capable of supporting control plane and user plane CIoT optimization with early data transmission capability. Example 2 may contain a method of example 1, where the UE indicates the early data transmission capability to the network as a part of the initial attach procedure in the UE core network capability IEI. Example 3 contains a method of example 1, where the eNB after receiving DL data together with S1AP paging message for the UE from the MME stores the DL data with the associated S-TMSI. Example 4 may contain a method of example 1, where the UE has UL data to be sent and includes the UL NAS PDU in message 3 and the eNB when it receives message 3 sends DL data stored for this UE in message 4. Example 5 contains a method of example 1, where the UE has no data to send in UL and may include early data transmission indication in message 3 to receive any downlink data stored for this UE in the eNB in message4. Example 6 contains a method of example 4, 5 where the eNB generates an S1AP data delivery indication message to indicate that the previously delivered DL data sent to the UE from the MME has been delivered successfully. Example 7 may contain a method of example 6, where the S1AP data delivery indication message can be sent to the MME in one case before the DL NAS PDU is sent over message 4 or in another case after the DL NAS PDU is sent over message 4. Example 8 may contain a method of example 6, where the eNB sends a NAS delivery notification to the MME to report successful delivery of NAS PDU to the UE previously received within a DOWNLINK NAS TRANSPORT message. Example 9 contains a method of example 7,8, where after receiving message 4 the UE goes back to IDLE mode. Example 10 may contain a method of example 5,7,8, where the eNB sends DL data in message 4 and UE sends an UL NAS PDU in message 5 to send UL data, indication for successful delivery of DL data from MME and may optionally include a stay IDLE indication after which the UE goes back to RRC idle mode. Example 11 may contain a method of example 10, where after receiving message 5 the eNB sends a RRC connection release message. Example 12 contains a method of example 1, where the UE sends UL NAS data PDU in message 3 and the eNB indicates in message 4 that the UE can go to idle state and if the UE finds this indication in message 4 then the UE goes to IDLE mode. Example 13 contains a method of example 1 where MME indicate the early DL data indication in the S1 AP paging message and eNB stores the DL data indication with the associated S-TMSI after receiving the S1AP paging message. Example 14 contains the method of example 3 and example 13 where the eNB provides the early data transmission grant for msg3 knowing there is early data available in MME and UE transmits the service request or NAS PDU in the msg3. Example 15 contains the method of example 3 and example 13 where eNB sends indication of early data transmission in the RAN paging message to UEs. Example 16 contains the method of example 15 where UE sends early data transmission indication in msg1 to send the service request or NAS PDU in the msg3. Example of 16 contains the method of example 13 where the eNB requests or check with MME to send any DL data for the UE after receiving the legacy msg3 from the UE and the eNB forwards the DL data to the UE in msg4. Example 17 contains the method of example 1 where the eNB checks with MME if the UE has any DL data only if the UE indicates that it supports the early data transmission in msg3. Example 18 contains the method of example 17 where the eNB sends msg4 including the DL data if MME responds to MME with early DL data otherwise eNB follows the legacy procedure with legacy msg4 transmission. Example 19 contains a method of example 1, 3 and 13 where the eNB after receiving msg3 from the UE waits to receive any DL data from the MME for maximum time allowed by the contention resolution timer for sending the msg4 with DL data to UE. Example 20 contains the method of example 19 where eNB sends the legacy msg4 without data for legacy process of RRC connection if the eNB does not receive the LD data from the MME within the said time duration. Example 21 contains the method of example 19 where eNB sends the msg4 without data indicating UE to wait for DL data to be scheduled later for a certain time duration before sending the msg5 to eNB if the eNB does not receive the DL data from the MME within the said time duration. Example 22 contains the methods of example 2 to 21 which are applicable to CP CIoT as well as to UP C-IoT. Example 23 contains the method where eNB provides dedicated PRACH resource, for example, Random Access Preamble, for Msg1 transmission in RAN paging message. Example 24 contains the method of example 23 where UE sends the Msg1 with the preamble indicated in RAN paging message if it supports DL EDT otherwise legacy preamble. Example 25 contains the method of example 24 where UE receives UL grant for Msg3 and transmits RRC message (RRCConnectionRequest or RRCEarlyDataRequest or RRCConnectionResume message). Example 26 contains the method of example 25 or legacy procedure of receiving RAN paging and sending Msg1 where Random Access Response in Msg2 contains legacy UL grant for msg3 or contains the DL EDT indication and legacy UL grant for msg3 or contains the larger UL grant for Msg3 so that UE can transmit NAS service request message in msg3. Example 27 contains the method of example 26 where the RRC message in msg3 contains the indication that UE supports DL EDT and is ready to receive DL EDT in Msg4. In case of UP C-IoT optimization, this indicates UE has activated the AS security or will activate the AS security during or after sending Msg3 and before receiving Msg4 using the NCC provided in previous suspend procedure. Example 28 contains a method where UE that supports DL EDT always resumes DRBs together with SRB1 but not AS security before sending the legacy RRC-ConnectionRequest message in Msg3 using legacy UL grant received in Msg2. Example 29 contains the method of example 28 where UE can receive the RRCConnectionRelease message in DCCH multiplexed with user data in DTCH in response to legacy RRCConnectionResumeRequest message (not for EDT request). The method of claim 30 contains the method of example 29 where UE resumes PDCP and AS security upon reception of RRCConnection-Release message in Msg4 using the stored NCC if it was provided in the suspend message in the preceding connection, applies the integrity protection and ciphering to data received in DCCH and DTCH, forwards the deciphered user data to upper layers and proceeds the RRC connection release procedure.

Some embodiments may be related to NR RRM enhancements in measurement event and reporting and cell reselection criteria for unlicensed band operation.

In 3GPP Rel-15, study on NR-based access to unlicensed spectrum have been started. It is noted that Rel-15 NR system is designed to operate on licensed spectrum. The NR-unlicensed, a shorthand notation of the NR-based access to unlicensed spectrum, is a technology that enables the operation of NR system on unlicensed spectrum.

In the unlicensed operation, there is a need for the introduction of new measurement/reports in addition to the conventional measurements/reports defined for licensed operation, e.g., RSRP, RSRQ, etc.

New measurement reports can be beneficial for unlicensed band channel selection to choose a channel that is currently less congested. The channel selection can be made more elaborated by taking into account of the presence of other technologies sharing the same spectrum.

On the other hand, rel-15 NR system supports much wider maximum channel bandwidth (CBW) than LTE's 20 MHz. Wideband communication is also supported in LTE via CA of up to 20 MHz component carriers (CCs). By defining wider CBW in NR, it is possible to dynamically allocate frequency resources via scheduling, which can be more efficient and flexible than the CA operation. In addition, having single wideband carrier has a merit in terms of low control overhead as it needs only single control signaling, whereas CA requires separate control signaling per each aggregated carrier. Moreover, the spectrum utilization can be improved by eliminating the need of guardband between CCs.

For a given wide CBW, it may be beneficial to perform measurement/report not only for the wideband but also in the unit of sub-bands in the consideration of Wi-Fi 20 MHz channelization. The various enhancements to NR RRM measurements are disclosed to enhance the unlicensed band operation in wideband communication.

In some embodiments, new events and reporting related to such enhanced RRM measurement are introduced to be used in the different deployment scenarios. Also the cell reselection criteria are enhanced to take into consideration of the RSSI measurement and channel occupancy measurement between serving and neighbour cells in licensed and unlicensed band.

Some embodiments may be related to one or more of the following. 1. To take into consideration of RSSI measurements and channel occupancy and other channel load metrics of the neighbour cells and serving cell into account for the following scenarios: Intra-frequency and inter-frequency handover; SCell addition; SCG addition/change; Cell reselection. 2. For intra-frequency and inter-frequency handover, SCG addition/change and SCell addition, either introduce new events or as part of the event reporting incorporating RSSI measurement and channel occupancy of the neighbour cell and serving cell(s). For part of the configuration for event reporting:—The RSSI measurement and channel occupancy measurement can be configured to be reported for the neighbour cells that trigger the events and/or configured to be reported for the PCell/PSCell or all serving cells. 3. For cell reselection, the inter-frequency cell reselection criteria can be modified to take into consideration of the RSSI measurement and channel occupancy measurement of the neighbour cell and the serving cell. Different priority based cell reselection criteria are specified for serving cell in licensed carrier and neighbour cell in unlicensed carrier, serving cell in unlicensed carrier and neighbour cell in unlicensed carrier and serving cell in unlicensed carrier and neighbour cell in licensed carrier. Different thresholds can be configured for the different priority based cell reselection criteria as in the previous bullet point.

The new measurements events associated with RSSI measurement and channel occupancy or configuring as part of the existing events with RSSI measurement and channel occupancy can be utilized by the network for unlicensed channel selection (e.g. SCell, SCG cell), for deciding on the target handover intra-frequency and inter-frequency cell and for deciding the target handover inter-frequency cell. For priority based cell reselection, allow the better reselection of a cell that are less loaded based on RSSI measurement and channel occupancy measurement between serving and neighbour cells in licensed and unlicensed carrier/band.

Some embodiments may be related to enhancement(s) of NR RRM measurement reporting that can be potentially used by the network for unlicensed channel selection using the channel load measurement such as RSSI measurement and Channel Occupancy measurement. The details of the embodiments are described below.

Dual Connectivity Deployment In a Dual-Connectivity (DC) deployment, the Master Node (MN) would setup measurement reporting for SCG addition or change. In the EN-DC case where MN is LTE, B1 event (i.e. Inter-RAT neighbour cell is better than a configured threshold) or B2 event (i.e. Inter-RAT neighbour cell is better than a configured threshold and PCell is below a configured threshold) is used as the event to trigger a report of the inter-RAT neighbour cell. Currently, the trigger measurement is cell-based measurement on RSRP, RSRQ and SNIR. This may not be sufficient for selecting a NR unlicensed cell for SCG addition. The channel load (e.g. RSSI measurement of the NR cell as well as channel occupancy measurement etc.) is also needed on top of the RSRP/RSRQ/SNIR measurement. There are a few ways to implement this. a. Introduce a new reporting event that takes into account the channel load when reporting inter-RAT neighbour in the unlicensed carrier. For example, Event Bx=Inter-RAT neighbour (RSRP/RSRQ/SNIR) is better than a configured threshold and channel load (RSSI measurement and/or channel occupancy) of the inter-RAT neighbour is below a configured threshold; Event By=Inter-RAT neighbour (RSRP/RSRQ/SNIR) is better than a configured threshold and channel load (RSSI measurement and/or channel occupancy) of the inter-RAT neighbour is better than best NR serving cell/PSCell; Event Bz=Inter-RAT neighbour (RSRP/RSRQ/SNIR) is better than best NR serving cell/NR PSCell and channel load (RSSI measurement and/or channel occupancy) of the inter-RAT neighbour is better than best NR serving cell/PSCell b. No new event but the channel load of the inter-RAT neighbour in the unlicensed carrier is included as part of the measurement report for the existing B1 and/or B2 events, including the channel load of the best NR serving cell/PSCell in the reporting. For example, the report configuration for B1 and B2 event can be optionally configured with channel load configuration for the inter-RAT neighbour cell and/or the best NR serving cell/PSCell. When reporting B1 and B2 event, the UE will also report channel load of neighbour cell and/or best NR serving cell/PSCell if they are configured for the events.

The above can also be extended to other DC deployments (such as NR-NR DC case) or interfrequency and intra-frequency handover scenarios as follows. c. Introduce a new reporting event that takes into account the channel load. For example, Event Av=NR neighbour (RSRP/RSRQ/SNIR) is better than a configured threshold and channel load (RSSI measurement and/or channel occupancy) of the NR neighbour is below a configured threshold; Event Aw=NR neighbour (RSRP/RSRQ/SNIR) is better than a configured threshold and channel load (RSSI measurement and/or channel occupancy) of the NR neighbour is better than best NR PSCell/PCell; Event Ax=NR neighbour (RSRP/RSRQ/SNIR) is better than best NR serving cell/NR PSCell/PCell and channel load (RSSI measurement and/or channel occupancy) of the NR neighbour is better than NR PSCell/PCell; Event Ay=NR neighbour (RSRP/RSRQ/SNIR) is offset better than best NR serving cell/NR PSCell/PCell and channel load (RSSI measurement and/or channel occupancy) of the NR neighbour is better than NR PSCell/PCell; Event Az=NR neighbour (RSRP/RSRQ/SNIR) is better than a configured threshold and PSCell/PCell is lower than a configured threshold and channel load (RSSI measurement and/or channel occupancy) of the NR neighbour is better than NR PSCell/PCell.

In d: No new event but the channel load of the NR neighbour in unlicensed carrier is included as part of the measurement report for the existing A series events, including the channel load of the best NR PSCell in the reporting. For example, the report configuration for A3, A4 or A5 event can be optionally configured with channel load configuration for the NR neighbour cell and/or the NR PSCell. When reporting A3, A4 or A5 event, the UE will also report channel load of NR neighbour cell and/or PSCell/PCell if they are configured for the events.

Some embodiments may be related to SCell Management. For SCell addition, the channel load of the candidate or potential SCell can be included as part of measurement report for the existing A series. For example, the report configuration for A4 event is optionally configured with channel load configuration for the NR neighbour cell. When UE reports A4 event, it will also include the channel load of the NR neighbour cell.

As trigger for inter-frequency measurement For inter-frequency handover, on the other hand, it is typically used for offloading to another frequency and one of the possible factors to initiate an inter-frequency load balancing can be because the channel load metrics of the current PCell frequency is quite high and the network needs the UE to find another frequency to reduce potential LBT failure in the current serving frequency.

An example of such event to initiate inter-frequency offloading measurement can be as follows: Event Ax: Channel load (e.g. channel occupancy) of PCell frequency is above a configured threshold.

A report on leave can also be set for stopping the inter-frequency measurement. Alternative is to have an event for reporting when the Channel load of PCell frequency is below a configured threshold (i.e. Event Ay: Channel load (e.g. channel occupancy) of PCell frequency is below a configured threshold). This is also beneficial for triggering inter-frequency measurement for SCell management. In this case: Event Ax: Channel load (e.g. channel occupancy) of PCell/Scell frequency is above a configured threshold; Event Ay: Channel load (e.g. channel occupancy) of PCell/SCell frequency is below a configured threshold.

In some cases, it would be good to just add on a neighbour cell if the channel load (e.g. channel occupancy) of a reported neighbour is good. An example of the event reporting can be: Event Az: Channel load (e.g. channel occupancy) of neighbour frequency is below a configured threshold. Some embodiments may be related to cell reselection. In NR, the cell reselection criteria are based on both RSRP and RSRQ. For intra-frequency and equal priority cell reselection, it is based on ranking the RSRP of the quality of the cells. Highest rank (or best quality cell) will be reselected. This is not expected to change for intra-frequency cell reselection even for neighbour cell in unlicensed carrier. For inter-frequency with priority-based cell reselection, both RSRP and RSRQ are applied. Channel load (e.g. RSSI measurement and/or channel occupancy measurement) can also be taken into account in the priority based cell reselection for inter-frequency related to unlicensed carrier. For example, between serving cell in licensed carrier and inter-frequency neighbour cell in unlicensed carrier: 5.2.4.5a NR Inter-frequency and inter-RAT Cell Reselection criteria If threshServingLowQ is broadcast in system information and more than 1 second has elapsed since the UE camped on the current serving cell, cell reselection to a cell on a higher priority NR frequency or inter-RAT frequency than the serving frequency shall be performed if: a cell of a higher priority NR or EUTRAN RAT/frequency fulfils Squal>ThreshX, HighQ during a time interval TreselectionRAT; and if the higher priority NR or EUTRAN RAT/frequency is in the unlicensed band: the cell of a higher priority NR or EUTRAN RAT/frequency fulfils SRSSI<ThreshX,HighRSSI during a time interval TreselectionRAT.

Otherwise, cell reselection to a cell on a higher priority NR frequency or inter-RAT frequency than the serving frequency shall be performed if: a cell of a higher priority RAT/frequency fulfils Srxlev>ThreshX, HighP during a time interval TreselectionRAT; and if the higher priority NR or EUTRAN RAT/frequency is in the unlicensed band: the cell of a higher priority NR or EUTRAN RAT/frequency fulfils SRSSI<ThreshX,HighRSSI during a time interval TreselectionRAT; and more than 1 second has elapsed since the UE camped on the current serving cell.

Cell reselection to a cell on an equal priority NR frequency shall be based on ranking for intrafrequency cell reselection as defined in sub-clause 5.2.4.6.

If threshServingLowQ is broadcast in system information and more than 1 second has elapsed since the UE camped on the current serving cell, cell reselection to a cell on a lower priority NR frequency or inter-RAT frequency than the serving frequency shall be performed if: the serving cell fulfils Squal<ThreshServing, LowQ and a cell of a lower priority NR or E-UTRAN RAT/frequency fulfils Squal>ThreshX, LowQ during a time interval TreselectionRAT and if the lower priority NR or EUTRAN RAT/frequency is in the unlicensed band: the cell of a lower priority NR or EUTRAN RAT/frequency fulfils SRSSI<ThreshX,LowRSSI during a time interval TreselectionRAT.

Otherwise, cell reselection to a cell on a lower priority NR frequency or inter-RAT frequency than the serving frequency shall be performed if: the serving cell fulfils Srxlev<ThreshServing, LowP and a cell of a lower priority RAT/frequency fulfils Srxlev>ThreshX, LowP during a time interval TreselectionRAT; and if the lower priority NR or EUTRAN RAT/frequency is in the unlicensed band: the cell of a lower priority NR or EUTRAN RAT/frequency fulfils SRSSI<ThreshX,LowRSSI during a time interval TreselectionRAT; and more than 1 second has elapsed since the UE camped on the current serving cell.

Cell reselection to a higher priority RAT/frequency shall take precedence over a lower priority RAT/frequency if multiple cells of different priorities fulfil the cell reselection criteria.

Some embodiments may be related to: between serving cell in unlicensed carrier and inter-frequency neighbour cell in unlicensed carrier: 5.2.4.5b NR Inter-frequency and inter-RAT Cell Reselection criteria If threshServingLowQ is broadcast in system information and more than 1 second has elapsed since the UE camped on the current serving cell in unlicensed carrier, cell reselection to a cell on a higher priority NR frequency or inter-RAT frequency than the serving frequency shall be performed if: a cell of a higher priority NR or EUTRAN RAT/frequency fulfils Squal>ThreshX, HighQ during a time interval TreselectionRAT; and if the higher priority NR or EUTRAN RAT/frequency is in the unlicensed band: the cell of a higher priority NR or EUTRAN RAT/frequency fulfils SRSSI<ThreshX,HighRSSI during a time interval TreselectionRAT; or the cell of a higher priority NR or EUTRAN RAT/frequency fulfils SRSSI<SRSSI, serving-cell during a time interval TreselectionRAT.

Otherwise, cell reselection to a cell on a higher priority NR frequency or inter-RAT frequency than the serving frequency shall be performed if: a cell of a higher priority RAT/frequency fulfils Srxlev>ThreshX, HighP during a time interval TreselectionRAT; and if the higher priority NR or EUTRAN RAT/frequency is in the unlicensed band: the cell of a higher priority NR or EUTRAN RAT/frequency fulfils SRSSI<ThreshX,HighRSSI during a time interval TreselectionRAT; or the cell of a higher priority NR or EUTRAN RAT/frequency fulfils SRSSI<SRSSI, serving-cell during a time interval TreselectionRAT; and more than 1 second has elapsed since the UE camped on the current serving cell.

Cell reselection to a cell on an equal priority NR frequency shall be based on ranking for intrafrequency cell reselection as defined in sub-clause 5.2.4.6. If threshServingLowQ is broadcast in system information and more than 1 second has elapsed since the UE camped on the current serving cell, cell reselection to a cell on a lower priority NR frequency or inter-RAT frequency than the serving frequency shall be performed if: the serving cell fulfils Squal<ThreshServing, LowQ and a cell of a lower priority NR or E-UTRAN RAT/frequency fulfils Squal>ThreshX, LowQ during a time interval TreselectionRAT and if the lower priority NR or EUTRAN RAT/frequency is in the unlicensed band: the cell of a lower priority NR or EUTRAN RAT/frequency fulfils SRSSI<ThreshX,LowRSSI during a time interval TreselectionRAT; or the cell of a lower priority NR or EUTRAN RAT/frequency fulfils SRSSI<SRSSI, serving-cell during a time interval TreselectionRAT.

Otherwise, cell reselection to a cell on a lower priority NR frequency or inter-RAT frequency than the serving frequency shall be performed if: the serving cell fulfils Srxlev<ThreshServing, LowP and a cell of a lower priority RAT/frequency fulfils Srxlev>ThreshX, LowP during a time interval TreselectionRAT; and if the lower priority NR or EUTRAN RAT/frequency is in the unlicensed band: the cell of a lower priority NR or EUTRAN RAT/frequency fulfils SRSSI<ThreshX,LowRSSI during a time interval TreselectionRAT; or the cell of a lower priority NR or EUTRAN RAT/frequency fulfils SRSSI<SRSSI, serving-cell during a time interval TreselectionRAT; and more than 1 second has elapsed since the UE camped on the current serving cell.

Cell reselection to a higher priority RAT/frequency shall take precedence over a lower priority RAT/frequency if multiple cells of different priorities fulfil the cell reselection criteria.

Some embodiments may be related to: between serving cell in unlicensed carrier and inter-frequency neighbour cell in licensed carrier: The original NR licensed priority based cell reselection can be applied (i.e. original Section 5.2.4.5 in TS38.304).

Non-limiting example claims are given below. 1. Incorporate RSSI measurement and channel occupancy into NR unlicensed. 2. The claim of method 1, where the RSSI measurement and channel occupancy are used in Intra-frequency and inter-frequency handover 3. The claim of method 1, where the RSSI measurement and channel occupancy are used in Cell selection 4. The claim of method 1 where the RSSI measurement and channel occupancy are used in SCG addition or change 5. The claim of method 1, where the RSSI measurement and channel occupancy are used in cell selection 6. The claim of method 1, where the RSSI measurement and channel occupancy are used in Scell selection or management 7. The claim of method 1, 2 4 and 6, where RSSI measurement and channel occupancy are introduced as new event as part of measurement report 8. The claim of method 1, 2, 4 and 6, where RSSI measurement and channel occupancy are incorporated into existing reporting event of a measurement report 9. The claim of method 7 and 8, where the RSSI measurement and channel occupancy of the serving cells (i.e. PSCell, PCell and SCells) and the triggering neighbour cells can be configured to be signalled in the measurement report. 10. The claim of method 5, the priority based cell reselection criteria can be modified to take into consideration of the RSSI measurement and channel occupancy measurement of the neighbour cell and the serving cell. Different priority based cell reselection criteria are specified for serving cell in licensed carrier and neighbour cell in unlicensed carrier, serving cell in unlicensed carrier and neighbour cell in unlicensed carrier and serving cell in unlicensed carrier and neighbour cell in licensed carrier. Different thresholds can be configured for the different priority based cell reselection criteria as in the previous bullet point. 11. The claim of method 12, 4 and 6, where RSSI measurement and channel occupancy are introduced as new event on serving cell (SCell/PCell) to initiate inter-frequency measurement.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, comprising:
   a memory; and
   processing circuitry in communication with the memory, wherein the processing circuitry is included in a source Next Generation Node B (gNB) configured with logical nodes including a gNB central unit (gNB-CU) and a gNB distributed unit (gNB-DU), the gNB-CU comprising a gNB-CU control plane (gNB-CU-CP) for control-plane functionality, and a gNB-CU user plane (gNB-CU-UP) for user-plane functionality, wherein the processing circuitry is configured to:
   transfer, from the gNB-CU-CP to a target gNB, an Xn handover request message to initiate a handover of a User Equipment (UE) from the source gNB to the target gNB;
   receive, from the target gNB, Xn handover request acknowledgement message for the handover of the UE;
   transfer, from the gNB-CU-CP to the gNB-DU, an F1 UE context modification request message to indicate that the gNB-DU is to stop transmission of downlink data to the UE;
   transfer, from the gNB-DU to the gNB-CU-UP, a downlink data delivery status (DDDS) message to indicate that the gNB-CU-UP is to stop transfer, to the gNB-DU, of downlink data intended for the UE, wherein the DDDS message is encoded to include a cause field and a protocol date unit (PDU) type field, wherein a value of the cause field indicates a cause of the transfer stop, wherein the value is selected from a set of three or more predetermined values, wherein the set of three or more predetermined values includes a value to indicate an outage of a radio link, a value to indicate a resumption of the radio link, a value to indicate an outage of an uplink radio link, a value to indicate a resumption of the uplink radio link, a value to indicate an outage of a downlink radio link, and a value to indicate a resumption of the downlink radio link, and wherein the PDU type field is set to a value of 3 which notifies the gNB-CU-UP to stop delivering a packet data convergence protocol (PDCP) packet; and
   transfer, from the gNB-DU to the gNB-CU-CP, an F1 UE context modification response message to acknowledge the F1 UE context modification request message.

2. The apparatus according to claim 1, wherein the set of three or more predetermined values further includes a value to indicate a stoppage of transmission of downlink data to the UE, and value to indicate a stoppage of transmission of uplink data from the UE.

3. The apparatus according to claim 2, wherein the set of three or more predetermined values further includes a value to indicate both the stoppage of the transmission of the downlink data to the UE and the stoppage of the transmission of the uplink data from the UE.

4. The apparatus according to claim 1, the processing circuitry further configured to:
   encode the ODDS message to further include one or more of:
   a highest sequence number (SN) of a packet data convergence protocol (PDCP) packet that was successfully delivered to the UE, and
   a highest SN of a PDCP packet that was transmitted to the UE.

5. The apparatus according to claim 1, the processing circuitry further configured to:
   in response to reception of the DDDS message:
   stop transfer, from the gNB-CU-UP to the gNB-DU, of the downlink data intended for the UE.

6. The apparatus according to claim 1, the processing circuitry further configured to:
   transfer, from the gNB-CU-CP to the target gNB, sequence number (SN) status message that indicates an SN of a downlink data packet for the UE; and
   after the transfer of the SN status message:
   if additional downlink data intended for the UE is received at the gNB-CU-UP from a user plane function (UPF) entity, forward the additional downlink data from the gNB-CU-UP to a gNB-CU-UP of the target gNB.

7. The apparatus according to claim 1, the processing circuitry further configured to:
   transfer, from the gNB-CU-CP to the gNB-CU-UP, a bearer context modification request that includes data forwarding information for subsequent forwarding of downlink data intended for the UE to the target gNB.

8. The apparatus according to claim 7, the processing circuitry further configured to:
   transfer the DDDS message to alleviate dropping of downlink data intended for the UE before the transfer of the bearer context modification request.

9. The apparatus according to claim 1, wherein the processing circuitry is configured to transfer the E1 UE context modification request message, the DUDS message, and the F1 UE context modification response message as part of an F1 UE context modification procedure.

10. The apparatus according to claim 1, wherein:
the gNB-CU-CP is configured to communicate with the gNB-CU-UP over an E1 interface,
the gNB-CU-UP is configured to communicate user plane messages with the gNB-DU over an F1 user-plane interface (F1-U), and
the gNB-CU-CP is configured to communicate control plane messages with the gNB-DU over an F1 control plane interface (F1-C).

11. The apparatus of claim 1, wherein the gNB-DU is configured to host radio-link control (RLC), medium access control (MAC) and physical (PHY) layers of the gNB, and wherein the gNB-DU is configured to communicate with the LIE over a user interface (uu).

12. The apparatus of claim 1, wherein the source gNB is arranged to operate in accordance with a new radio (NR) protocol.

13. The apparatus of claim 1, wherein:
the processing circuitry includes a baseband processor to encode the downlink data,
the apparatus further comprises a transceiver to transmit the downlink data.

14. A non-transitory computer-readable storage medium that stores instructions for execution by processing circuitry of a Next Generation Node-B (gNB), the gNB configurable to operate as a source gNB, the gNB configured with logical nodes including a gNB central unit (gNB-CU) and a gNB distributed unit (gNB-DU),
the gNB-CU comprising a gNB-CU control plane (gNB-CU-CP) for control-plane functionality, a gNB-CU user plane (gNB-CU-UP) for user-plane functionality,
the instructions to configure the processing circuitry to:
transfer, from the qNB-CU-CP to the gNB-DU, an F1 UE context modification request message to indicate that the gNB-DU is to stop transmission of downlink data to a User Equipment (UE) before a handover of the UE from the source gNB to a target gNB;
encode a downlink data delivery status (DDDS) message to indicate that the gNB-CU-UP is to stop transfer, to the gNB-DU, of downlink data intended for the UE, wherein the DDDS message is encoded to include a cause field and a protocol data unit (PDU) type field, wherein a value of the cause field indicates a cause of the transfer stop, and wherein the value is selected from a set of three or more predetermined values, and wherein the set of three or more predetermined values includes a value to indicate an outage of a radio link, a value to indicate a resumption of the radio link, a value to indicate an outage of an uplink radio link, a value to indicate a resumption of the uplink radio link, a value to indicate an outage of a downlink radio link, and a value to indicate a resumption of the downlink radio link, and wherein the PDU type field is set to a value of 3 which notifies the gNB-CU-UP to stop delivering a packet data convergence protocol (PDCP) packet; and
transfer, from the gNB-DU to the gNB-CU-CP, an F1 UE context modification response message to acknowledge the F1 UE context modification request message.

15. The non-transitory computer-readable storage medium according to claim 14, the instructions to further configure the processing circuitry to:
transfer, from the gNB-CU-CP to a target gNB, an Xn handover request message to initiate the handover of the UE from the source gNB to the target gNB; and
receive, from the target gNB, an XN handover request acknowledgement message for the handover of the UE.

16. A non-transitory computer-readable storage medium that stores instructions for execution by processing circuitry of a Next Generation Node-B (gNB), the gNB configurable to operate as a source gNB, the gNB configured with logical nodes including a gNB central unit (gNB-CU) and a gNB distributed unit (gNB-DU),
the source gNB-CU comprising a gNB-CU control plane (gNB-CU-CP) for control-plane functionality, and a gNB-CU user plane (gNB-CU-UP) for user-plane functionality,
wherein the instructions configure the processing circuitry to:
transfer downlink data intended for a User Equipment (UE) from the gNB-CU-UP to the gNB-DU for transmission to the UE;
determine that a handover of the UE from the source gNB to a target gNB is to be performed;
transfer signaling to the target gNB to indicate the handover; refrain from transmission of the downlink data from the gNB-DU to the UE; and
transfer, from the gNB-DU to the gNB-CU-UP, a downlink data delivery status (DODS) message to indicate that the gNB-CU-UP is to stop transfer, to the gNB-DU, of downlink data intended for the UE, wherein the DDDS message is encoded to include a cause field and a protocol data unit (PDU) type field, wherein a value of the cause field indicates a cause of the transfer stop, and wherein the value is selected from a set of three or more predetermined values, wherein the set of three or more predetermined values includes a value to indicate an outage of an uplink radio link, a value to indicate a resumption of the uplink radio link, a value to indicate an outage of a downlink radio link, and a value to indicate a resumption of the downlink radio link, and wherein the PDU type field is set to a value of 3 which notifies the gNB-CU-UP to stop delivering a packet data convergence protocol (PDCP) packet.

17. The non-transitory computer-readable storage medium according to claim 16, the instructions to further configure the processing circuitry to:
receive the downlink data from a user plane function (UPF) entity.

18. The non-transitory computer-readable storage medium according to claim 16,
wherein the set of three or more predetermined values further includes a value to indicate a stoppage of transmission of downlink data to the UE, and value to indicate a stoppage of transmission of uplink data from the UE.

19. The non-transitory computer-readable storage medium according to claim 18,
wherein the set of three or more predetermined values further includes a value to indicate both the stoppage of the transmission of the downlink data to the UE and the stoppage of the transmission of the uplink data from the UE.

20. The non-transitory computer-readable storage medium according to claim 14,
wherein the set of three or more predetermined values further includes a value to indicate a stoppage of transmission of downlink data to the UE, a value to indicate a stoppage of transmission of uplink data from the UE, and a value to indicate both the stoppage of the transmission of the downlink data to the LIE and the stoppage of the transmission of the uplink data from the UE.

* * * * *

UNITED STATES PATENT AND TRADEMARK OFFICE
CERTIFICATE OF CORRECTION

PATENT NO. : 11,190,989 B2
APPLICATION NO. : 16/419245
DATED : November 30, 2021
INVENTOR(S) : Alexander Sirotkin et al.

It is certified that error appears in the above-identified patent and that said Letters Patent is hereby corrected as shown below:

In the Claims

Column 57, Line 55, delete "Xn" and insert --an Xn--.

Column 57, Line 66, delete "date" and insert --data--.

Column 58, Line 29, delete "ODDS" and insert --DDDS--.

Column 58, Line 65, delete "DUDS" and insert --DDDS--.

Column 59, Line 14, delete "LIE" and insert --UE--.

Column 59, Line 34, delete "qNB-CU-CP" and insert --gNB-CU-CP--.

Column 60, Line 1, delete "XN" and insert --Xn--.

Column 60, Line 25, delete "(DODS)" and insert --(DDDS)--.

Column 61, Line 1, delete "LIE" and insert --UE--.

Signed and Sealed this
Nineteenth Day of December, 2023

Katherine Kelly Vidal
*Director of the United States Patent and Trademark Office*